US009804012B2

(12) United States Patent
Marumoto et al.

(10) Patent No.: US 9,804,012 B2
(45) Date of Patent: Oct. 31, 2017

(54) VEHICLE TRAVELING INFORMATION RECORDING DEVICE

(75) Inventors: Kyoji Marumoto, Kyoto (JP); Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 839 days.

(21) Appl. No.: 13/001,827

(22) PCT Filed: Jun. 29, 2009

(86) PCT No.: PCT/JP2009/061875
§ 371 (c)(1),
(2), (4) Date: Dec. 29, 2010

(87) PCT Pub. No.: WO2010/001865
PCT Pub. Date: Jan. 7, 2010

(65) Prior Publication Data
US 2011/0112719 A1 May 12, 2011

(30) Foreign Application Priority Data

Jun. 30, 2008 (JP) .................................. 2008-171105
Oct. 24, 2008 (JP) .................................. 2008-273727
(Continued)

(51) Int. Cl.
*G01F 9/02* (2006.01)
*G01F 9/00* (2006.01)
(Continued)

(52) U.S. Cl.
CPC .......... *G01F 9/008* (2013.01); *B60R 16/0236* (2013.01); *G01F 9/02* (2013.01);
(Continued)

(58) Field of Classification Search
CPC ... G01F 9/00; G01F 9/008; G01F 9/02; B60R 16/0236
(Continued)

(56) References Cited

U.S. PATENT DOCUMENTS 6,058,348 A * 5/2000 Ohyama ............. F01L 13/0036
123/294
6,253,129 B1 * 6/2001 Jenkins et al. ............... 701/32.3
(Continued)

FOREIGN PATENT DOCUMENTS

CN        1937764 A      3/2007
EP    1 158 273 A1      11/2001
(Continued)

OTHER PUBLICATIONS

H. Tong, W. Hung and C. Cheung, "On-Road Motor Vehicle Emissions and Fuel Consumption in Urban Driving Conditions," Journal of the Air & Waste Management Association, vol. 50, Issue 4, 2000.*

(Continued)

*Primary Examiner* — Thomas G Black
*Assistant Examiner* — Peter D Nolan
(74) *Attorney, Agent, or Firm* — Fish & Richardson P.C.

(57) ABSTRACT

The vehicle traveling information recording device of the present invention comprises a camera unit for acquiring image information relating to outside of a vehicle; a recording unit for recording the image information from the camera unit; an abnormality detection unit for detecting an abnormal vehicle state; an auxiliary data detection unit for acquiring auxiliary data when the abnormality detection unit has detected an abnormality; and a control unit for combining the auxiliary data with the image information in the recording unit when the abnormality detection unit has detected the abnormality, and recording image information after the combination related to abnormality detection.

13 Claims, 25 Drawing Sheets

(30) Foreign Application Priority Data

| | | |
|---|---|---|
| Oct. 27, 2008 | (JP) | 2008-275073 |
| Nov. 4, 2008 | (JP) | 2008-282961 |
| Apr. 20, 2009 | (JP) | 2009-101648 |
| Apr. 20, 2009 | (JP) | 2009-101653 |

(51) Int. Cl.
- B60R 16/023 (2006.01)
- B60R 21/00 (2006.01)
- G07C 5/08 (2006.01)

(52) U.S. Cl.
CPC ............ B60R 21/00 (2013.01); G07C 5/085 (2013.01); G07C 5/0866 (2013.01); G07C 5/0891 (2013.01)

(58) Field of Classification Search
USPC ................................ 701/123; 340/438, 439
See application file for complete search history.

(56) References Cited

U.S. PATENT DOCUMENTS

| | | | |
|---|---|---|---|
| 7,274,987 B2 * | 9/2007 | Ishiguro | 701/123 |
| 7,603,228 B2 * | 10/2009 | Coughlin | 701/123 |
| 7,877,198 B2 * | 1/2011 | Tenzer et al. | 701/123 |
| 7,899,591 B2 * | 3/2011 | Shah et al. | 701/29.4 |
| 7,904,235 B2 * | 3/2011 | Sato | 701/123 |
| 8,214,103 B2 * | 7/2012 | Kranz et al. | 701/32.5 |
| 2003/0154009 A1 | 8/2003 | Basir et al. | |
| 2003/0191566 A1 * | 10/2003 | Ben-Assa | 701/29 |
| 2005/0139004 A1 * | 6/2005 | Lee et al. | 73/488 |
| 2005/0166882 A1 | 8/2005 | Suzuki | |
| 2005/0209771 A1 * | 9/2005 | Ishiguro | 701/123 |
| 2005/0288850 A1 * | 12/2005 | Sato | 701/123 |
| 2006/0192658 A1 | 8/2006 | Yamamura | |
| 2007/0021909 A1 | 1/2007 | Matsuda | |
| 2007/0067079 A1 | 3/2007 | Kosugi | |
| 2007/0143002 A1 * | 6/2007 | Crowell et al. | 701/123 |
| 2007/0256481 A1 * | 11/2007 | Nishiyama et al. | 73/113 |
| 2008/0234876 A1 | 9/2008 | Harumoto et al. | |
| 2008/0258891 A1 | 10/2008 | Sato | |
| 2008/0297335 A1 * | 12/2008 | Yeh et al. | 340/439 |
| 2009/0031741 A1 | 2/2009 | Hara et al. | |
| 2009/0222338 A1 * | 9/2009 | Hamilton et al. | 705/14 |
| 2010/0106390 A1 | 4/2010 | Yamaguchi | |

FOREIGN PATENT DOCUMENTS

| | | | |
|---|---|---|---|
| EP | 1 764 749 A2 | 3/2007 | |
| EP | 1973078 A1 * | 9/2008 | G07C 5/08 |
| JP | 01126560 A * | 5/1989 | G01P 9/00 |
| JP | 6-107129 | 4/1994 | |
| JP | 07-37133 | 2/1995 | |
| JP | 10-29462 | 2/1998 | |
| JP | 2000-185676 A | 7/2000 | |
| JP | 2002-211265 | 7/2002 | |
| JP | 2002-296040 A | 10/2002 | |
| JP | 2003-087234 | 3/2003 | |
| JP | 2003-123186 | 4/2003 | |
| JP | 2003-208696 A | 7/2003 | |
| JP | 2004-240828 A | 8/2004 | |
| JP | 2004-240873 | 8/2004 | |
| JP | 2004-251786 A | 9/2004 | |
| JP | 2006-004221 | 1/2006 | |
| JP | 2006-048541 A | 2/2006 | |
| JP | 2006-120137 | 5/2006 | |
| JP | 2006-199204 | 8/2006 | |
| JP | 2006-231942 | 9/2006 | |
| JP | 2006-235732 | 9/2006 | |
| JP | 2006-237974 | 9/2006 | |
| JP | 2006-285732 | 10/2006 | |
| JP | 2006-306153 | 11/2006 | |
| JP | 2007010528 A * | 1/2007 | |
| JP | 2007-024833 | 2/2007 | |
| JP | 2007-88541 | 4/2007 | |
| JP | 2007-100671 A | 4/2007 | |
| JP | 2007-188271 | 7/2007 | |
| JP | 2007-199791 | 8/2007 | |
| JP | 2007-256196 | 10/2007 | |
| JP | 2008-107155 A | 5/2008 | |
| JP | 2008-120230 | 5/2008 | |
| JP | 2008-164389 A | 7/2008 | |
| JP | 2008-186174 | 8/2008 | |
| JP | 2008-230434 | 10/2008 | |
| JP | 2008-265549 A | 11/2008 | |
| JP | 2008-267266 A | 11/2008 | |
| JP | 2009-031046 | 2/2009 | |
| JP | 2009-046115 A | 3/2009 | |
| WO | 02/056275 | 7/2002 | |
| WO | 2004-007952 A1 | 1/2004 | |
| WO | 2009/125454 A1 | 10/2009 | |

OTHER PUBLICATIONS

Biggs et al. (D. C. Biggs and R. Akcelik (1986). An energy-related model of instantaneous fuel consumption Traffic Engineering+Control, Jun. 1986, vol. 2, No. 6, pp. 320-325).*
European Patent Office, Supplementary European Search Report in patent application No. EP 09 77 3443 (Jan. 3, 2013).

* cited by examiner

| POSITION | STANDARD | CUSTOM1 | CUSTOM2 |
|---|---|---|---|
| AUTO | FULLY AUTOMATED | BRIGHTNESS AUTOMATIC | FULLY AUTOMATED |
| ON(H) | HEADLIGHTS | HEADLIGHTS | HEADLIGHTS (SIGNAL AUTOMATIC) |
| ON(S) | VEHICLE SIDE LIGHTS | VEHICLE SIDE LIGHTS | VEHICLE SIDE LIGHTS |
| OFF | ALL OFF | ALL OFF | ALL OFF |

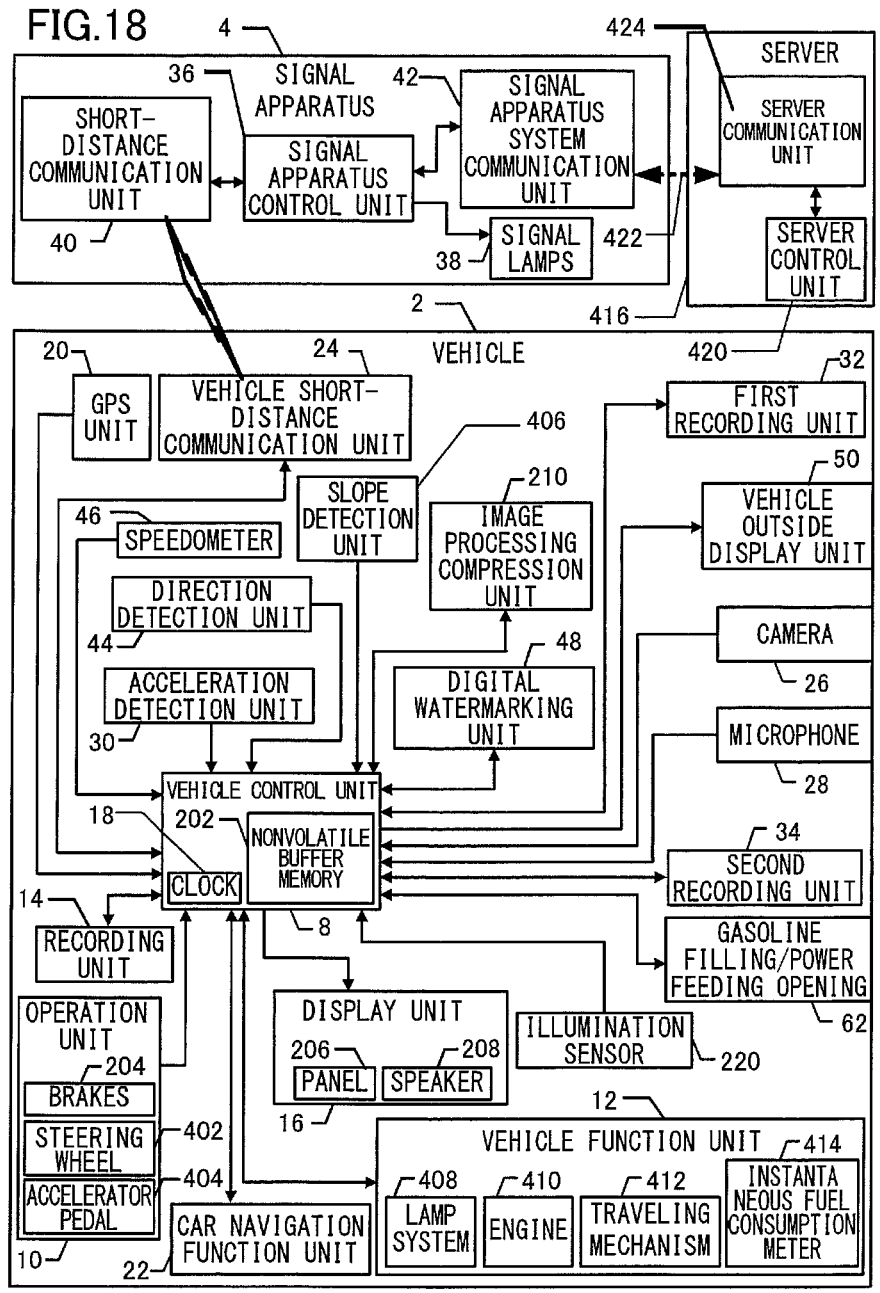

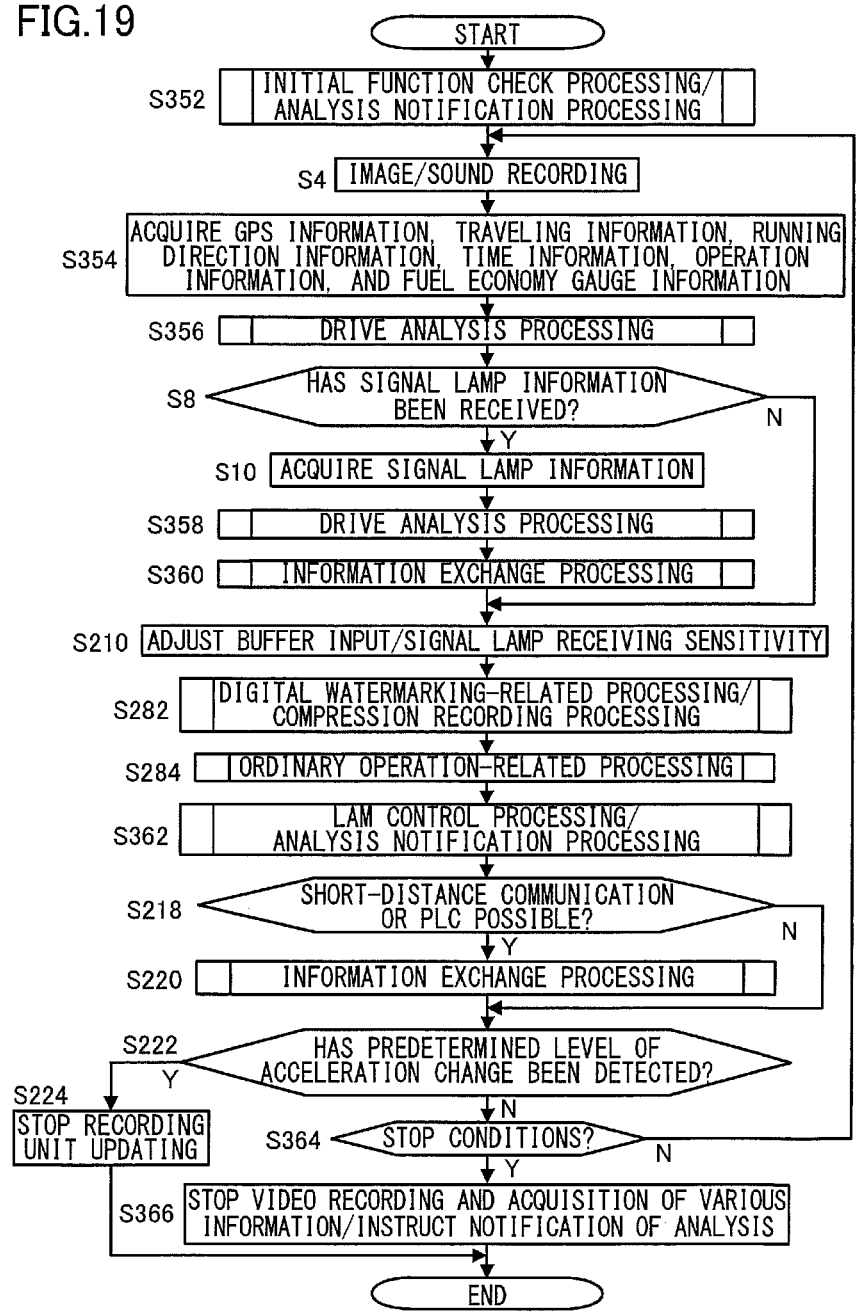

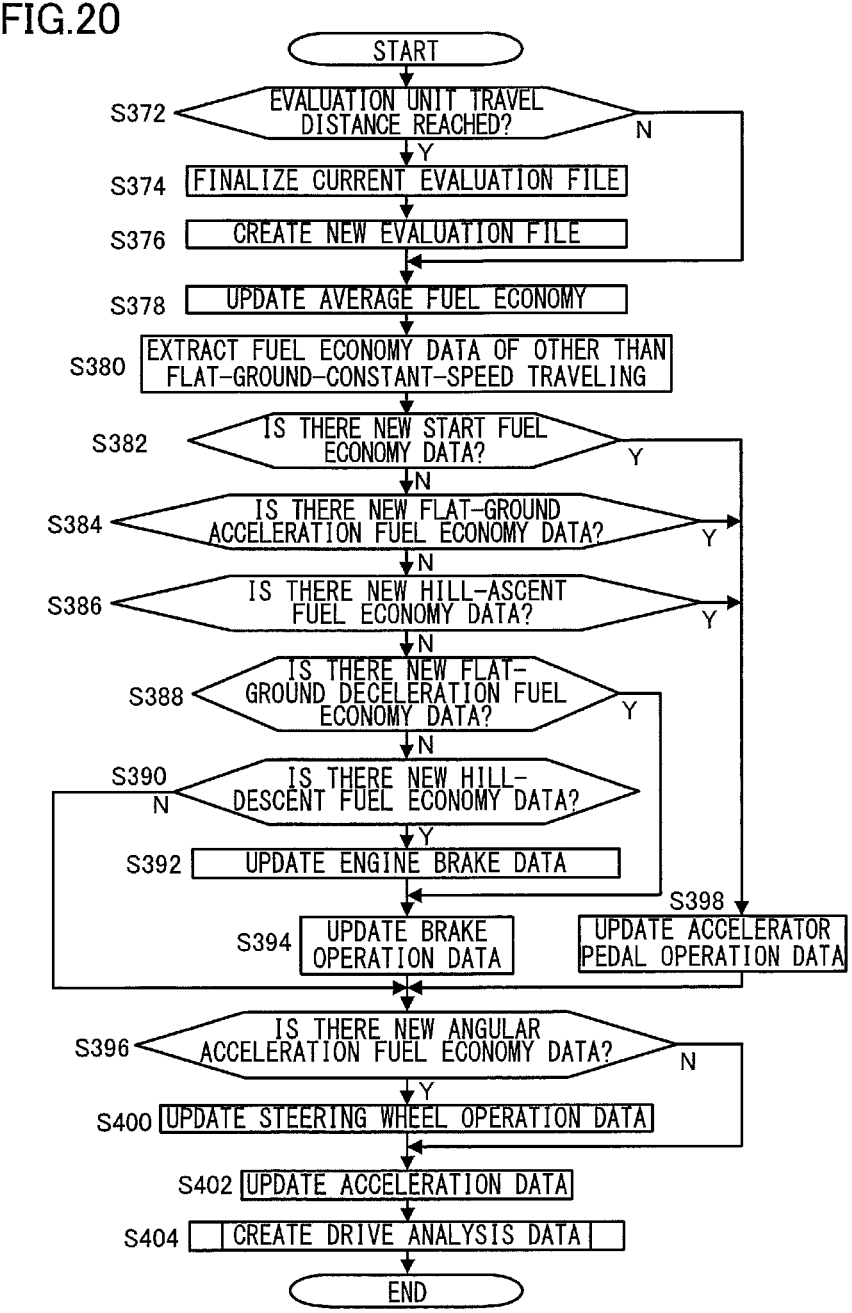

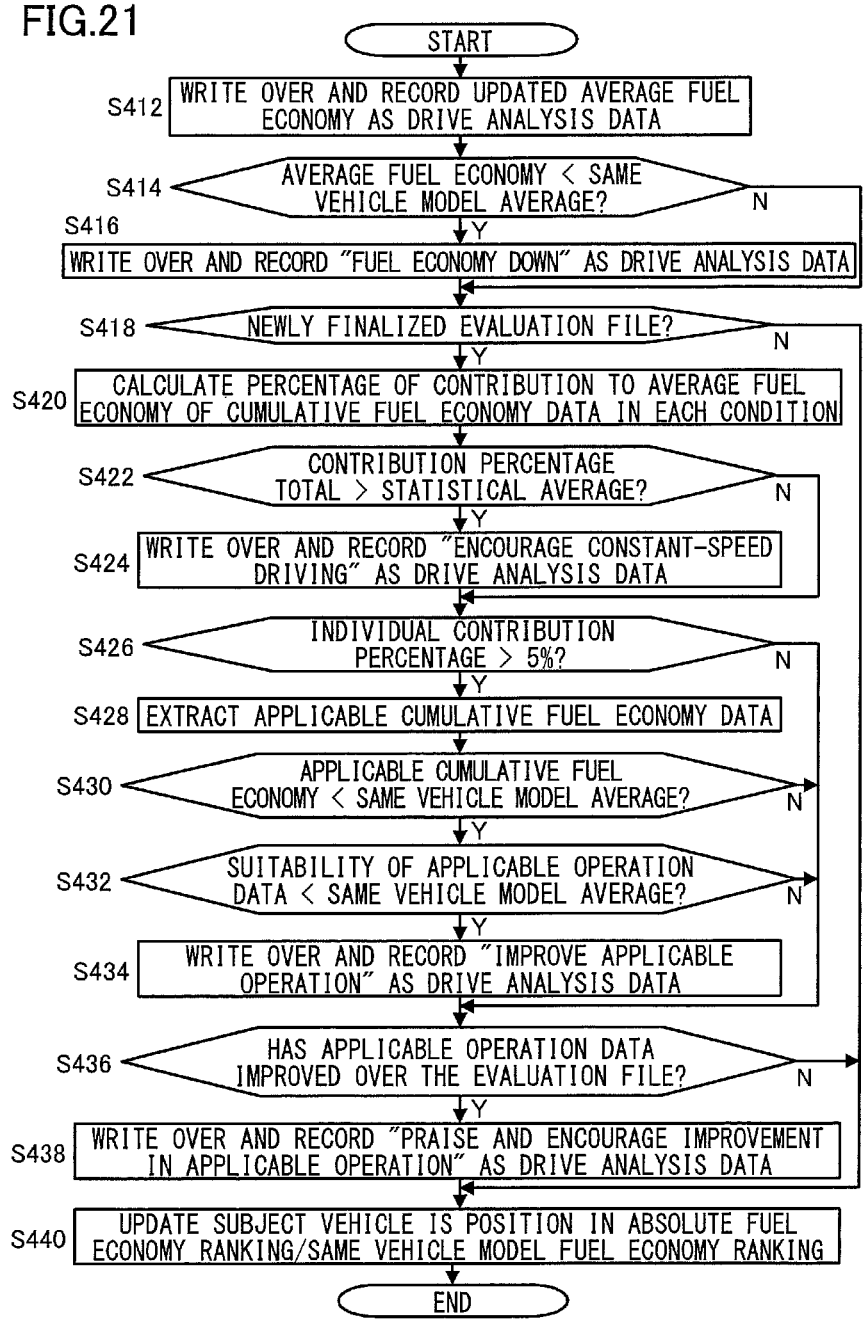

VEHICLE TRAVELING INFORMATION RECORDING DEVICE

TECHNICAL FIELD

The present invention relates to a vehicle traveling information recording device such as a drive recorder.

Background Art

First Background Art

Drive recorders keep a record of evidence just prior to an accident by saving information in memory that relates to the vehicle exterior and vehicle state before and after an accident has occurred, and are beginning to be widely used in recent years as effective means for preventing automobile accidents in advance. Various drive recorders have been proposed. In Patent Literature 1, for example, a drive recorder is proposed for preventing overwriting and falsification of data by providing means for blocking input to memory after an accident.

Second Background Art

Drive recorders keep a record of evidence just prior to an accident by saving information in memory that relates to the vehicle exterior and vehicle state before and after an accident, and are beginning to be widely used in recent years as effective means for preventing automobile accidents in advance. Various drive recorders have been proposed. Patent Literature 2, for example, proposes a travel recording system capable of ascertaining the color of a signal lamp when the vehicle has entered an intersection.

Third Background Art

Drive recorders keep a record of evidence just prior to an accident by saving information in memory that relates to the vehicle exterior and vehicle state before and after an accident, and are beginning to be widely used in recent years as effective means for preventing automobile accidents in advance. Various drive recorders have been proposed. In Patent Literature 1, for example, it is proposed that data after an accident is prevented from being overwritten by transmitting data recorded before and after an accident via an antenna.

Fourth Background Art

In recent years, headlight control in vehicles have become more automated, and it is becoming common to automatically switch on headlights near dusk or when the vehicle has entered a tunnel during daylight by automatically controlling the headlights in accordance with the brightness outside the vehicle. Various proposals have been made for automatically turning on the headlights. For example, in Patent Literature 3, it is proposed that headlights and vehicle side lights be controlled in accordance with the state of the turn indicator while traveling or when stopped and the state of the headlights when a radio wave is received from a ground station disposed in an intersection or a crosswalk, and the headlights are, e.g., automatically switched off (or dimmed) when the turn indicator is not active while the vehicle is stopped. In Patent Literature 1, it is also proposed that the headlights be turned off or dimmed or that the illumination angle be modified when it has been recognized that the vehicle is stopped, or that a traffic light is red as determined by color information analysis carried out by processing images obtained from an onboard camera.

Fifth Background Art

Various proposals have been made in recent years for vehicle travel safety. A drive recorder is an example that is used as evidence when an accident or the like has occurred, by recording travel and driving conditions. Proposals have been made not only for keeping a past record merely as evidence, but also for making positive future improvements. For example, there has been proposed a system capable of efficiently diagnosing the driving skill of the driver (Patent Literature 4), and a drive recorder capable of providing exact instruction and evaluation of driving to the operator (Patent Literature 5).

Sixth Background Art

Various proposals have been made in recent years for vehicle travel safety. A drive recorder is an example that is used as evidence when an accident or the like has occurred, by recording travel and driving conditions. Proposals have been made not only for keeping a past record merely as evidence, but also for making positive future improvements. For example, there has been proposed a system capable of efficiently diagnosing the driving skill of the driver (Patent Literature 4), and a drive recorder capable of providing exact instruction and evaluation of driving to the operator (Patent Literature 5). On the other hand, there has also been proposed a vehicle recording device having a communication function, i.e., a vehicle history information management system (Patent Literature 6) that can, e.g., encode and transmit history information related to various activity histories in a vehicle and thereby prevent falsification or the like of information.

LIST OF CITATIONS

Patent Literature

Patent Literature 1: Japanese Laid-open Patent Application No. 2006-306153
Patent Literature 2: Japanese Laid-open Patent Application No. 2008-230434
Patent Literature 3: Japanese Laid-open Patent Application No. 2003-123186
Patent Literature 4: Japanese Laid-open Patent Application No. 2002-211265
Patent Literature 5: Japanese Laid-open Patent Application No. 2007-199791
Patent Literature 6: Japanese Laid-open Patent Application No. 2003-87234

SUMMARY OF INVENTION

Technical Problem

However, drive recorders have a variety of diverse problems that need to be resolved in terms of practicality.

In view of the above, an object of the present invention is to provide a vehicle traveling information recording device that records a large amount of information.

Solution to Problem

In order to achieve the objects described above, the vehicle traveling information recording device according to the present invention has a configuration (first aspect) comprising a camera unit for acquiring image information relating to outside of a vehicle; a recording unit for recording the image information from the camera unit; an abnormality detection unit for detecting an abnormal vehicle state; an auxiliary data detection unit for acquiring auxiliary data when the abnormality detection unit has detected an abnormality; and a control unit for combining the auxiliary data with the image information in the recording unit when the abnormality detection unit has detected the abnormality, and recording the combined image information as image information related to abnormality detection.

In the vehicle traveling information recording device according to the first aspect, it is possible to use a configuration (second aspect) in which the control unit combines the auxiliary data with the image information in the recording unit as a digital watermark.

In the vehicle traveling information recording device according to the first aspect, it is possible to use a configuration (third aspect) in which the auxiliary data detection unit acquires position data of the vehicle.

In the vehicle traveling information recording device according to the first aspect, it is possible to use a configuration (fourth aspect) in which the auxiliary data detection unit has a signal information unit for acquiring signal lamp information in the running direction of the vehicle.

In the vehicle traveling information recording device according to the fourth aspect, it is possible to use a configuration (fifth aspect) in which the signal information unit comprises a receiving unit for receiving signal lamp information; a detection unit for detecting running direction information of the vehicle; a sorting unit for sorting signal lamp information in the traveling direction of the vehicle from the signal lamp information received by the receiver unit on the basis of the running direction information of the vehicle detected by the detection unit; and a recording unit for recording signal lamp information in the traveling direction of the vehicle sorted by the sorting unit.

The vehicle traveling information recording device according to the fifth aspect may have a configuration (sixth aspect) comprising a control unit for controlling the headlights on the basis of the signal lamp information in the traveling direction of the vehicle sorted by the sorting section.

The vehicle traveling information recording device according to the sixth aspect may have a configuration (seventh aspect) comprising a brake operation unit and a time-elapsed detection unit for detecting that a predetermined time has elapsed after the brake operation unit has been operated, wherein the control unit changes the state of the ordinarily lighted headlights when the time-elapsed detection unit has detected that a predetermined time has elapsed after brakes have been operated, and the signal lamp information in the traveling direction of the vehicle, having been sorted by the sorting unit, is in a vehicle-stop instruction state.

In the vehicle traveling information recording device according to the fifth aspect, it is possible to use a configuration (eighth aspect) in which the signal information unit comprises a position information acquisition unit for acquiring position information of a vehicle on a map, and a control unit for incorporating the information of a signal lamp installation position on a map held in the position information acquisition unit into the record of the signal lamp information performed by the recording unit.

The vehicle traveling information recording device according to the first aspect may have a configuration (ninth aspect) comprising a switching unit for switching the vehicle between a travel-enabled state and a travel-disabled state, a checking unit for checking whether the recording of traveling information performed by the recording unit is enabled each time the switching unit sets the vehicle in the travel-enabled state, and a reporting unit for reporting the checking results of the checking unit.

The vehicle traveling information recording device according to the first aspect may have a configuration (tenth aspect) comprising a switching unit for switching the vehicle between a self-powered-travel-enabled state and a self-powered-travel-disabled state, and a control unit for maintaining functioning of the camera unit and the recording unit even when the switching unit has set the vehicle in a self-powered-travel-disabled state.

The vehicle traveling information recording device according to the first aspect may have a configuration (eleventh aspect) in which the auxiliary data detection unit acquires the operating data of the vehicle.

The vehicle traveling information recording device according to eleventh aspect may have a configuration (twelfth aspect) comprising a fuel economy gauge, and a control unit for analyzing the relationship between the fuel economy information of the fuel economy gauge and the operating data of the vehicle.

The vehicle traveling information recording device according to the present invention has a configuration (thirteenth aspect) comprising a fuel economy gauge, a traveling information detection unit, and a control unit for using the traveling information detection unit to classify the fuel economy information of the fuel economy gauge.

In the vehicle traveling information recording device according to the thirteenth aspect, it is possible to use a configuration (fourteenth aspect) in which the control unit classifies the fuel economy information of the fuel economy gauge into a flat-ground-constant-speed state and states other than the flat-ground-constant-speed state.

The vehicle traveling information recording device according to the fourteenth aspect may have a configuration (fifteenth aspect) comprising a vehicle operating data recording unit, wherein the control unit analyzes the relationship between fuel economy information of states other than the flat-ground-constant-speed state and the vehicle operating data.

The vehicle traveling information recording device according to the thirteenth aspect may have a configuration (sixteenth aspect) comprising a notification unit for providing notification on the basis the information of the traveling information detection unit, and a control unit for controlling the notification timing by the notification unit.

The vehicle traveling information recording device according to the thirteenth aspect may have a configuration (seventeenth aspect) comprising a transmitting unit for transmitting the vehicle information acquired by the fuel economy gauge to the exterior, and a receiving unit for receiving statistical information of fuel economy information collected from numerous vehicles.

The vehicle traveling information recording device according to the present invention has a configuration (eighteenth aspect) comprising a vehicle information acquisition unit; a transmitting unit for transmitting the vehicle information acquired by the vehicle information acquisition unit to the exterior; a receiving unit for receiving statistical information of vehicle information collected from numerous vehicles; and a controlling unit for comparing the statistical information received by the receiving unit and the vehicle information acquired by the vehicle information acquisition unit.

In the vehicle traveling information recording device according to the eighteenth aspect, it is possible to use a configuration (nineteenth aspect) in which the vehicle information acquisition unit includes a fuel economy gauge, and the statistical information includes information that indicates the distribution state of the fuel economy information collected from numerous vehicles.

In the vehicle traveling information recording device according to the eighteenth aspect, it is possible to use a configuration (twentieth aspect) in which the numerous vehicles are limited to the same vehicle.

Advantageous Effects of the Invention

As described above, in accordance with the present invention, it is possible to provide a vehicle traveling state recording device that provides greater reliability of the evidentiary strength of recorded abnormality information.

BRIEF DESCRIPTION OF DRAWINGS

FIG. 18 is a block view (Example 4) showing the fourth example of the drive recorder system according to the present invention;

FIG. 19 is a basic flowchart showing the functions of the vehicle control unit 8 in the fourth example in FIG. 18;

FIG. 20 is a flowchart showing the details of drive analysis processing in steps S356 and 358 of FIG. 19;

FIG. 21 is a flowchart showing the details of drive analysis data creation processing in step S404 of FIG. 20;

DESCRIPTION OF EMBODIMENTS

First Example

Figure 1:
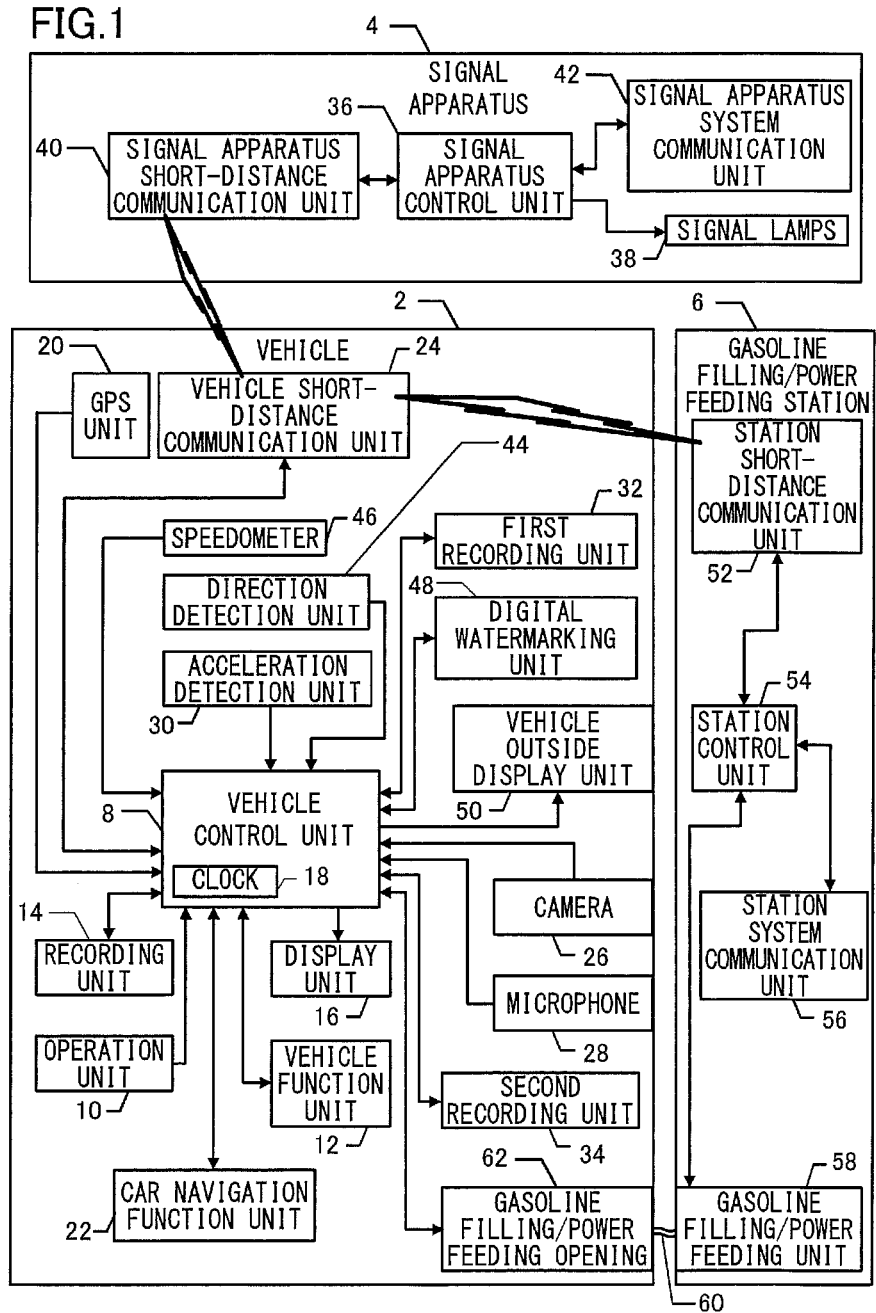
FIG. 1 is a block view (Example 1) showing the first example of the drive recorder system according to the present invention.

FIG. 1 is a block view showing the first example of the drive recorder system according to an embodiment of the present invention. The drive recorder system of the present example is designed for a vehicle 2, i.e., a gasoline engine vehicle, an electric automobile, or a so-called hybrid vehicle in which a gasoline engine and a motor are used in combination, which are provided with a drive recorder for recording information before and after an accident, and is furthermore composed of a system that operates in coordination with a signal apparatus (a traffic light apparatus) 4 and a gasoline/charging station 6.

The vehicle 2 has a vehicle control unit 8 comprising a computer for controlling the vehicle overall and for controlling a vehicle function unit 12 in accordance with operation of the operation unit 10 by the driver of the vehicle. The functions of the vehicle control unit 8 are executed by software stored in the recording unit 14. The recording unit 14 temporarily stores various data required for controlling the vehicle overall. The vehicle control unit 8 controls a display unit 16, displays a GUI required for operating the operation unit 10, and displays the control results. The vehicle control unit 8 has a clock 18, and the time information of the clock 18 is used in various functions. The time of the clock 18 is automatically corrected to the correct time as needed using external time information.

A GPS unit 20 acquires latitude, longitude, and elevation information as absolute position information of the vehicle 2 from satellites and the nearest broadcast station on the basis of a GPS system, and sends the information to the vehicle control unit 8. A car navigation function unit 22 processes absolute position information received from the GPS unit 20 via the vehicle control unit 8, and displays the position of the vehicle 2 on a map on the display unit 16. The vehicle 2 is furthermore provided with a vehicle short-distance communication unit 24, and receives information by radio wave or by light from signal apparatuses 4 and gasoline/charging stations 6 when in the vicinity thereof.

Next, the configuration related to driver recorder will be described as required in association with the configuration described above. Images of the forward direction of the vehicle and ambient sounds are constantly inputted when the vehicle 2 is in an operating state. An operating state is not only a state in which the vehicle is actually traveling, but is also a state in which the vehicle is temporarily stopped at a traffic light, and also includes all states in which a traffic accident may possibly occur in conjunction with the traveling of the vehicle 2. In order to check whether such a state exists, the presence of a moving body is detected by image processing based on an image captured by a camera 26, and images and sounds are delivered to the camera 26 and the microphone 28 provided that, for a predetermined continuous length of time thereafter, no confirmation is made of a state in which a moving body has not been detected in the image, even when the engine is stopped.

The vehicle control unit 8 is provided with a non-volatile buffer memory with a capacity of about 20 seconds, and image and sound information inputted from the camera 26 and the microphone 28 is stored in a first-in first-out (FIFO) format. In other words, the most recent 20 seconds of information continues to be constantly written over old data and stored. When a sharp change in acceleration has been detected by an acceleration detection unit 30 due to a collision or other adverse event, or a manual operation is made by the operation unit 10, about 10 additional seconds of information continues to be stored in the buffer memory from that point forward as long as the camera 26 and the microphone 28 are not destroyed and the input information is continuous. Therefore, about 10 seconds of image and sound information is ultimately retained in the buffer memory before and after the point at which a change in acceleration has been detected or a manual operation has been carried out. This 10 seconds of before-and-after image and sound information undergoes predetermined processing by the vehicle control unit 8, and is configured to be recorded as digitally compressed video information in a first recording unit 32 and a second recording unit 34 disposed in different portions of the vehicle 2. The first recording unit 32 and the second recording unit 34 are each composed of non-volatile memory, and the recording is retained even when power has been cut off to these recording units due to an accident or the like. The first recording unit 32 and the second recording unit 34 have capacity for about 10 units of digitally compressed video information, and is overwritten in a FIFO format.

The first recording unit 32 is disposed in, e.g., the front portion of the vehicle and the second recording unit 34 is disposed in, e.g., the rear portion of the vehicle. The two units are configured so as to record the same information, and it is thereby expected that if one of the units is destroyed by chance in an accident, the other will remain viable and capable of recording. It is also expected that information that has already been recorded will remain in at least one of the units. A record of about 20 seconds prior to an accident will remain as long as the non-volatile buffer memory is safe, even when a majority of the drive recorder functions have been destroyed.

Here, the processing carried out by the vehicle control unit 8 will be described when images and sound are recorded in the first recording 32 and the second recording unit 34. In addition to the processing for creating ordinary digitally compressed video information with sound, this processing includes processing for enhancing information as evidence as well as preventing falsification or substitution of the digitally compressed video information with sound to increase evidentiary strength.

The signal apparatus 4 is configured so as to enhance the evidentiary information, and a signal apparatus control unit 36 controls the red, green, and yellow signal lamps 38. A signal apparatus short-distance communication unit 40 transmits information in the vicinity of the signal apparatus 4 to indicate the current colors of the signal lamps and to which of the intersecting roads they are oriented. The signal apparatus short-distance communication unit 40 also has a configuration that is used for transmitting traffic congestion information or the like in the vicinity of the signal apparatus 4 from the vehicle information communication system and obtained from a signal apparatus system communication unit 42. Therefore, this information is received by the vehicle short-distance communication unit 24 and sent to the vehicle control unit 8 if a vehicle 2 is present in the vicinity of the intersection where the signal apparatus 4 is located. The state of a signal lamp 38 in the forward direction of the vehicle 2 can be acquired as information when a change in acceleration has been detected or when there has been a manual operation while the vehicle 2 is passing through the intersection or stopped at the traffic light. It is thus possible to ascertain the state of the signal lamp 38 until a change in acceleration is detected or a manual operation (hereinafter referred to as "occurrence of an accident" in a typical case) is made, even when the state of the signal lamp 38 cannot be obtained from images from the camera 26 due to a limited angle of view of the camera 26 or due to synchronization [problems] between the camera 26 and the signal lamp 38. A direction detection unit 44 detects the direction in which the vehicle 2 is oriented immediately prior to the occurrence of an accident, and in combination with information from the signal apparatus 4 described above, provides evidence to the vehicle 2 of whether an signal was ignored when an accident has occurred.

The vehicle control unit 8 receives speed information from a speedometer 46, and sequentially overwrites old data and records the speed information in FIFO format so as to use about 20 seconds of capacity in the nonvolatile buffer memory. It is therefore possible to ascertain the relationship between the speed at the time of an accident and the speed limit, the brake operation history about 20 seconds prior to an accident, and other factors. Such speed information at the time of an accident and the brake operation history are digitally watermarked together with the signal lamp information in the forward direction at the time of an accident, the accident occurrence time information from the clock 18, and accident geographical point information from the GPS unit 20, sent to the epi-illumination source 48 and handled as digitally watermarked data. The operation information of the brakes or the like can be indirectly ascertained from the speed information as described above and can be sent directly to the vehicle control unit 8 from the wafer 10. Therefore, the operation history information can also be sequentially written over old data in a FIFO format in the nonvolatile buffer memory.

About 10 seconds of image and sound information obtained from before and after an accident and temporarily stored in the buffer memory is sent to a digital watermarking unit 48 and embedded with digital watermark data composed of the speed information, brake operation history, signal lamp information, time information, and geographical point information. Digital watermarking key information held in the recording unit 14 is set and used during the embedding process.

Image and sound information embedded in this manner with digital watermark data using digital watermarking key information is returned to the vehicle control unit 8, digitally compressed, and sent to the first recording unit 32 and the second recording unit 34, respectively. As described above, digital watermark information related to an accident is embedded in about 10 seconds of image and sound information both before and after an accident by using digital watermarking key information, and it is therefore difficult to falsify the image information and the sound information.

The digital watermark information itself enhances the evidentiary information at the time of the accident by extracting the information.

The control of the drive recorder function was described above as being carried out by the vehicle control unit 8, but in place of having the vehicle control unit 8 perform all functions, it is also possible to provide a separate, dedicated control unit assigned to the drive recorder function and to delegate functions. In this case as well, the drive recorder-dedicated control unit operates in coordination with the vehicle control unit 8 to execute functions overall such as those described above.

In the event that an accident has occurred, the constituent portions of the drive recorder function described above are stored in a section that cannot be accessed by the owner of the vehicle 2 and can be accessed by a qualified person during vehicle inspection or the like. Cables or the like that connect the camera 26 and the microphone 28 to the vehicle control unit 8 are also arranged in a section that is not visible to the owner of the vehicle 2. Even when the drive recorder function is later added to the vehicle 2, installation is limited to qualified personnel, and the cables or the like are disposed so that the owner of the vehicle 2 cannot remove them without authorization. Furthermore, if the cables are cut or drive recorder function has been otherwise damaged in error, the vehicle outside display unit 50 displays this fact on the exterior of the vehicle and a traffic violation will result when this display is discovered by police.

On the other hand, an initial check of the drive recorder function is carried out each time the vehicle 2 is started, and the display unit 16 displays that the status is normal. In place of a display, it is also possible to provide notification by announcement that the check results are normal, or both display and announcement may be used. Traffic accidents normally should not occur, and in fact it is likely that nothing will happen for many years for a safe driver. During this interval, the drive recorder has no opportunity to operate even once, but based on the configuration described above, the functions are checked to be normal on a daily basis, and it is possible to prevent a situation in advance in which information is by chance not recorded.

The gasoline filling/power feeding station 6 is provided with a station short-distance communication unit 52 for exchanging information with the vehicle 2, which has stopped at a station for fueling or charging. The station control unit 54 acquires from the station system communication unit 56 the ID information of the vehicle 2 and the newest digital watermarking key information to be applied to the vehicle 2. The newest digital watermarking key information is transmitted to the vehicle 2 by information exchange between the vehicle short-distance communication unit 24 and the station short-distance communication unit 52, and is sent to the recording unit 14 by way of the vehicle control unit 8 to update the old digital watermarking key information. Updating such digital watermarking key information prevents falsification or substitution of image and sound information obtained by the drive recorder, and the update history of the digital watermarking key information of each vehicle is registered separately in a drive recorder management center. Therefore, digital image information created using expired digital watermarking key information is not recognized as a genuine recording. In the event that the digital watermarking key information has leaked out, the digital image information created using expired digital watermarking key information will not be recognized as a genuine recording. It is also possible to frequently update the digital watermarking key information from a signal apparatus 4.

A gasoline filling/power feeding unit 58 fills gasoline/feeds power to a gasoline filling/power feeding opening 62 of the vehicle 2 via a gasoline filling/power feeding unit line 60. At this point, the digital watermarking key information can be transmitted from the station control unit 54 to the vehicle control unit 8 by using power line communication (PLC) via the gasoline filling/power feeding unit line 60 in the case that the vehicle 2 is a electric automobile or a hybrid vehicle.

As described above, the owner of the vehicle 2 cannot modify the drive recorder information in the first example of the present invention, but is free to copy the information onto a removable memory card inserted into the card slot of the vehicle control unit 8. The owner is free to copy and remove the memory card inserted into a card slot of the vehicle control unit 8 by inputting a password. Therefore, the data removed in this manner can be viewed on a personal computer or mobile phone.

FIG. 1 shows the case in which the digital watermarking key information is updated by short-distance communication between the vehicle 2 and the gasoline filling/power feeding station 6, but the updating of the digital watermarking key information is not limited to such a case. For example, the present invention can be understood to be implemented by replacing "gasoline filling/power feeding station 6" with "electronic toll collection (ETC) 6" and by replacing "station" with "ETC" in the internal structures 52, 54, and 56 to update the digital watermarking key information each passage through an ETC 6. In this case, the vehicle short-distance communication unit 24 in the vehicle 2 and the station short-distance communication unit 52 in the ETC 6 can also be used for exchanging the digital watermarking key information.

The following information exchange can be carried out in the case of a configuration such as the ETC 6 described above in which short-distance communication is carried out on the basis of a contractual relationship with the vehicle 2, and that doubles as the short-distance communication of a system in which personal information is strictly managed. In other words, when any drive recorder information is recorded in the first recording unit 32 or the second recording unit 34, a configuration may be used in which the information is automatically transmitted from the vehicle short-distance communication unit 24 to the ETC short-distance communication unit 52, and the information is transferred from the ETC system communication unit 56 to the ETC management center. However, expressway tolls may be discounted or some other incentive may be provided on the condition that the driver consents in advance to automatically carry out such transfers. The driver can thereby be made more conscious of safe driving because evidence of hit-and-run accidents involving objects or people is collected in the ETC management center with the consent of the driver.

Figure 2:
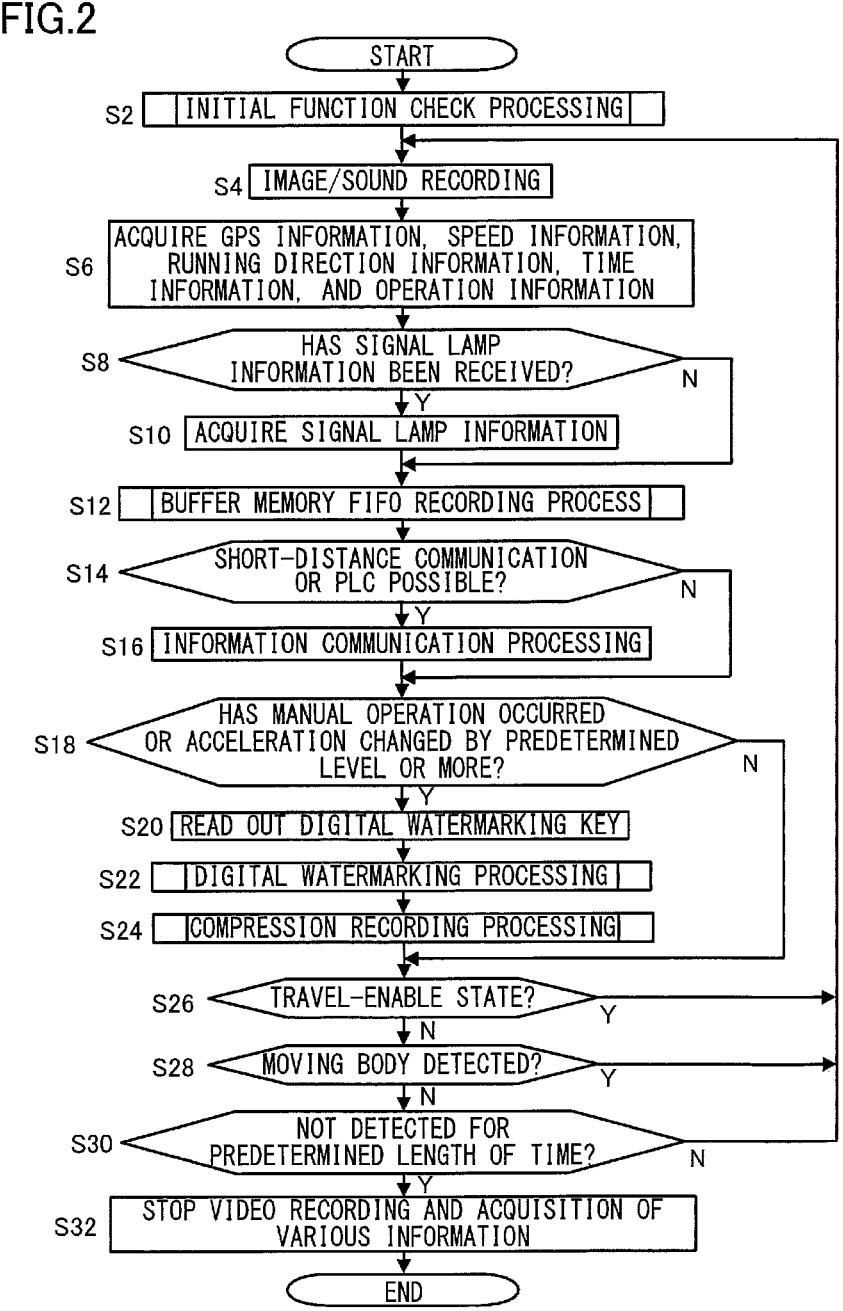
FIG. 2 is basic flowchart showing the functions of the vehicle control unit in the first example of FIG. 1.

FIG. 2 is a basic flowchart showing the functions of the vehicle control unit 8 of the vehicle 2 in the first example of FIG. 1. The flow starts when the vehicle 2 is placed in a travel-enabled state. Specifically, the travel-enabled state is enabled by switching on the ignition in a gasoline engine, and switching on the travel preparation switch in a hybrid vehicle or an electric automobile to start the flow. The travel-enabled state includes the state of actual traveling. When the flow is started, the vehicle functions including the drive recorder function are initially checked in the first step S2. This processing includes displaying the check results or notification by announcement.

Next, image and sound is recorded in step S4 on the basis of information from the camera 26 and the microphone 28. In step S6, GPS information, speed information from the speedometer 46, running direction information from the direction detection unit 44, time information from the clock 18, and operation information from the operation unit 10 are acquired, and the process then arrives at step S8.

In step S8, a check is made as to whether signal lamp information from the signal apparatus 4 has been received in the vehicle short-distance communication unit 24. In the case that the vehicle 2 has entered an intersection and signal lamp information has been received, the process proceeds to step S10, the signal lamp information is acquired, and the process proceeds to step S12. The signal apparatus 4 transmits information related to the state of the signal lamps 38 in the running direction of the vehicle 2 and the direction orthogonal thereto; and in step S10, all the information is directly acquired by the vehicle short-distance communication unit 24. On the other hand, the process proceeds directly from the step S8 to step S12 in the case that the vehicle 2 is not entering an intersection or is entering an intersection in which the signal apparatus 4 does not have a signal lamp information transmitting function, and signal information or the like has not been received as a result.

The information obtained in steps S2, S6, and S10 is recorded over [old information] in a FIFO format using about 20 seconds of capacity in the nonvolatile buffer memory inside the vehicle control unit 8. The details of the recording are described later. The process proceeds to step S14 when the recording of information obtained at that time point in step S12 has ended, and a check is carried out to determine whether a communication counterpart is within communication range of the vehicle short-distance communication unit 24 and whether short-distance communication is possible. A check is also performed in step S14 to determine whether communication is possible by power line communication (PLC). The communication counterpart in this case is, e.g., the gasoline filling/power feeding station 6 or the ETC 6, but the communication counterpart may also be a signal apparatus 4 as long as communication other than the receiving of signal lamp information is possible.

When it has been determined in step S14 that short-distance communication or power line communication is possible, the process proceeds to step S16, information exchange processing via short-distance communication or power line communication is carried out, and the process proceeds to step S18. The content of information exchange processing in step S16 in this case involves receiving update information of the digital watermarking key information, but as previously mentioned, information exchange processing additionally in step S16 involves transmitting drive recorder information recorded in the first recording unit 32 or the second recording unit 34. These details are later described. The process proceeds directly to step S18 when it has been determined in step S14 that short-distance communication and power line communication are not possible.

In step S18, a check is made to determine whether there has been manual operation using the operation unit 10 or whether there has been predetermined acceleration change or greater as detected by an acceleration detection unit 30. In this case, a predetermined acceleration change or greater is rapid deceleration in the same direction such as a head-on collision, and a change in the running direction or the like due to a collision, and other changes in acceleration while the vehicle is traveling, but also included is a collision or the like with another vehicle when the vehicle 2 itself is stopped.

When manual operation or a predetermined acceleration change or greater has been detected in step S18, the process proceeds to step S20 and the newest digital watermarking key for the vehicle 2 is read out from the recording unit 14. Digital watermarking for embedding various digital watermark data in the image/sound information of a video on the basis of a digital watermarking key is carried out in step S22. The process then proceeds to step S24, the image/sound information having an embedded digital watermark is compressed and recorded in the first recording unit 32 and the second recording unit 34, and the process then proceeds to step S26. When it has not been detected in step S18 that a manual operation has been carried out and that a predetermined change in acceleration or greater has occurred, the process proceeds directly to step S26. The details of steps S22 and S24 are later described.

In step S26, a check is made to determine whether the vehicle 2 is in a travel-enabled state, and if such is the case the process returns to step S4. On the other hand, when the vehicle is not in a travel preparation state because the ignition has been switched off or the travel preparation switch has been switched off, the process proceeds to step S28, and it is detected whether or not a moving body is included in an image on the basis of the images acquired from the camera 26. If a moving body has been detected, the process returns to step S4. Detection of a moving body refers to a state in which the motive power of the vehicle 2 is off but the vehicle is traveling by inertia or moving downhill, or refers to a situation in which the vehicle 2 is stopped, but vehicles in the environment are traveling and the vehicle 2 is on the road, and in such a case detection is carried out because the vehicle 2 is not yet in a safe state.

On the other hand, when a moving body is not detected in step S28, the process proceeds to step S30, and a check is made as to whether a state in which a moving body has not been detected has continued for a predetermined length of time or longer. The process returns to step S4 in the case that a predetermined length of time has not elapsed. This is because there are situations in which a moving body is not detected in the case that an accident has just occurred, or in the case that the vehicle 2 is stopped on the road and vehicles are incidentally not traveling in the periphery of the vehicle. In this manner, the processing from image/sound recording of step S4 is carried out when the process has returned to step S4 from any of steps S26 to S30, and the process from step S4 to step S30 is thereafter repeated until it is deemed that a moving body has not been detected for a predetermined length of time or longer step S30 in that the vehicle 2 is stopped in a safe location. Acquisition of image/sound information and predetermined information and the FIFO recording thereof are continued, while recording of compressed data of the image/sound information in which a digital watermark has been embedded is carried out each time a predetermined acceleration or greater has been detected. On the other hand, when it has been detected that a moving body has not been detected for a predetermined length of time or longer in step S30, the process proceeds to step S32, recording of video/sound and acquisition of various information is stopped, and the flow is ended.

Figure 3:
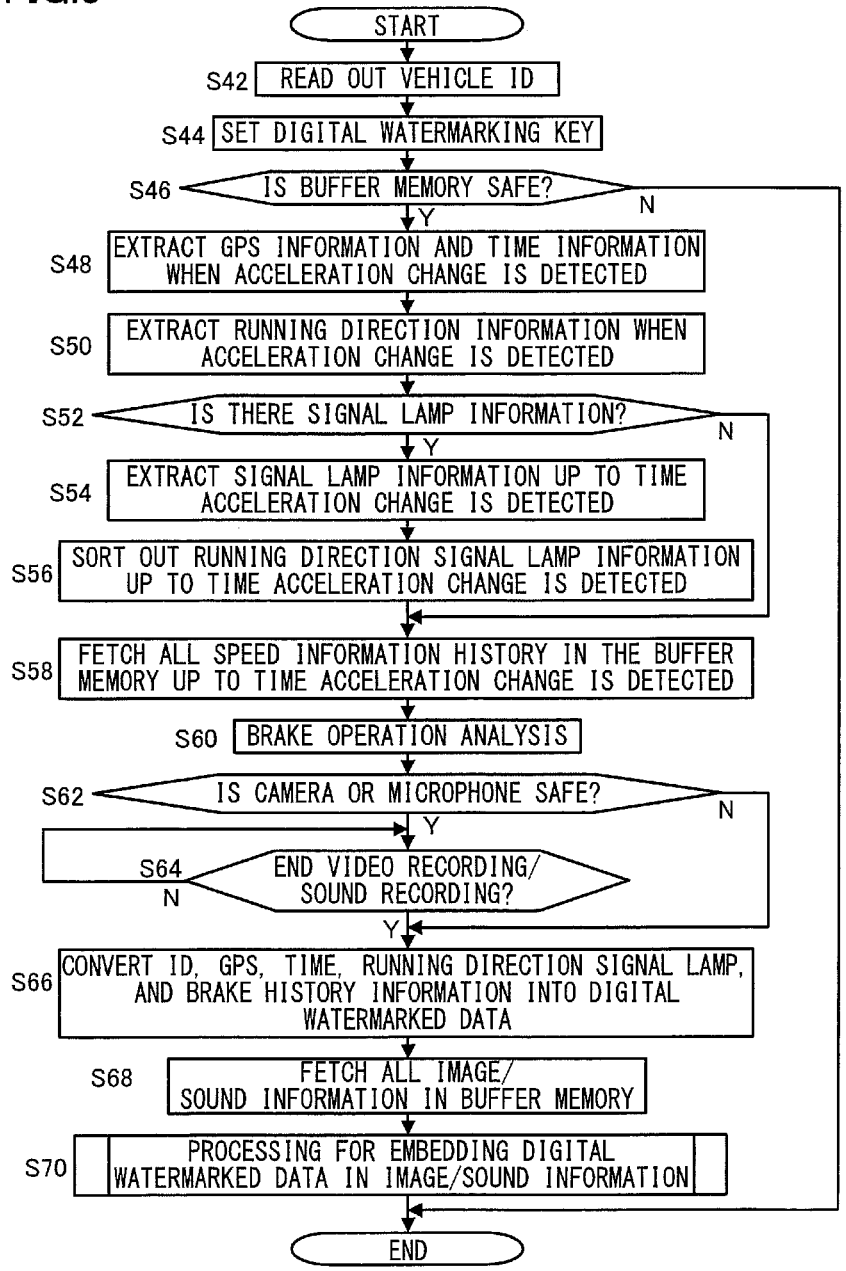
FIG. 3 is a flowchart showing the details of step S22 of FIG. 2.

FIG. 3 is a flowchart showing the details of digital watermarking in step S22 of FIG. 2. When the flow is started, ID data of the vehicle 2 is read out from the recording unit 14 in step S42. As described below, the ID is used as digital watermark data and is also used as data for specifying the version of the digital watermarking key currently used in the vehicle 2. In other words, since the version of the digital watermarking key currently used in the vehicle 2 is separately registered in the driver recorder management center, the ID of the vehicle 2 thus read out is added to the data, which can therefore be attested to be compressed data of the image/sound information in which a digital watermark has been embedded using a genuine registered digital watermarking key.

Next, in step S44, the digital watermarking key read out in step S20 of FIG. 2 is set in the digital watermarking unit 48. Next, in step S46, a check is made to determine whether the nonvolatile buffer memory of the vehicle control unit 8 has survived in working order after a change in acceleration has been detected. If the buffer memory is safe, the process proceeds to step S48, and the GPS information and time information at the time the change in acceleration was detected is extracted from the buffer memory. Also, in step S50, the running direction information when a change in acceleration is detected is extracted from the buffer memory and the process proceeds to step S52.

In step S52, a check is made to determine whether signal lamp information exists in buffer memory. Since the presence of signal lamp information indicates that the vehicle 2 has been in the vicinity of an intersection near the point in time in which a change in acceleration has been detected, the process proceeds to step S54, and the signal lamp information up to when the change in acceleration was detected is extracted. In step S56, the signal lamp information in the running direction up to when the change in acceleration was detected is sorted out with reference to the running direction information extracted in step S50, and the process proceeds to step S58. On the other hand, the process proceeds directly to step S58 when signal lamp information does not exist in the buffer memory in step S52.

In step S58, full speed information history is fetched from the buffer memory up to the point at which a change in acceleration was detected, the stated brake operation is analyzed based on this data in step S60, and the process proceeds to step S62. Data 20 seconds prior to the point at which a change in acceleration was detected can be used as the buffer memory data fetched during steps S56 and S58 as described above. In contrast, data 10 to 20 seconds prior the point at which a change in acceleration was detected is lost by being overwritten by 10 seconds of data after a change in acceleration was detected because FIFO recording for image and sound information is continued even after a change in acceleration has been detected, as long as the functions of the camera 26 and the microphone 28 are undamaged.

In step S62, a check is made to determine whether the functions of the camera 26 and the microphone 28 remain safe and undamaged after a change in acceleration has been detected. Even if one of the two is undamaged, the process proceeds to step S64. If the functions of either the camera 26 or the microphone 28 are safe, then FIFO recording to the buffer memory is continued because the information continues to be sent from at least one or the other even after a change in acceleration has been detected. In view of the above, in step S64, a check is made to determine whether image and sound recording for a predetermined length of time (about 10 seconds) has ended after a change in acceleration has been detected, and the end of recording awaited. When the predetermined length of time has elapsed and image and sound recording has ended, the process proceeds to step S66. On the other hand, in step S62, the process proceeds directly to step S66 when the functions of either the camera 26 or the microphone 28 have been damaged and it has been detected that information after a change in acceleration has been detected can no longer be sent. In this case, for image and sound information as well, the information in the buffer memory is also data of 20 seconds prior to detection of a change in acceleration In step S66, the various information obtained in steps S42, S48, S56, and S60 is converted to digital watermark data that is to be embedded. In step S68, all of the image and sound information in the buffer memory is fetched, and the process proceeds to step S70. In step S70, processing for embedding digital watermark data in the image and sound information is carried out in accordance with the settings of step S44 on the basis of information obtained in steps S66 and S68, and the flow is ended when the embedding process is complete. The flow is immediately ended in step S46 in the case that it is detected that the buffer memory has been destroyed.

Figure 4:
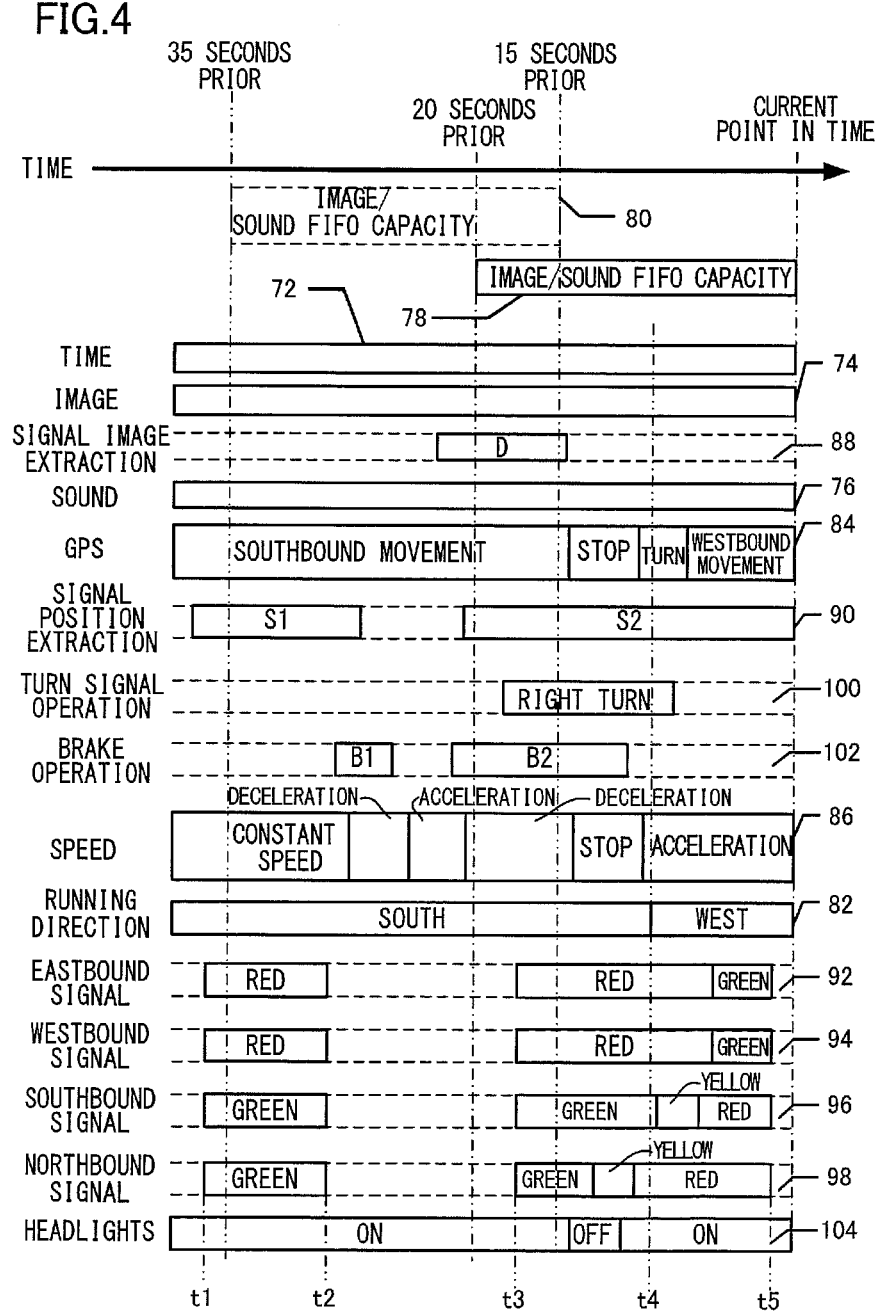
FIG. 4 is a timing chart showing the record obtained by FIFO recording of step S12 of FIG. 2.

FIG. 4 is a timing chart of recording carried out by FIFO recording in the buffer memory in step S12 of FIG. 2. The time base flows from left to right in the diagram to arrive a current time. Time information 72 to be affixed as a timestamp information to be recorded in the nonvolatile file buffer memory of the vehicle control unit 8 is constantly outputted from the clock 18. Image information 74 is constantly outputted from the camera 26 and sound information 76 is constantly outputted from the microphone 28. The non-volatile buffer memory has 20 seconds of recording capacity, and images and sounds from 20 seconds prior up to the current point in time are continuously recorded in the image/sound FIFO capacity 78, which is shown using the current point in time as a reference. Images and sounds from 35 seconds prior up to 15 second prior are continuously recorded in the image/sound FIFO capacity 80, which is shown using 15 seconds prior as a reference.

In other words, considering that the process starts from the image/sound FIFO capacity 80, which is shown using the prior 15 seconds as a reference, new image information 74 and sound information 76 sequentially inputted from 15 seconds prior until the current point in time constantly replaces old image information 74 and sound information 76 in a sequential manner from 35 seconds prior to 20 seconds prior. As a result, with the image/sound FIFO capacity 78, which is shown using the current point in time as a reference, the image information 74 and sound information 76 that are recorded at the image/sound FIFO capacity 80 time points are discarded from 35 seconds prior to 20 seconds prior and are overwritten by the image information 74 and sound information 76 from 15 minutes prior to the current point in time.

It is apparent from the running direction information 82 from the direction detection unit 44 of the drive recorder in FIG. 4 that the vehicle 2 facing south has changed to a westward direction at the time point of time t4. This situation is apparent in more detail from the GPS information 84, and the vehicle 2, which had been moving southward came to a complete stop at about the 15-second time point, began moving again, turned, and then moved westward. As described below, this corresponds to coming to a complete stop at a traffic light, waiting to turn right, and begin moving, and turning right. In FIG. 4, the GPS information 84 is shown in outline form for the sake of simplicity, but the position information of the vehicle 2 is actually shown in terms of the latitude, longitude, elevation, and other numerical values. When the vehicle status described above is viewed using the speed information from the speedometer 46, the vehicle 2, which had been traveling at a constant speed, temporarily decelerates, reaccelerates, then decelerates, stops, begins moving, and accelerates. In FIG. 4, the speed information 86 is shown in outline form for the sake of simplicity, but the position information is actually shown in terms of speed per hour and other numerical values. The running direction information 82, the GPS information 84, and the speed information 86 are constantly inputted to nonvolatile buffer memory in continuous fashion, and in similar fashion to the image information 74 and the sound information 76, time information is affix and the newest 20 seconds of information is sequentially written over old data in a FIFO formation.

The image information 74 constantly undergoes image processing in the vehicle control unit 8, and a check is made to determine whether the signal lamp image will be extracted from the running direction image imaged by the camera 26. This check is carried out using the particularly strong light intensity of the signal lamp in the image as a evidence. With the signal image extraction information 88 of FIG. 4, a signal image extraction signal D showing the signal lamp in the running direction is obtained. In this manner, the sensitivity for receiving radio waves from the signal apparatus 4 is increased in the vehicle short-distance communication unit 24 when the signal image is extracted.

On the other hand, since the GPS information 84 has the position information of the signal apparatus in the map information and the vehicle position on the map is also known, the signal position in a predetermined range in the running direction of the vehicle 2 is extracted from the information of the two. With the signal position extraction information 90 of FIG. 4, a signal position extraction signals S1 and S2 are obtained in their corresponding time frames. In this manner, the sensitivity for receiving radio waves from the signal apparatus 4 is increased in the vehicle short-distance communication unit 24 when signal position has been extracted in the GPS information 84.

Reference signs 92, 94, 96, and 98 in FIG. 4 are signal lamp information successfully received by the vehicle short-distance communication unit 24 and indicate the lighted colors of the signal apparatus 4 for eastbound vehicles, westbound vehicles, southbound vehicles, and northbound vehicles, respectively. For example, the signal lamp information successfully received in the time frame between times t1 and t2, the east-west direction is red in the north-south direction is green. Since the vehicle 2 is moving southward, the running direction is green, the vehicle passes at a constant speed through the intersection in which the signal apparatus 4 disposed. The existence of the signal apparatus 4 is detected in advance using the signal position extraction signal S1 extracted from the GPS information 84, and the receiving sensitivity is increased before the signal lamp information is received. In this area, a signal image is not extracted from the image information.

On the other hand, with the signal lamp information successfully received in the time frame between times t3 and t5, the east-west direction is red and the north-south direction is green at time t3. However, the vehicle 2 decelerates and stops in order to make a right turn at the intersection in which the signal apparatus 4 is located, and as a result of the northbound signal 98 having been changed from yellow to red by time-difference signal control, the driver sees that the flow in the opposing lane has stopped and makes a right turn in a state in which the southbound signal is green. The existence of the signal lamp is detected in advance using the signal position extraction signal S2 extracted from the GPS information 84, and the existence of the signal lamp is also detected in advance using the signal image extraction signal D extracted from the image information 88. Since the signal image extraction signal D is quicker in this case, and the receiving sensitivity is thereby increased before the signal lamp information is received.

The right turn signal in turn signal operation information 100 and brake signals B1 and B2 in brake operation information 102 show the operation history carried out when the vehicle is turned right. It is thus apparent in the history of FIG. 4 that the vehicle 2 properly passes through the intersection in the time frame from t1 to t2, and properly turns right in the time frame t3 to t5. Since the signal lamp information is received for north, south, east, and west directions, it cannot determined by this alone whether the passage was proper or not, but such a determination can be made in combination with the running direction information 82. Headlight information 104 shows the state of headlight illumination, and FIG. 4 shows, e.g., a state in which the headlights are in an ordinarily illuminated state during nighttime operation, and are not illuminated (or dimmed) with the side lights kept illuminated when the vehicle is stopped and waiting to make a right turn at an intersection. The state of headlight illumination is also recorded in FIFO format as history in the drive recorder. As shall be described further below, the on/off state of the headlights can be automatically controlled in coordination with the driver recorder functions.

The signal image extraction information 88, signal position extraction information 90, signal lamp information 92, 94, 96, and 98, the turn signal operation information 100, and the brake operation information 102 are information that exist only when a certain state has occurred, and are not constantly produced in continuous fashion. Therefore, the listed information is recorded in nonvolatile buffer memory in FIFO format so that the oldest unit of information is deleted when the same type of information is generated as a unit. Time information is also affixed to the listed information. Specifically, a single unit of the signal lamp information from, e.g., t1 to t2 recorded in the nonvolatile buffer memory is overwritten by new information as a collective unit when a single unit of the signal lamp information from, e.g., t3 to t5 has been produced. Meaningless information can thereby be prevented from being recorded in the recording area for the listed information.

Figure 5:
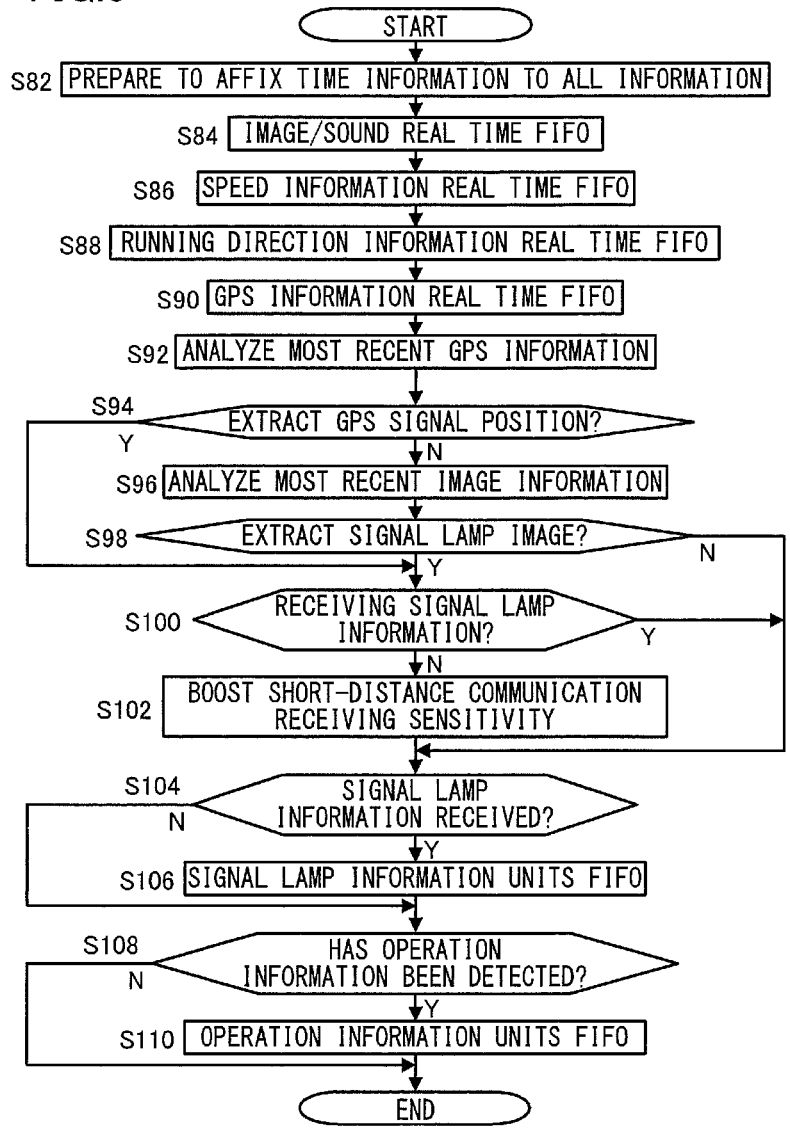
FIG. 5 is a flowchart showing the details of step S12 of FIG. 2.

FIG. 5 is a flowchart showing the details of buffer memory FIFO recording in step S12 of FIG. 2. When the flow starts, preparation is made in step S82 to affix time information to the information. In steps S84, S86, S88, and S90, image/sound information, speed information, running direction information, and GPS information as continuously generated information are recorded in nonvolatile buffer memory in real time in FIFO format.

Next, in step S92, the newest GPS information is analyzed, and a check is then made to determine whether the signal lamp position will be extracted in step S94 within a predetermined distance in the running direction of the vehicle position. If GPS signal position is not extracted in step S94, the process proceeds to step S96, the newest image information is analyzed, and a check is made in step S98 to determine whether an image of the signal lamp in the running direction of the vehicle position will be extracted. When a signal lamp image is to be extracted in step S98, the process proceeds to step S100. Also, when the GPS signal position has been detected in step S94, the process proceeds to directly to step S100. The vehicle short-distance communication unit 24 makes a check in step S100 whether signal lamp information is being received, and if signal lamp information is not being received, the process proceeds to step S102, the receiving sensitivity of the vehicle short-distance communication unit 24 is boosted, and the process proceeds to step S104. The lack of extraction of a signal lamp image in step S98 would mean that a signal lamp could not be detected in advance in steps S94 and S98. Therefore, sensitivity is not boosted and the process proceeds to step S104. If signal lamp information is being received in step S100, this would mean that sensitivity has already been boosted or that signal information is successfully being received without boosting sensitivity. Therefore, in this case as well, the process proceeds to step S104 without sensitivity being boosted.

In step S104, a check is made to determine whether signal lamp information will be received, and if the signal lamp information has been received, the process proceeds to step S106, the signal lamp information thus received is recorded in units in nonvolatile buffer memory in FIFO format, and the process proceeds to step S108. If the signal lamp information could not be received in step S104, the process proceeds directly to step S108.

In step S108, a check is made to determine whether information about turn signal operation, brake operation, or another operation will be detected, and if such is to be detected, the process proceeds to step S110, the detected operation information is recorded in units in nonvolatile buffer memory in a FIFO format, and the flow is ended. The flow is immediately ended when the operation information could not be obtained in step S108.

Figure 6:
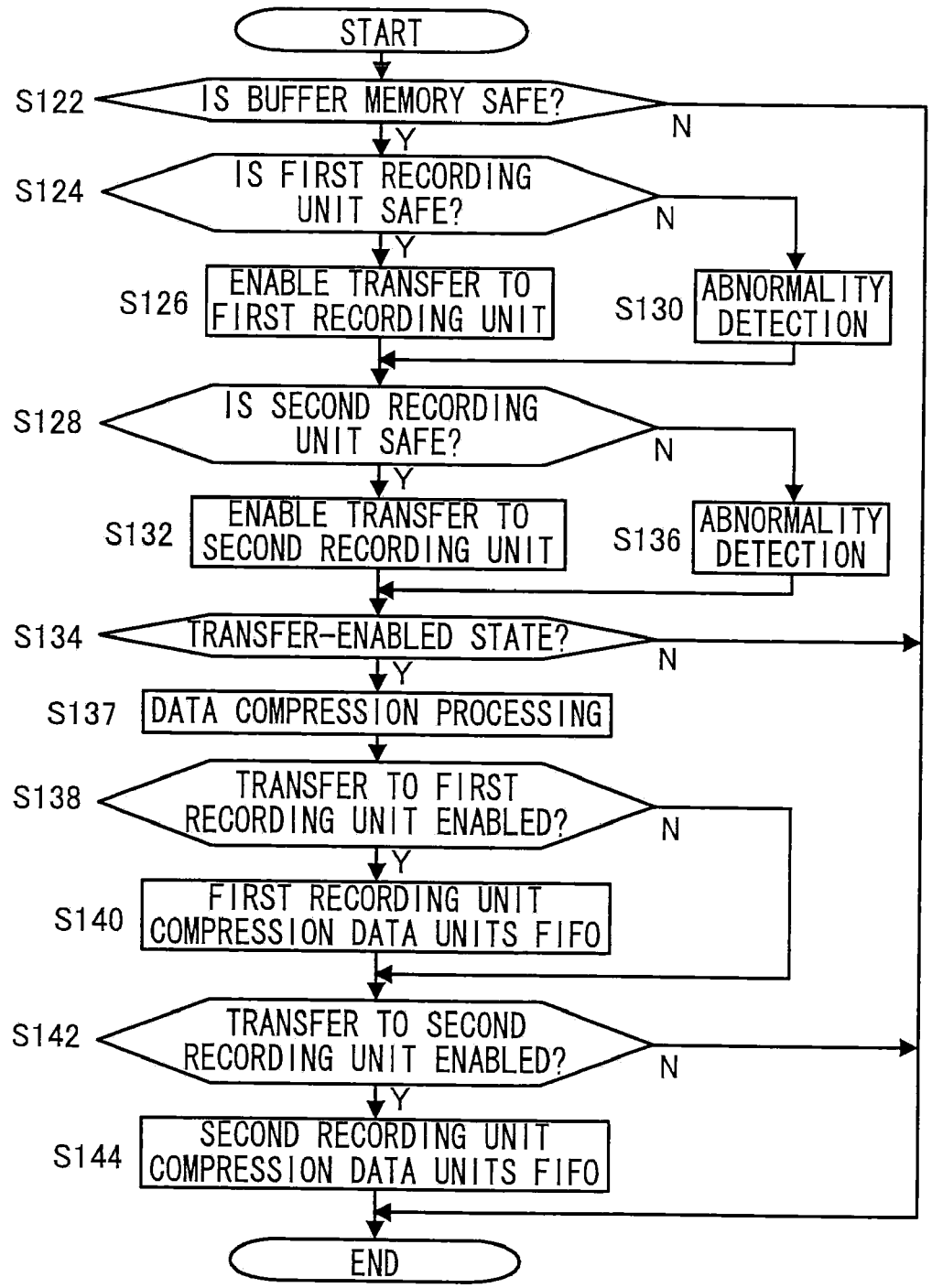
FIG. 6 is a flowchart showing the details of step S24 of FIG. 2.

FIG. 6 is a flowchart showing the details of compression recording in step S24 of FIG. 2. When the flow starts, a check is made in step S122 to determine whether the nonvolatile buffer memory of the vehicle control unit 8 remains safe and undamaged. If so, the process proceeds to step S124, and a check is made to determine whether the first recording unit 32 is safe and undamaged. If safe, the process proceeds to step S126, information transfer to the first recording unit 32 is set in an enabled state, and the process proceeds to step S128. On the other hand, when the first recording unit 32 is not determined to be undamaged in step S124, the process proceeds to step S130, a signal that reports about an abnormal state is outputted, and the process moves to step S128. As shall be apparent, information transfer to the first recording unit 32 is not enabled in this case.

In step S128, a check is made to determine whether the second recording unit 34 is safe and undamaged. If so, the process proceeds to step S132, information transfer to the second recording unit 34 is placed in an enabled state, and the process proceeds to step S134. On the other hand, when the second recording unit 34 is not determined to be undamaged in step S128, the process proceeds to step S136, a signal that reports about an abnormal state is outputted, and the process moves to step S134. Naturally, information transfer to the second recording unit 34 is not enabled in this case.

In step S134, a check is made to determine whether transfer to at least one the first recording unit 32 or the second recording unit 34 is enabled through the process described above. If an enabled state can be confirmed, the process proceeds to step S137 and the digitally watermarked data is compressed. Next, a check is made in step S138 to determine whether transfer to the first recording unit 32 is enabled, and if such is the case, the process proceeds to step S140. In step S140, the data compressed in step S137 is recorded in the first recording unit 32 in data units in FIFO format, and the process proceeds to step S142. The process proceeds directly to step S142 when it cannot be detected in step S138 that transfer to the first recording unit 32 has been enabled.

In step S142, a check is made to determine whether transfer to the second recording unit 34 is enabled, and if so, the process proceeds to step S144. In step S144, the data compressed in step S137 is recorded in the second recording unit 34 in data units in FIFO format, and the flow is ended. The flow is immediately ended when it cannot be detected in step S142 that transfer to the second recording unit 34 is enabled. When the nonvolatile buffer memory is not determined to be safe and undamaged, the functions thereafter are meaningless, and the flow is therefore immediately ended. Furthermore, when it has been detected that transferring is not enabled for the first recording unit 32 or the second recording unit 34 in step S134, the processing following data compression processing is meaningless and the flow is immediately ended.

Figure 7:
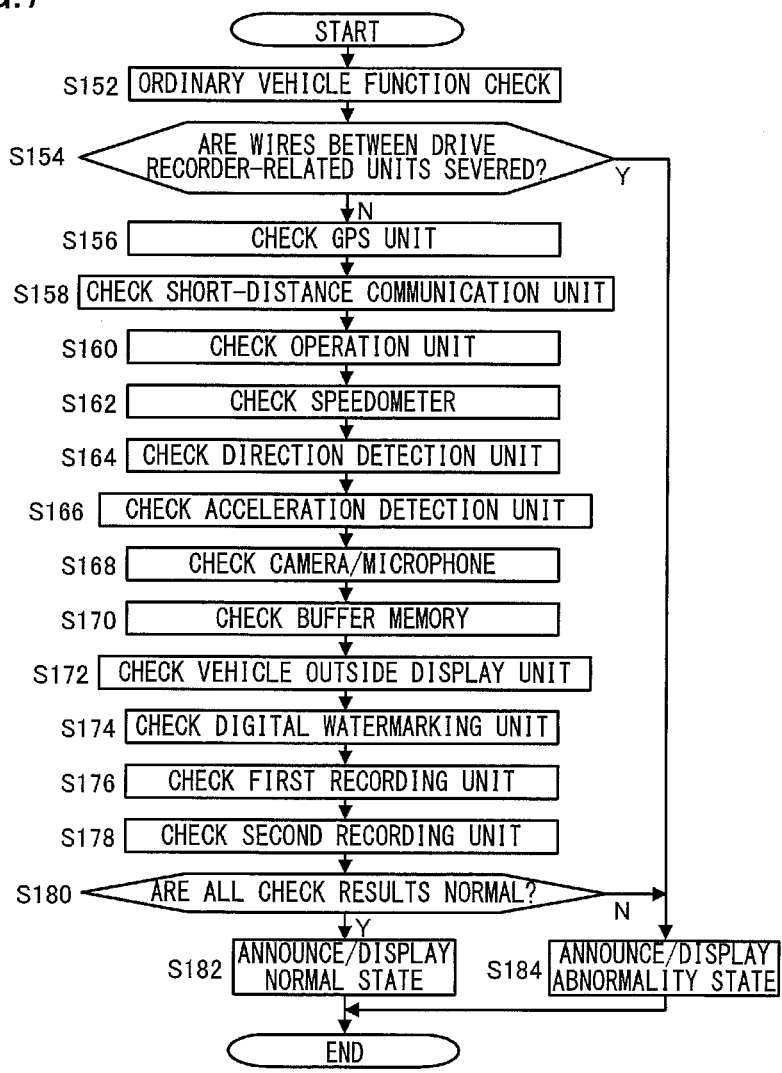
FIG. 7 is a flowchart showing the details of step S2 of FIG. 2.

FIG. 7 is a flowchart showing the details of processing for checking the initial functions in step S2 of FIG. 2. When the flow starts, ordinary vehicle functions are first checked in step S152. Next, the process proceeds to step S154, and a check is made to determine whether the information lines connecting the related components of the drive recorder have been cut. If the lines have not been cut, various checks are made of the related components of the drive recorder in step S156 and thereafter. Specifically, sequentially checked are the GPS unit in step S156, the short-distance communication unit in step S158, the operation unit in step S160, the speedometer in step S162, the direction detection unit in the step S164, the acceleration detection unit in step S166, the camera, the microphone, and other the information acquisition components in step S168.

The nonvolatile buffer memory is checked in step S170, and a check is made to determine whether information from the various information acquisition components described above can be correctly stored in FIFO format. The vehicle outside display unit 50 is furthermore checked in step S172 to confirm whether a link can be made with the vehicle exterior. Operation is confirmed when an accident has occurred by checking the digital watermarking unit in step S174, the first recording unit in step S176, and the second recording unit in S178; and the process proceeds to step S180.

In step S180, a check is made to determine whether the checks noted above are all normal, and if such is the case, the process proceeds to step S182, the fact that operation is normal is announced and displayed, and the flow is ended. The functions can thereby be checked to be normal on a daily basis, and it is possible to prevent in advance a situation in which the drive recorder happens to not function. On the other hand, when some abnormality has been discovered in step S180, the process proceeds to step S184, the corresponding abnormal status is announced and displayed, and the flow is ended. When a severed line is discovered in step S154, the process proceeds directly to step S184 because checks thereafter cannot be guaranteed to be correctly carried out. A cut line is announced and displayed, and the flow is ended.

Figure 8:
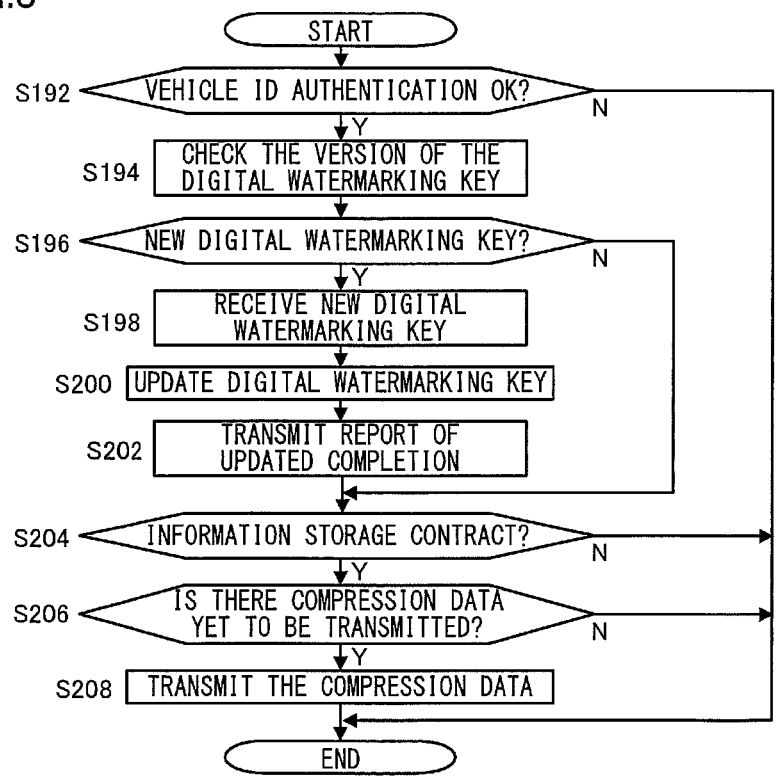
FIG. 8 is a flowchart showing the details of step S16 of FIG. 2.

FIG. 8 is a flowchart showing the details of information exchange processing in step S16 of FIG. 2. When the flow starts, the vehicle ID is first authenticated between the vehicle 2 and the gasoline filling/power feeding station 6 or the ETC 6 in step S192, and when authentication is confirmed, the process proceeds to step S194. In step S194, the version of the digital watermarking key held in the recording unit 14 is checked, and a check is made to determine whether the digital watermarking key must be newly updated at the gasoline filling/power feeding station 6 or ETC 6.

When it has been confirmed in step S196 that a new digital watermark processing key for updating is available, the process proceeds to step S198, and the new digital watermarking key is received from the gasoline filling/power feeding station 6 and the ETC 6. Next, in step S200, the newly received digital watermarking key is used for updating the digital watermarking key in the recording unit 14. A report indicating that the digital watermarking key has been updated is transmitted to the gasoline filling/power feeding station 6 or the ETC 6 in step S202, and the process proceeds to step S204. On the other hand, the process proceeds directly to step S204 in the case that there is no confirmation that a new digital watermarking key is available for updating in step S196.

In step S204, a check is made to determine whether an information storage contract for transmitting, collecting, and managing driver recorder information of the first recording unit 32 or the second recording unit 34 has been concluded with the ETC management center or the like. When it has been confirmed in step S204 that such contract information is recorded in the recording unit 14, the process proceeds to step S206, and a check is made to determine whether compressed data yet to be transmitted is present in the first recording unit 32 or the second recording unit 34. If corresponding data is present, the process proceeds to step S208, the data is transmitted to the ETC 6 or the like, and the flow is ended. In the case that the information storage contract cannot be confirmed in step S204, or in the case that there is no compressed data yet to be transmitted in step S206, the flow is immediately ended. Furthermore, in the case that the vehicle ID cannot be authenticated in step S192, the flow is immediately ended.

Second Example

Figure 9:
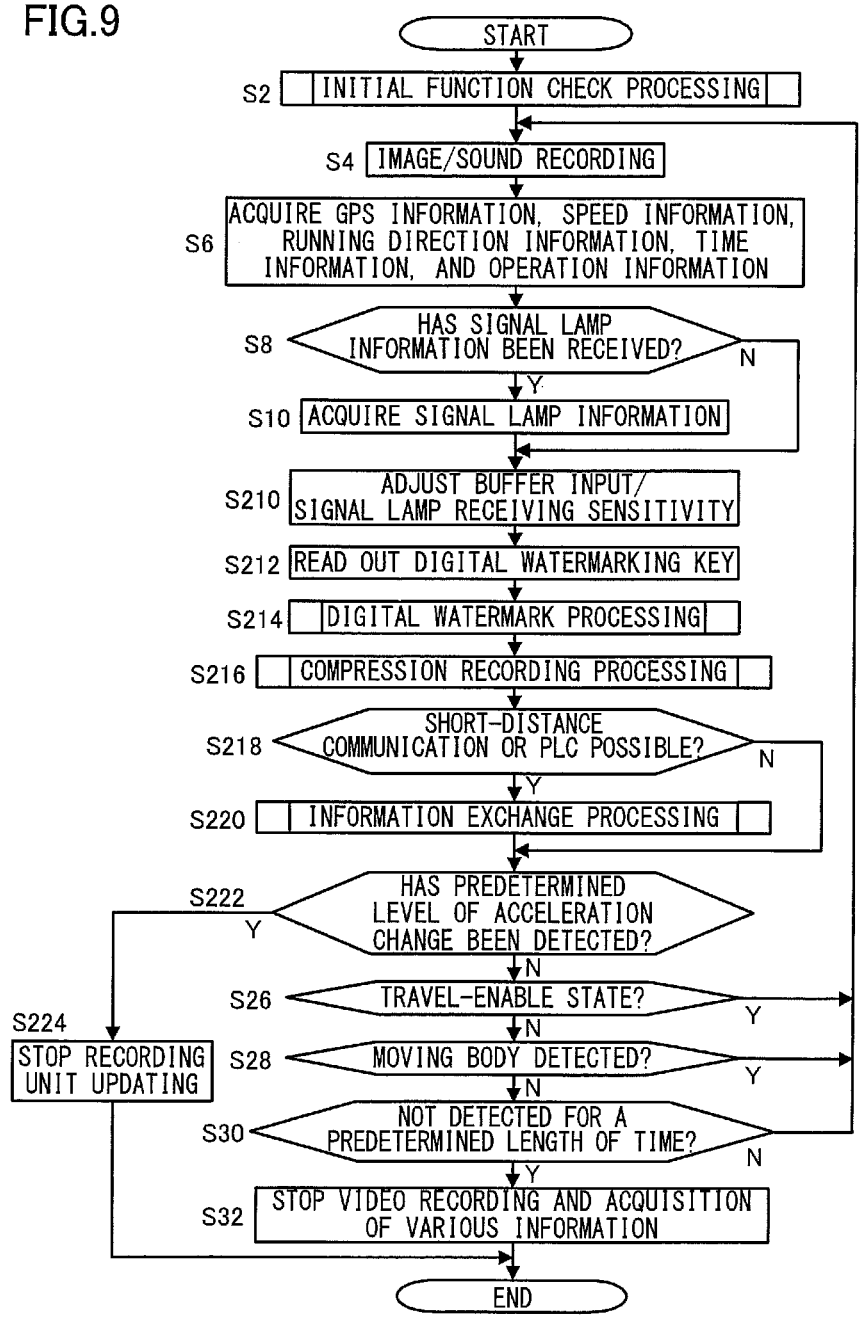
FIG. 9 is a basic flowchart (Example 2) showing the functions of the vehicle control unit in the second example of the drive recorder system according to the present invention.

FIG. 9 is a basic flowchart showing the functions of the vehicle control unit 8 in the second example of the drive recorder system according to an embodiment of the present invention. The second example has essentially the same configuration as that of the first example of FIG. 1, except that the recording capacity of the first recording unit 32 in the second example has a cumulative recording capacity for 1000 events for digitally compressed video information, including signal lamp information, in addition to the FIFO capacity for 10 events for digitally compressed video information, whereas the first recording unit 32 in the first example has a capacity of 10 events of digitally compressed video information. The second recording unit 34 can have a FIFO capacity of only 10 events of digitally compressed video information in the second example as well, but may be arbitrarily configured with a larger capacity.

The flow of FIG. 9 is essentially the same as the flow of FIG. 2, and the same step numbers are used for the same steps and a description thereof is omitted. The portions of the flow of FIG. 9 that differ from the flow of FIG. 2 are the steps shown in boldface. In FIG. 2, the digital watermarking of step S22 and the compression recording of step S24 are carried out after a manual operation or a predetermined acceleration or greater has been detected in step S18, but in FIG. 9, in contrast, the obtained information is inputted to the buffer in step S210, the processing after reading the digital watermarking key of step S212 is then immediately carried out, and compressed data is constantly transferred to the first recording unit 32 and the second recording unit 34. The information of the nonvolatile buffer memory is thereby constantly backed up by a plurality of recording units, and there is a greater possibility that any of the nonvolatile buffer memory, the first recording unit 32, and the second recording unit 34 of the vehicle control unit 8 will avoid damage when an accident occurs. Since the digitally compressed video information including signal lamp information is cumulatively recorded, about 1000 events remain in the intersection-passage history of the vehicle 2. The processing of the intersection-passage history is later described.

The steps that differ from FIG. 2 in FIG. 9 are described in detail below. In step S210 as described above, the obtained information is inputted to the buffer memory, and in contrast to step S12 of FIG. 2 in which the FIFO recording was made to a nonvolatile buffer memory having 20 seconds of capacity, step S210 temporarily inputs the obtained data to the buffer memory for later processing. In step S210, the sensitivity of the short-distance communication unit is adjusted for receiving signal lamp [information] such as that in steps S94 to S102 of FIG. 5. This adjustment boosts the receiving sensitivity and facilitates reception at the next step S8 when it is detected by GPS information or image processing that a signal lamp is being approached even when signal lamp information has not been received in step S8. Next, the digital watermarking key is read out in step S212, and digital watermarking is carried out in step S214 to embed various digital watermarking data in the image/sound information of a video on the basis of the digital watermarking key. Next, the process proceeds to step S216, the image/sound information with an embedded digital watermark is compressed and recorded in the first recording unit 32 and second recording unit 34, and the process proceeds to step S218.

In step S218, a check is made to determine whether a communication counterpart is in short-distance range capable communication using the vehicle short-distance communication unit 24. In step S218, a check is also made to determine whether communication by power line communication (PLC) is possible. The communication counterpart in this case is, e.g., a gasoline filling/power feeding station 6 or an ETC 6, and the signal apparatus 4 also corresponds to a communication counterpart as long as communication other than receiving signal lamp information is possible.

When it has been determined in step S218 that short-distance communication or power line communication is possible, the process proceeds to step S220, information exchange processing is carried out by short-distance communication or power line communication, and the process proceeds to step S222. The details of information exchange processing in step S220 of this case is reception of update information of digital watermarking key information and transmission of drive encoder information recorded in the first recording unit 32. These details are later described. The process moves directly to step S222 if it is determined in step S218 that short-distance communication and power line communication is not possible.

In step S222, a check is made to determine whether a predetermined change acceleration or greater has been detected by the acceleration detection unit 30. Here, in the same manner as step S18 of FIG. 2, the predetermined change in acceleration or greater is a rapid deceleration in the same direction such as in a head-on collision, a change in the running direction due to a collision or another change in acceleration while the vehicle is traveling, and includes collision impact or the like from another vehicle when the vehicle 2 itself is stopped. When a predetermined change in acceleration or greater is not detected in step S222, the process proceeds to step S26. Step S26 and thereafter are the same as those in FIG. 2, and a description thereof is omitted.

On the other hand, when a predetermined change in acceleration or greater has been detected in step S222, the process proceeds to step S224, the updating of the first recording unit 32 and second recording unit 34 is stopped, and the flow is ended.

Figure 10:
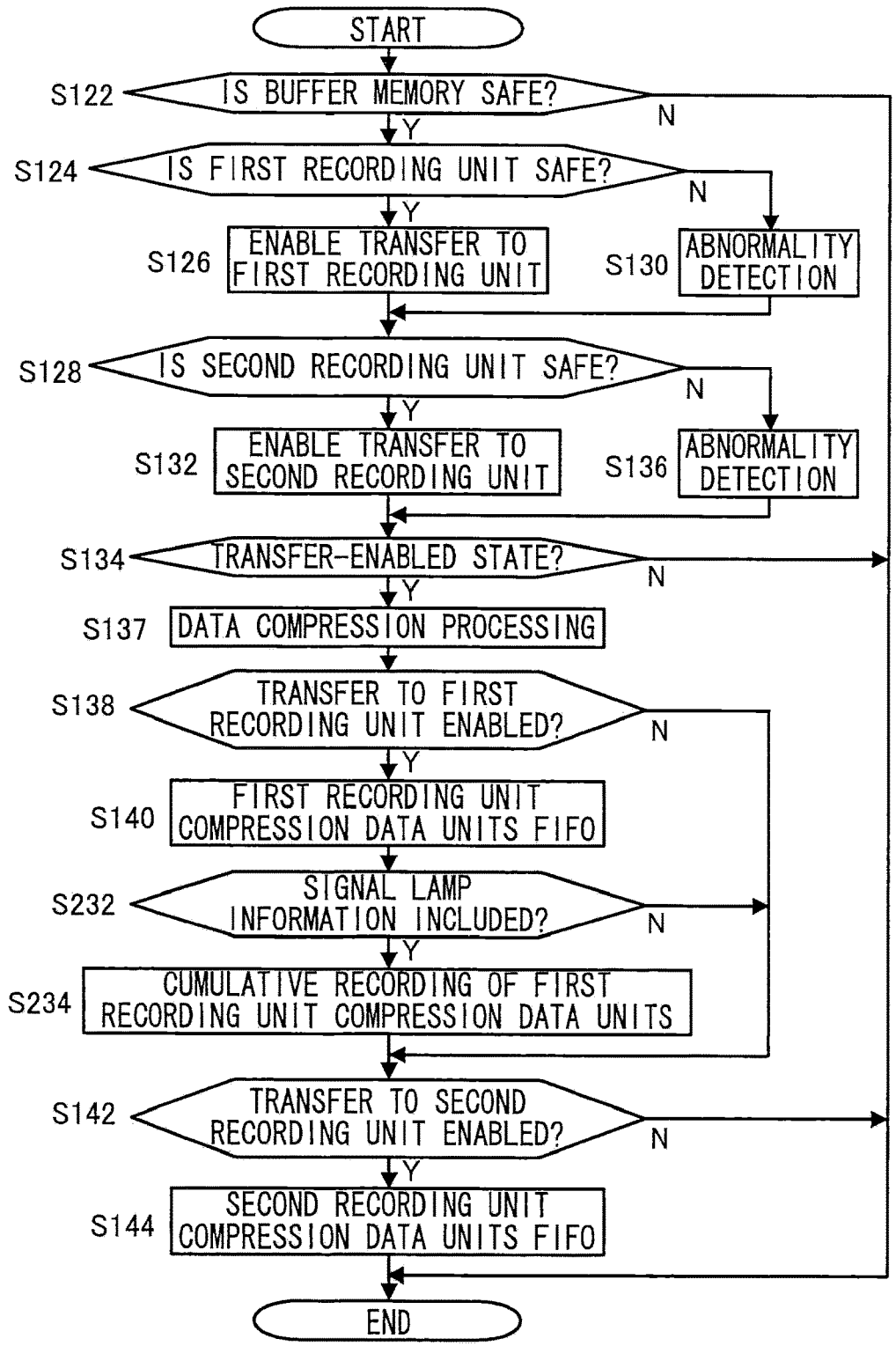
FIG. 10 is a flowchart showing the details of step S216 of FIG. 9.

FIG. 10 is a flowchart showing the details of compression recording in step S216 of FIG. 9. The flow of FIG. 10 is essentially the same as the flow of FIG. 6, except for the steps shown in bold. Therefore, the same step numbers are used for the same steps and a description thereof is omitted. In the flow of FIG. 10, after it has been detected in step S138 that transfer to the first recording unit 32 is enabled and FIFO recording has been carried out in data units in step S140, a check is made in step S232 to determine whether signal lamp information is included in the recorded data.

When signal lamp information is detected to be included in the data in step S232, the process proceeds to step S234, the digitally compressed video data including the signal lamp information is cumulatively recorded in the cumulative recording portion having a capacity of 1000 events in the first recording unit 32, and the process proceeds to step S142. In this manner, the digitally compressed video data including the signal lamp information is cumulatively recorded and stored away even when 10 or more new data events occur after the data has been recorded, as long as the FIFO format is not destroyed and the 1000 event capacity does not become full. When it cannot be detected in step S138 that transfer to the first recording unit is enabled, the process proceeds directly to step S142. The operations in step S142 and thereafter are the same as those in FIG. 6 and a description is therefore omitted.

Figure 11:
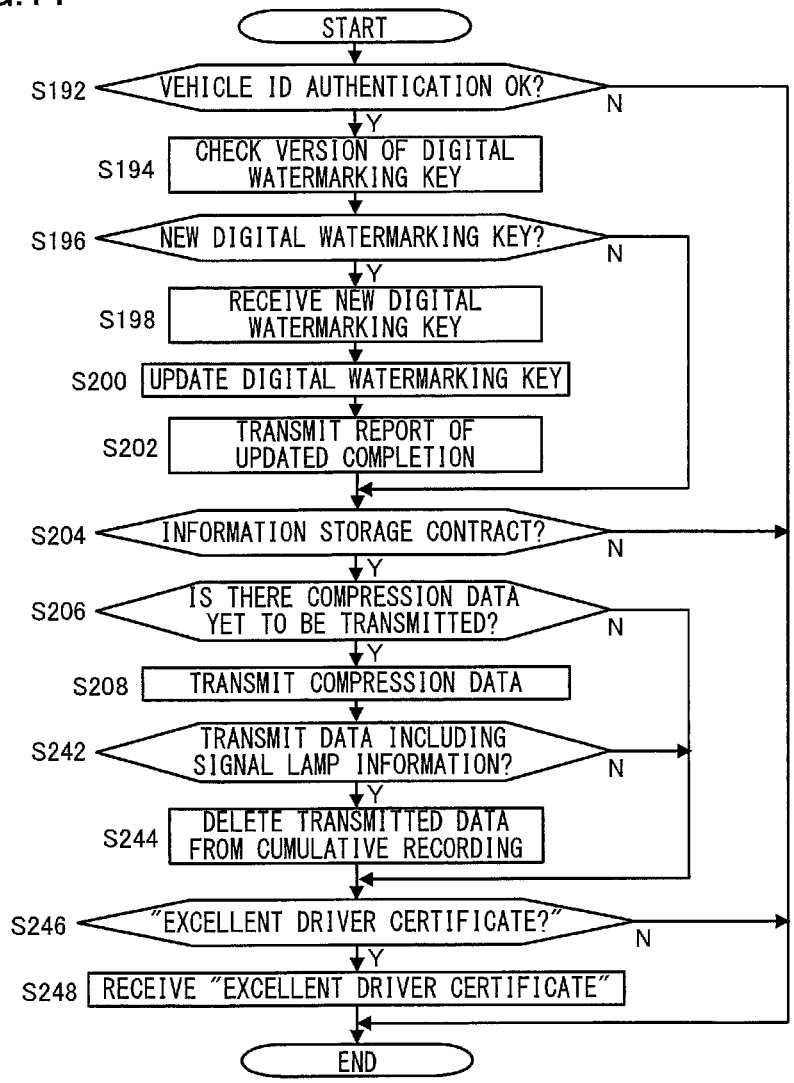
FIG. 11 is a flowchart showing the details of step S220 of FIG. 9.

FIG. 11 is a flowchart showing the details of information exchange processing in step S220 of FIG. 9. The flow of FIG. 11 is essentially the same as the flow of FIG. 8, except for the steps shown in bold. Therefore, the same step numbers are used for the same steps and a description thereof is omitted. In the flow of FIG. 11, after compressed data yet to be transmitted has been transmitted in step S208, the process proceeds to step S242, and a check is made to determine whether the data transmitted in step S208 is data that includes signal lamp information. If such is the case, the process proceeds to step S244, data already transmitted is deleted from the 1000-event capacity cumulative recording portion in the first recording unit 32, and the process proceeds to step S246. Since the cumulative recording portion of the first recording unit 32 does not discard old data due by FIFO, data is deleted in this manner after transmission and capacity is made available. On the other hand, if transmission of data containing signal lamp information is not detected in step S242, the process proceeds directly to step S246. In FIG. 11, the flow is not ended when yet-to-be transmitted data does not exist in step S206, and the process proceeds to step S246.

Intersection passage history data transmitted from the vehicle 2 in step S208 is automatically transmitted to the ETC short-distance communication unit 52, and the data is then transferred from the ETC system communication unit 56 to the ETC management center. The long-term intersection passage data of the contact holder is analyzed in the ETC management center, and when a predetermined level or greater of legal passages within a predetermined period can be confirmed, and an "Excellent Driver Certificate" is issued for the predetermined period. A check is made in step S246 to determine whether such an "Excellent Driver Certificate" has been prepared in the ETC management center, and if such is the case, the process proceeds to step S248, the "Excellent Driver Certificate" is received, and the flow is ended. The "Excellent Driver Certificate" is stored in the recording unit 14 of the vehicle 2 and can be used as an extenuating factor in a minor violation in a police traffic stop in an intersection. Therefore, the incentive is increased as good intersection passage results constantly accumulate, and the effect of preventing traffic accidents in advance can be anticipated. On the other hand, the flow immediately ends when it is confirmed in step S246 that results have not reached a level at which an "Excellent Driver Certificate" can be issued.

Figure 12:
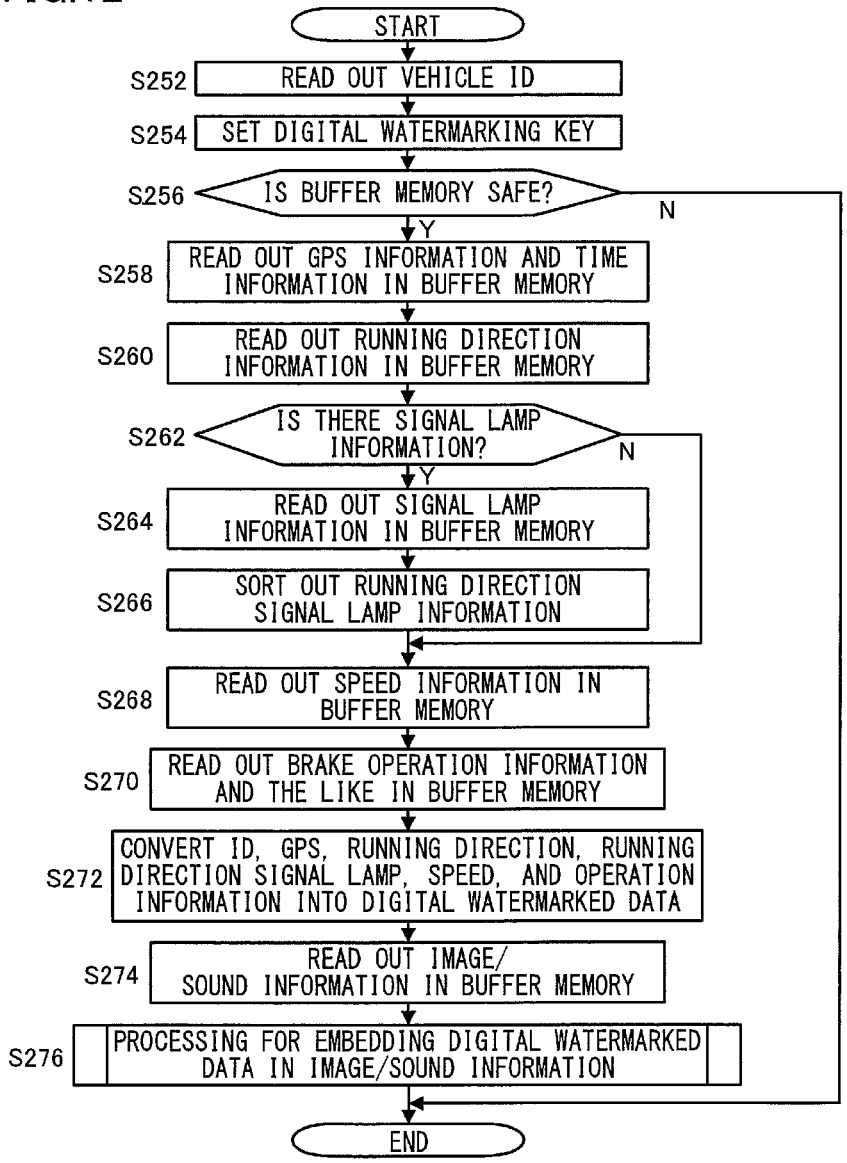
FIG. 12 is a flowchart showing the details of digital watermarking in step S214 of FIG. 9.

FIG. 12 is a flowchart showing the details of digital watermarking in step S214 of FIG. 9. The flow is essentially the same as the flow of FIG. 3, except that the target of processing is not the 20 seconds of traveling data recorded in FIFO format, but is rather the traveling data inputted to the buffer in the smallest processing units. When the flow starts, the ID data of the vehicle 2 is read out from the recording unit 14 in step S252.

Next, in step S254, the digital watermarking key read out in step S212 of FIG. 9 is set in the digital watermarking unit 48. Next, in step S256, a check is made to determine whether the nonvolatile buffer memory of the vehicle control unit 8 is safe. This is because any following processing has no meaning if the buffer memory has been destroyed in an accident or the like. When it has been confirmed that the buffer memory is safe in step S256, the process proceeds to step S258, and GPS information and time information in the buffer memory is read out. Furthermore, in step S260, the running direction information in the buffer memory is read out, and the process proceeds to step S262.

In step S262, a check is made to determine whether signal lamp information exists in the buffer memory. The existence of signal lamp information indicates that the vehicle 2 is in the vicinity of an intersection during acquisition of data to be processed. Therefore, the process proceeds to step S264 and the signal lamp information in the buffer memory is extracted. In step S266, the signal lamp information in the running direction at each instant of time is sorted out with reference to the running direction information at each instant of time read out in step S260, and the process moves to step S268. On the other hand, the process moves directly to step S268 when it has been determined that signal lamp information does not exist in the buffer memory in step S262.

In step S268, the speed information in the buffer memory is read out, and brake operation information and other operation information is read out in step S270. Next, in step S272, the time information obtained in step S258 is added to the various items of information obtained in steps S252, S258, S260, S266, S268, and S270, and converted to digital watermark data for embedding. In step S274, the image and sound information in the buffer memory are read out and fetched, and the process moves to step S276. In step S276, the processing for embedding digital watermark data in the image and sound information is carried in accordance with the settings in step S254 on the basis of the information obtained in steps S272 and S274, and when this is completed, the flow is ended. In the case that the buffer memory is not detected to be safe in step S256, the flow is immediately ended.

The first and second examples described above differ in terms of hardware only in the recording capacity of the first recording unit 32, so the two do not necessarily need to be configured as separate vehicles 2. For example, it is possible to use a configuration in which the functions of the first example are implemented based on the second example in which the first recording unit 32 has a large recording capacity, and it is also possible to use the functions of the first example as an "event recording mode" and the functions of the second example as a "continuous recording mode" in a single vehicle 2 and to make the two modes freely selectable.

Implementation of the various characteristics of the present invention is not limited to the examples described above. For example, in step S56 of FIG. 3 and step S266 of FIG. 12, signal lamp information in the running direction is sorted out from the signal lamp information of each direction on the basis of the running direction information of the vehicle 2. However, instead of the above, it is also possible, e.g., to complete the sorting out of the signal lamp information of the running direction in the buffer memory FIFO recording stage of FIG. 5 on the basis of the running direction information recorded in step S88 at the stage when the signal lamp information has been detected to have been received in step S104, and to record the signal lamp information of the running direction thus sorted out in units in a FIFO format.

Third Example

Figure 13:
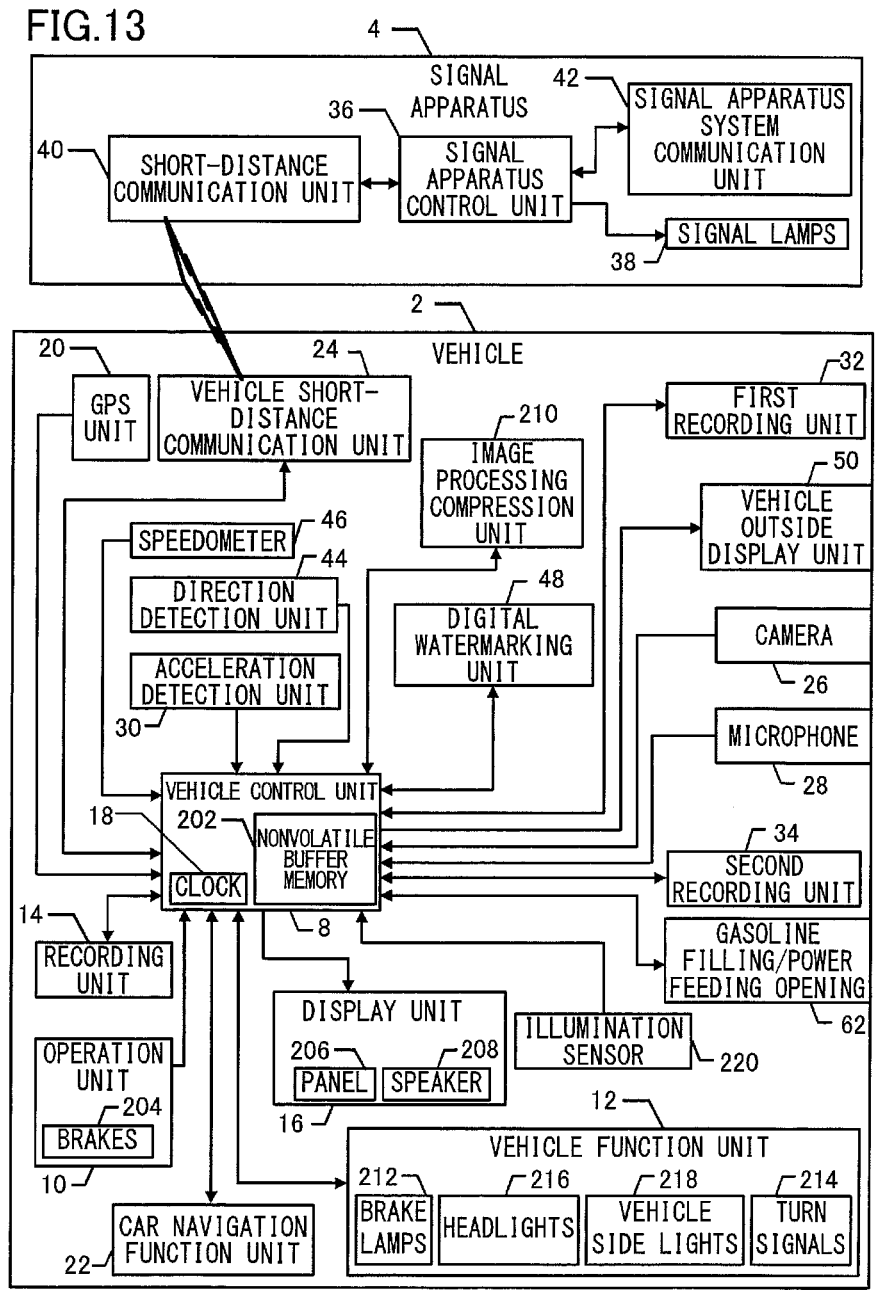
FIG. 13 is a block view (Example 3) showing the third example of the drive recorder system according to the present invention.

FIG. 13 is a block diagram showing a third example of the drive recorder system according to an embodiment of the present invention. The third example has essentially the same configuration as that of the first example of FIG. 1. Therefore, the same reference signs are used for the same portions, and a description thereof is omitted if such a description is not particularly required. In FIG. 13, there are portions shown with a more detailed configuration than that of FIG. 1, but such details are also provided in the first example, and unless otherwise noted, such details are not a unique configuration provided to the third example alone. In FIG. 13, the gasoline filling/power feeding station 6 of FIG. 1 is not shown for the sake of simplicity, but the third example also has the same configuration.

FIG. 13 shows the nonvolatile buffer memory 202 of the vehicle control unit 8 and shows the brakes 204 of the operation unit 10. However, these have the configuration described in the first and second examples. A display panel 206 and a speaker 208 are shown in the display unit 16, but as described above, reporting relating to the functions of the display unit 16 may be carried out by announcement, and the speaker 208 carries out the reporting function when such an announcement is made. FIG. 13 shows an image processing compression unit 210, which is a dedicated-function unit for implementing functions carried out by the vehicle control unit 8 in FIG. 1. Therefore, in the third example, the image processing and compression function in the flow described above are implemented by the image processing compression unit 210 is coordination with the vehicle control unit 8.

FIG. 13 shows the details of the configuration related to the lamps of the vehicle 2 in the vehicle function unit 12, and brake lamps 212 and turn signals 214 are switched on or made to switch on and off when the brake operation or turn signal operation described above has been carried out. The headlights 216 and vehicle side lights 218 are shown in the vehicle function unit 12. The third example of FIG. 13 is furthermore provided with an illumination sensor 220, whereby the external brightness can be measured, and approaching dusk, entry by the vehicle into a tunnel, or other situations are detected. The third example is provided with functions for automatically controlling the headlights 216 and vehicle side lights 218 in coordination with the illumination sensor 220 and the drive recorder system, as described hereinbelow.

Figure 14:
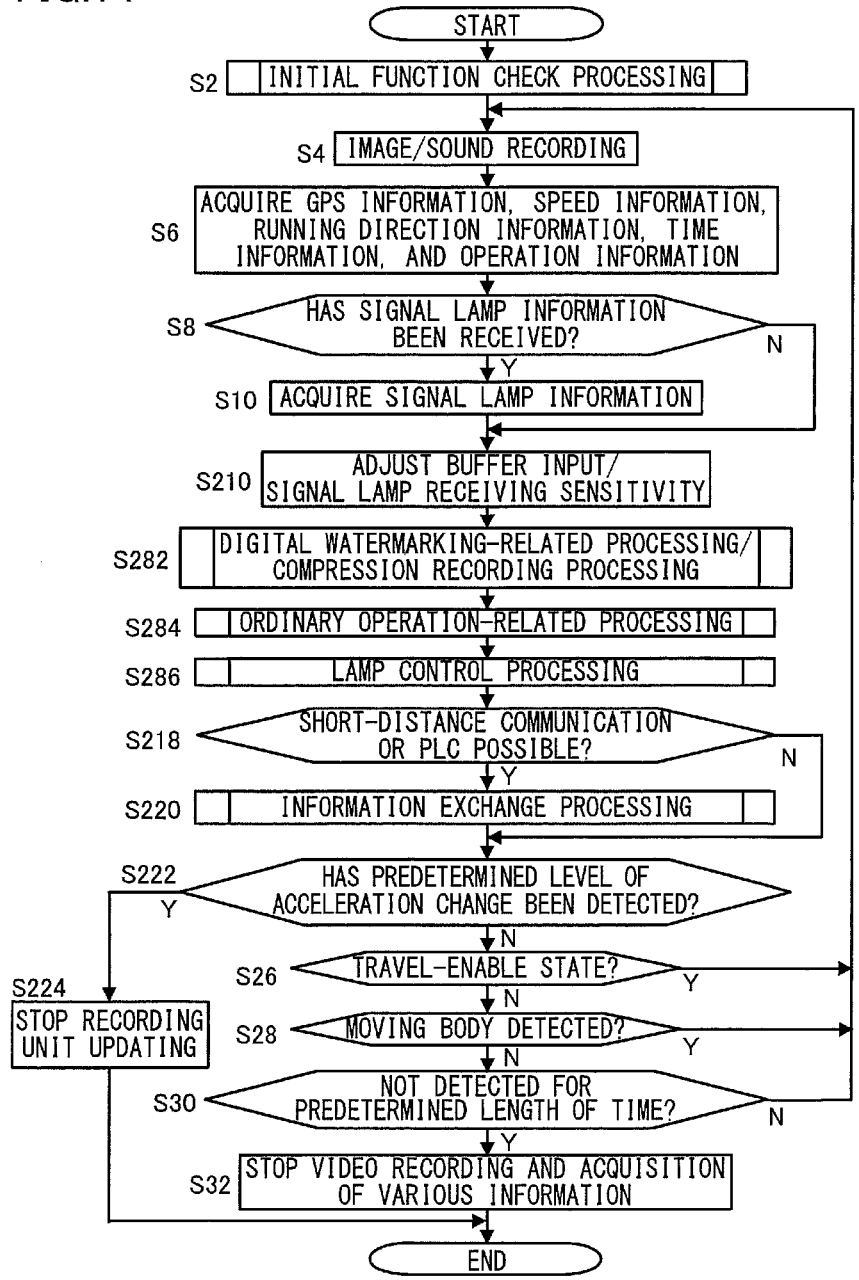
FIG. 14 is a basic flowchart showing the functions of the vehicle control unit in the third example in FIG. 13.

FIG. 14 is a basic flowchart showing the functions of the vehicle control unit 8 in the third example of FIG. 13. The details are essentially the same as the flowchart of FIG. 9, the same step numbers are used for the same steps, and a description is omitted. The portions of the flow of FIG. 14 that differ from the flow of FIG. 9 are that functions for automatically controlling the headlights 216 and the vehicle side lights 218 are provided, and the steps shown in bold correspond thereto. The digital watermark-related processing/compression recording of step S282 is shown to be a grouping of steps S210 to S216 of FIG. 9, and the details thereof are the same as FIG. 9.

When the compression recording is ended in step S282, the process proceeds to the processing related to ordinary operation in step S284. Here, processing is carried out in relation to ordinary operation that corresponds to the operation unit 10, the load on the vehicle 2, or the change in acceleration. When such processing ends, the process begins the lamp control processing of step S286. The details of this processing are described further below. Next, the process proceeds to step S218, and the processing thereafter is the same as FIG. 9. As long the vehicle 2 is in a travel-enabled state, the process returns from step S26 to step S4 and the flow is repeated, at which point the process passes through steps S282 to S286. Therefore, in these steps, processing that corresponds to the most recent change in state is carried out. The same applies to lamp control processing, and automatic control is carried out for turning the headlights 216 and vehicle side lights 218 on and off in immediate response to changing conditions of the drive recorder system and the illumination sensor 220 at the each point in time that the process arrives at step S286 in accompaniment with the repeating flow.

Figure 15:
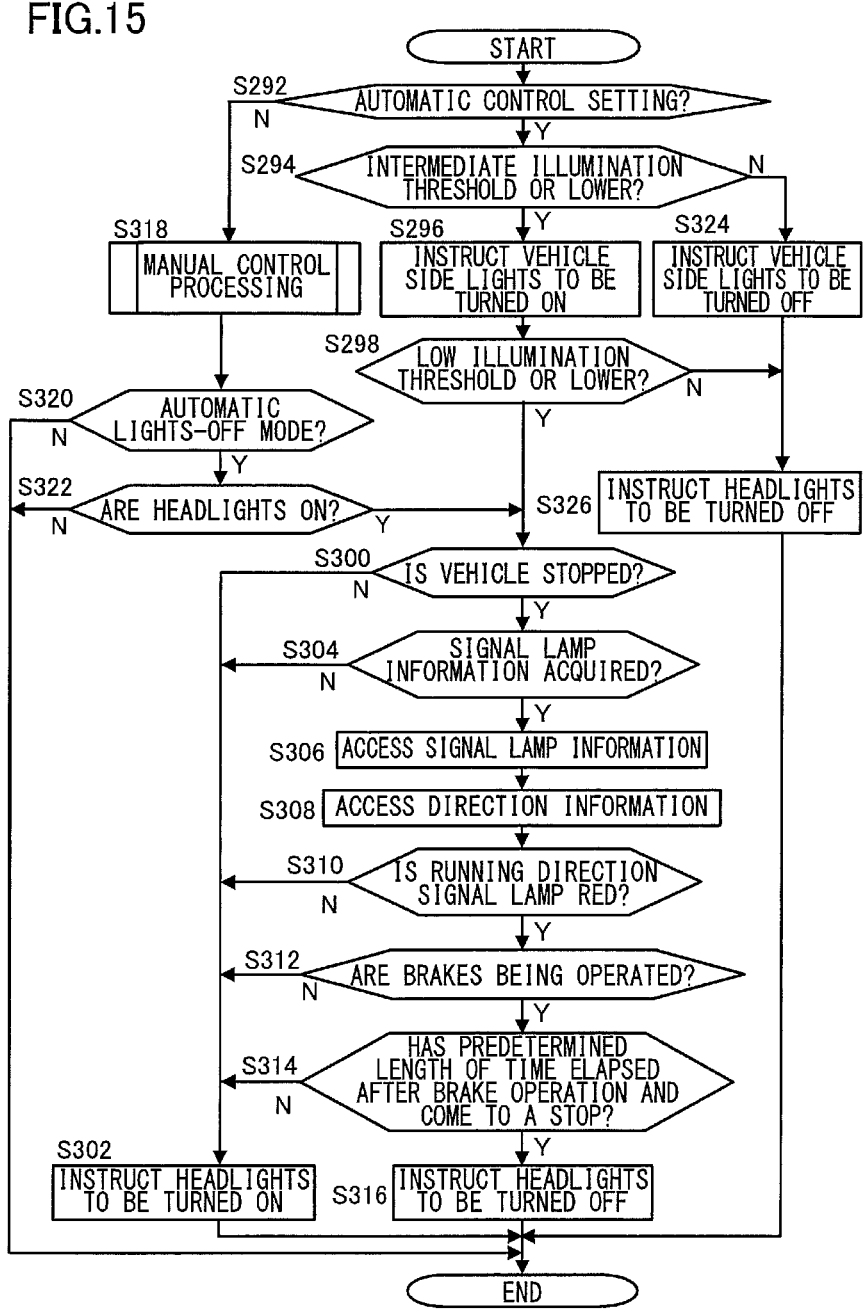
FIG. 15 is a flowchart showing the details of step S286 of FIG. 14.

FIG. 15 is a flowchart showing the details of the lamp control processing in step S286 of FIG. 14. When the flow starts, a check is made in step S292 to determine whether lamp-related control of the vehicle 2 is set to automatic control by the operation unit 10. The process proceeds to step S294 if automatic control is set, and a check is made to determine whether the brightness outside the vehicle as detected by the illumination sensor 220 is at an intermediate illumination threshold or less. The intermediate illumination threshold is a threshold illumination at which it is determined that the vehicle side lights 218 should be turned on for safety during evening hours. When the illumination level is determined in step S294 to be at the intermediate illumination threshold or less, the process proceeds to step S296, the vehicle side lights 218 are automatically turned on, and the process proceeds to step S298.

In step S298, a check is made to determine whether the brightness outside the vehicle as detected by the illumination sensor 220 is at a low illumination threshold or less. The low illumination threshold is nighttime, entry into a tunnel, or another state, and is a threshold illumination at which it is determined that the headlights 216 should be turned on in addition to the vehicle side lights 218. When conditions are determined to be applicable, the process proceeds to step S300.

In step S300, a check is made to determine whether the vehicle 2 is stopped, and if the vehicle is not stopped, this means that the vehicle is traveling. Therefore, the process proceeds to step S302, the headlights are directed to be immediately turned on, and the flow is ended. As described above, when the lamp control processing of FIG. 15 is ended, the process proceeds to step S218 of FIG. 14 and thereafter, the flow is repeated as long as the vehicle 2 is in a travel-enabled state, and the flow of FIG. 15 is restarted each time the process arrives at step S286. Therefore, the flow of FIG. 15 is repeated and made to function for a short time, automatic control is carried out in that a check is made to determine whether conditions are such that, e.g., the headlights 216 should be turned off and whether the headlights should be turned on again after having been turned off, in immediate response to changing conditions of the drive recorder system and the illumination sensor 220. Next, such control will be described next on the basis of the functions of step S300 and thereafter.

When it has been detected in step S300 that the vehicle is stopped, the process proceeds to step S304, and a check is made to determine whether the vehicle short-distance communication unit 24 has acquired signal lamp information in the drive recorder function. If the information has been acquired, the process proceeds to step S306 and the information is accessed. The information of the direction detection unit 44 in the drive recorder function is accessed in step S308, and the process proceeds to step S310. Since the color of the signal lamps change in the running direction of the vehicle, the information is accessed in step S310 and a check is made to determine whether the color is red.

When it has been detected in step S310 that the signal lamp in the running direction is red, the process proceeds to step S312 and a check is made to determine whether the brakes 204 are being operated. If the brakes are being operated, the process proceeds to step S314, and a check is made to determine whether a predetermined length of time (e.g., two seconds) has elapsed after the vehicle has stopped due to a braking operation. If this is the case, the process proceeds to step S316, the headlights are directed to be turned off, and the flow is ended. In other words, the headlights 216 are directed to be automatically turned off when the signal in the running direction is red, the brakes 204 are being operated to keep the vehicle stopped, two seconds have elapsed, and the driver desires to turn off the headlights 216 as courtesy at an intersection. In this case, if the process arrives at step S316 for the first time after the vehicle has stopped, then the headlights 216 were previously turned on in step S302 and are therefore directed to be turned off. In contrast, the headlights 216 are kept off if the headlights have already been directed to be turned off in step S316, the state has been maintained, and the process has again arrived at step S316 by repeating the flow.

On the other hand, when the signal lamp information has been acquired in step S304, the process proceeds to step S302 even when the vehicle is stopped, and the headlights are directed to turn on. In this case as well, the headlights 216 are kept turned on if the headlights 216 have previously been set in an on state by step S302. This means that the headlights are not automatically turned off and are left up to the intentions of the driver because the headlights 216 are not required to be turned off at least for the sake of courtesy when the vehicle 2 is stopped in a location without a signal lamp, for example. On the other hand, when the headlights 216 have previously been turned off in step S316 and the process has arrived at step S302 via step S304, the headlights 216 are turned on because it is appropriate to stop automatically turning off of the headlights 216 for operating safety when signal lamp information could not be obtained for some reason.

When the signal lamp information is not red in step S310, the process proceeds to step S302 even when the vehicle is stopped, and headlights are directed to turn on. In this case as well, the on state of the headlights 216 is continued if the headlights 216 have been previously set in an on state in step S302. This is because it is inappropriate to automatically turn off the headlights 216 even if the vehicle 2 is stopped in case that the signal lamp is not red. On the other hand, the headlights 216 are turned on when the headlights 216 have previously been set in an off state in step S316 and the process has arrived at step S302 via the step S310. This is because the situation corresponds to the case in which the signal lamp has changed from red to green, and in such a case, it is appropriate to turn on the headlights 216 for operational safety regardless of the reason the driver has operated the brakes. In the case that the driver is slow to realize a change in the signal lamp and the brake operation has not been released, it is possible that an oncoming vehicle has started moving because the signal lamp has changed and it would be dangerous to keep the headlights 216 turned off.

If the brakes are not being operated in step S312, the process proceeds to step S302 even if the signal lamp in the running direction is red, and the headlights are directed to turn on. In this case as well, the on state of the headlights 216 is continued if the headlights 216 have been previously set in an on state in step S302. This is because if the brakes are not being operated, there is potential danger in automatically turning off the headlights 216 when the signal lamp is red. On the other hand, the headlights 216 are turned on when the headlights 216 have previously been set in an off state in step S316 and the process has arrived at step S302 via the step S312. This is because there is a possibility that the vehicle 2 will move and it is appropriate to quickly turn on the headlights 216 when brake operation has stopped, regardless of the signal being red in the running direction.

If a predetermined time (e.g., two seconds) has not elapsed in step S314 after the vehicle 2 has come to a stop by brake operation, the process proceeds to step S302 even if the brakes are being operated, and the headlights are directed to turn on. In this case as well, the on state of the headlights 216 is continued if the headlights 216 have been previously set in an on state in step S302. This is because it is possible that the signal lamp will change from red to green immediately after the brakes have been operated and it is inappropriate to immediately instruct the headlights 216 to turn off immediately after the brakes have been operated. This is in contrast to the case in which the process proceeds to step S302 immediately after brake operation has been ended in step S312 and the headlights are directed to turn on. The case does not exist in which the headlights 216 have been previously set in an off state in step S316 and the process arrives at step S302 via step S314.

The process moves to step S318 and manual control processing is carried out when the automatic control setting by the operation unit 10 cannot be detected in step S292 in relation to lamp-related control of the vehicle 2. This is processing that corresponds to the case in which the lamp-related on and off operations are carried out manually. A check is made in step S320 to determine whether the automatic turn-off mode of the headlights 216 has been set. The automatic turn-off mode is a mode for automatically turning off the headlights for the sake of courtesy at an intersection or the like, even when the headlights 216 have been turned on manually. If this mode is not set, the flow is immediately ended. On the other hand, when it has been detected in step S320 that the automatic turn-off mode is set, the process proceeds to step S322, and a check is made to determine whether the operation unit 10 is set in the headlights-on position. If the operation unit is set in the on position, the flow is immediately ended.

In contrast, in the case that the operation unit 10 is detected to be set in the headlights-on position in step S322, the process proceeds to step S300, and the same automatic control for turning off the headlights when the vehicle is stopped in a location in which a signal lamp is installed is carried out as the case in which automatic control is set. In the case that the headlights are automatically turned off, the process again returns from step S292 to step S300 by way of step S322, and the headlights are automatically restored to the on state in accordance with the conditions of step S300 and thereafter. In the third example, the headlights can thus be automatically turned off for the sake of courtesy at intersections and the like, even when the headlights 216 are automatically controlled in accordance with brightness.

When it has not been detected in step S294 that the illumination outside of the vehicle is at an intermediate illumination threshold or lower, it is possible that operation is taking place outside in daylight. Therefore, the process proceeds to step S324, the vehicle side lights 218 are directed to be turned off, the headlights 216 are subsequently directed to be turned off in step S326, and the flow is ended. When it has not been detected in step S298 that the illumination outside of the vehicle is at a low illumination threshold or lower, the process proceeds to step S326, the headlights 216 are directed to be turned off, and the flow is ended. In this case, the vehicle side lights 218 are kept lighted as directed in step S296. In the case described above, the lights are turned off as directed when the vehicle side lights 218 or the headlights 216 have been turned on. In the case that the lights are already off, the off state is continued in accordance with turn-off instructions.

Figure 16:
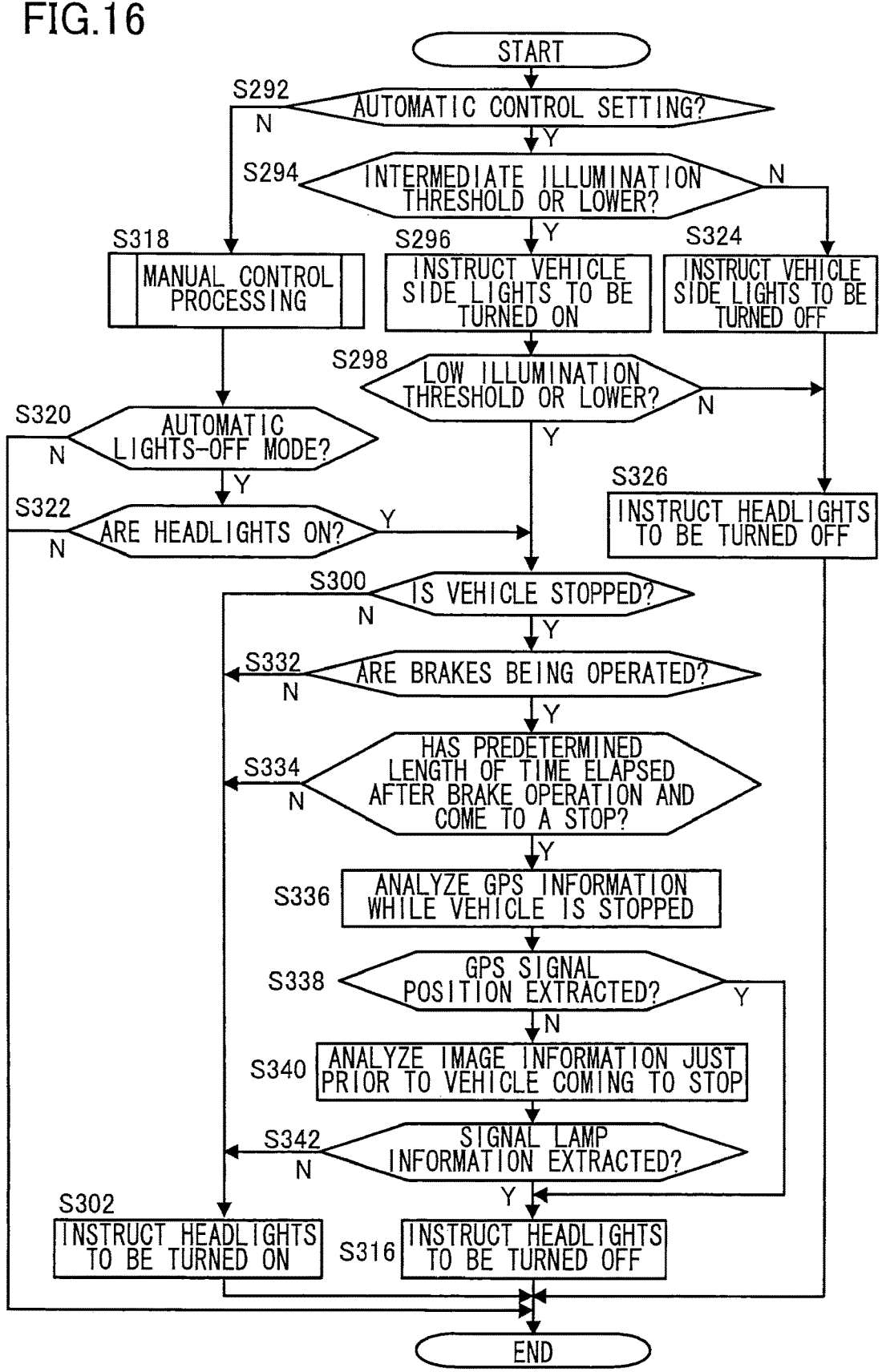
FIG. 16 is a flowchart showing the details of another example of step S286 of FIG. 14.

FIG. 16 is a flowchart showing the details of another example of lamp control processing in step S286 of FIG. 14. The flow of FIG. 16 is essentially the same as the flow of FIG. 15 except for the steps shown in bold. Therefore, the same step numbers are used for the same steps and a description thereof is omitted. In the flow of FIG. 16, the processing for issuing instructions to turn the headlights 216 on or off is different from FIG. 15 when the process has arrived at step S300 and the vehicle is detected to be stopped. This difference will therefore be described.

The process proceeds to step S322 when it is detected in step S300 that the vehicle is stopped, and a check is made to determine whether the brakes 204 are being operated. If the brakes are being operated, the process proceeds to step S334 and a check is made to determine whether a predetermined time (e.g., two seconds) has elapsed from when the vehicle 2 came to a stop by operation of the brakes. If such is the case, the process proceeds to step S336 and the GPS information of the stopped vehicle is analyzed. Next, a check is made in step S338 to determine whether the GPS signal lamp position in the vehicle stop position has been extracted. If detected, it is deemed that the vehicle has been stopped for a predetermined length of time while waiting for the signal, the process proceeds to step S316, and the headlights are directed to turn off.

On the other hand, in the case that the signal lamp position obtained by the GPS unit 20 could not been extracted in step S338, the process proceeds to step S340, an analysis is made of the image information just prior to the vehicle coming to a stop, the image information being recorded in FIFO format in the nonvolatile buffer memory 202, and a check is made in step S342 to determine whether an image of the signal lamp in the running direction of the vehicle position just prior to the vehicle coming to a stop will be extracted. When the signal lamp image is to be extracted, it is deemed that the driver saw the signal, stopped the car, and is continuing to keep the car stopped for a predetermined length of time or longer while waiting for the signal to change. The process proceeds to step S316 and directs the headlights to be turned off.

In the case that the brakes are not being operated in step S332, or in the case that a predetermined length of time has not elapsed after the brakes have been operated and the vehicle has been stopped, the process proceeds to step S302 and the headlights are directed to turn on. When a signal lamp image could not be extracted in step S342, it cannot be confirmed that the stopped vehicle is waiting for the signal. Therefore, the process proceeds to step S302 and the headlights are directed to turn on.

The flow of FIG. 16 is also repeated when the flow of FIG. 14 returns from step S26 to step S4, and when the process again arrives at step S332 in a state in which the headlights have been turned off by instruction in step S316 and it has been detected that the brake operation has been released, the process proceeds to step S302 and the headlights 216 are turned on again. When the process previously arrived at step S334, the predetermined length of time had not elapsed, the headlights were set in an on state by instruction in step S302 as a result, and when the process thereafter arrives again at step S334 and it has been detected that a predetermined length of time has elapsed after the brakes have been operated and the vehicle has been stopped, the process proceeds to step S336. If the signal lamp has been detected, the headlights may be turned off by instruction in step S316.

It is possible to use only one of the sets of details of lamp control processing of FIG. 15 or 16 as described above depending on the design concept of the vehicle 2, but it is also possible to provide both configurations to a single vehicle 2 so that either configuration can be selected based on decision of the driver. In step S316 in FIG. 15 or 16, instruction is given to turn off the headlights 216, but the implementation of the present invention is not limited to turning off the headlights 216, and it is also possible to dim the headlights 216 or to change the illumination direction in order to soften the forward illumination. The etiquette of turning off, dimming, and changing the illumination direction of the headlights 216 as well as other associated attributes is collectively referred to as "changing the state of the lighted headlights 216" in the present invention. In this case, the "turning on" of the headlights 216 carried out in step S302 of FIG. 15 or 16 refers to turning on the headlights 216 during ordinary travel.

Figures 17A, 17B:
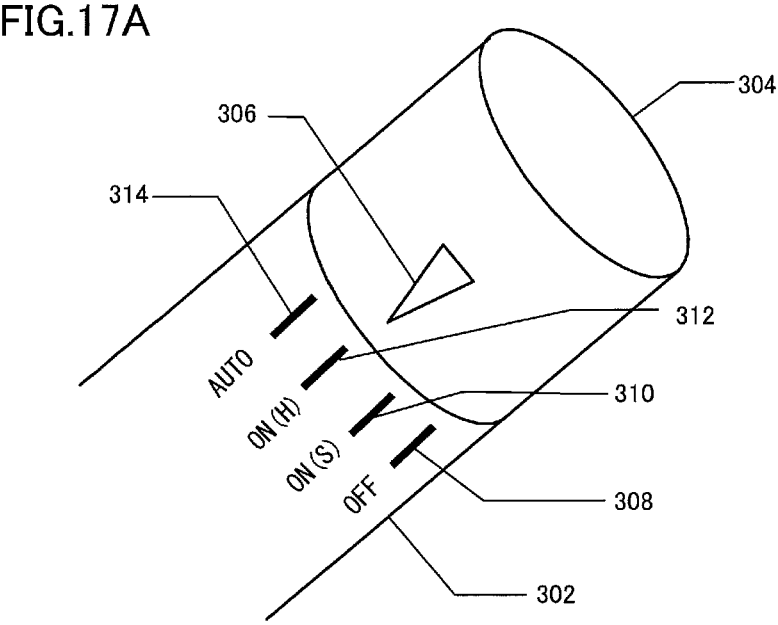
FIG. 17A is a partial perspective view of the operation unit 10 in the third example of FIG. 13.
FIG. 17B is a table of functions of the operation unit 10 in the third example of FIG. 13.

FIGS. 17A and 17B are a partial perspective view and table of functions of the operation unit 10 in the third example of FIG. 13. FIG. 17A shows the setting operation unit related to lamp-related control of the vehicle 2 in the operation unit 10. A turn signal operation lever 302 is raised or lowered to cause the left or right turn signal to flash. A lamp control setting dial 304 is provided to the distal end of the turn signal operation lever 302, and the lamp control can be set by rotating the dial to move an indicator 306 to an OFF position 308, an ON (S) position 310, an ON (H) position 312, and an AUTO position 314. FIG. 17B is a table of functions showing the function of each position, shows the details of standard settings of each function, and shows the possible custom settings of the functions. Custom settings are changeable and selectable using a GUI on a display panel 206 and separately provided setting buttons of the operation unit 10.

The standard settings are described first. When the indicator 306 of FIG. 17A is moved to the OFF position 308, the headlights 216 and all of the vehicle side lights 218 are turned off. The ON (S) position 310 and the ON (H) position 312 are manual control positions, and only the vehicle side lights 218 are turned on when the indicator 306 is moved to the ON (S) position 310. On the other hand, the headlights 216 and the vehicle side lights 218 are turned on when the indicator 306 is moved to the ON (H) position 312. The AUTO position 314 is a fully automatic control position, and when the indicator 306 is moved to the AUTO position 314, control as shown in FIG. 15 or 16 is carried out in which the headlights 216 are automatically turned on and automatically turned off in correspondence with the brightness outside the vehicle, the headlights 216 are automatically turned off and automatically turned on again when the vehicle is stopped/begins moving in a location where a signal lamp is installed. Such an arrangement makes it possible to rotate the lamp control setting dial 304 one step to manually switch to the ON (S) position 310 and the ON (H) position 312, and to leave dial in the AUTO position 314 to have the headlights 216 turned off and turned on again in a location where a signal lamp is installed.

"Custom 1" of FIG. 17B is a conventional function setting in which the headlights 216 are only automatically turned on and off in correspondence with the brightness outside of the vehicle in the AUTO position 314, and such a setting is possible should the driver desire such a setting. Here, caution must be exercised in that the AUTO position 314 is provided on the opposite side of the ON (S) position 310 and next to the ON (H) position 312. Therefore, in a state in which the indicator 306 is set in the AUTO position 314 and the vehicle arrives at a location in which a signal lamp installed, the lamp control setting dial 304 must be rotated two steps from the AUTO position 314 to the ON (S) position 310 by way of the ON (H) position 312 if the intention is to manually turn off the headlights, and it is possible to errantly rotate the dial to the OFF position 308. Also, the lamp control setting dial 304 must be rotated again two steps from the ON (S) position 310 to return to the AUTO position 314 and manually turn the lights on again. The AUTO position 314 is a difficult setting to use for a driver who is accustomed to manually turning off the headlights in a conscientious manner when stopped in a location in which a signal lamp is installed. In contrast, with the standard setting, the headlights 216 are automatically turned on and off in correspondence with the signal lamp and brightness outside of the vehicle described above when the dial is left in the AUTO position 314.

"Custom 2" of FIG. 17B has the same functions as the standard setting except for the function of the ON (H) position 312. With the ON (H) position 312 in Custom 2, the headlights 216 are not automatically controlled in correspondence with the brightness outside of the vehicle, and the function is essentially to turn the headlights on manually. However, in addition, the same automatic functions as the AUTO position 314 are used for automatically turning off and turning on the headlights 216 again when the vehicle is stopped/begins moving at a location in which a signal lamp is installed. Therefore, the lamp control setting dial 304 can be rotated by a single step between the ON (H) position 312 and the AUTO position 314 to manually turn the headlights 216 on and off for an arbitrary reason, and operation is not required in similar fashion to the case in which the indicator 306 is moved to the AUTO position 314 to turn the headlights 216 on and off at a location in which a signal lamp is installed. This corresponds to the functions of step S320 of FIG. 15 or 16 to S300 by way of step 322. In this manner, with "Custom 2," the state of the headlights 216 that are ordinarily on can be automatically changed on the basis of the detection of the presence of a signal lamp, regardless of whether the lights were turned on automatically or manually.

Fourth Example

FIG. 18 is a block view showing the fourth example of the drive recorder system according to an embodiment of the present invention. In the fourth example, the details of a configuration for ascertaining the relationship between the fuel economy and the traveling state of the vehicle 2 recorded in the drive recorder in particular. The block configuration of the fourth example is the same as that of the second example described with the aid of FIG. 1 and the third example shown in FIG. 13; and the same reference signs are used for the same portions and a description thereof is omitted unless particularly required. In FIG. 18, there are portions shown with a more detailed configuration than that of FIG. 1 in the same manner as the third example of FIG. 13, but such details are also provided to the block configurations of the first and second examples, and unless otherwise noted, such details are not a unique configuration provided to the fourth example alone. In FIG. 18, the gasoline filling/power feeding station 6 of FIG. 1 is not shown for the sake of simplicity, but the fourth example also has the same configuration in the same manner as the third example.

In the fourth example of FIG. 18, a number of blocks required for describing the functions are added to FIG. 18. First, the operation unit 10 is shown to have not only the brakes 204, but also a steering wheel 402 and an accelerator pedal 404. A slope detection unit 406 is added as a detection unit for detecting the traveling information of the vehicle 2. The slope detection unit 406 detects whether the vehicle 2 is traveling on flat ground, ascending a hill, or descending a hill, and the detection results are traveling information related to fuel economy.

A lamp system 408 of the vehicle function unit 12 is shown to include the brake lamps 212, the turn signals 214, the headlights 216, and the vehicle side lights 218 in FIG. 13, and the configuration thereof is the same as FIG. 13. The vehicle function unit 12 of FIG. 18 furthermore has an instantaneous fuel economy meter 414 for calculating the instantaneous fuel economy from the state of gasoline injection to the engine 410 and the speed of the traveling mechanism 412 monitored by the speedometer 46.

FIG. 18 furthermore shows a server 416 for controlling the signal apparatus 4 and communicating with the vehicle 2 via the signal apparatus 4. The server 416 has a server communication unit 424 for communicating with the signal apparatus system communication unit 42 via the Internet 422 on the basis of the control of a server control unit 420. The server control unit 420 controls the system and lighting of the signal apparatus 4, and transmits congestion information or the like to the vehicle 2 via the signal apparatus 4 as already described above. The server control unit 420 can furthermore transmit digital watermarking key information and an "Excellent Driver Certificate" to the vehicle 2 via the signal apparatus 4 in the same manner as the station control unit 54 of the gasoline filling/power feeding station 6 (or ETC 6 of the ETC control unit 54 instead) of FIG. 1. Communication between the signal apparatus system communication unit 42 and the server communication unit 424 is not limited to the Internet 422, and may also be carried out via a dedicated line.

FIG. 19 is a basic flowchart showing the functions of the vehicle control unit 8 in the fourth example in FIG. 18. The details are essentially the same as the flowchart of FIG. 14. Therefore, the same step numbers are used for the same steps and a description thereof is omitted. The portions of the flow of FIG. 19 that are different from the flow of FIG. 9 are the portions related to drive analysis showing the relationship between the traveling state and fuel economy of the vehicle 2 as recorded in the driver recorder, and to notifying the driver about the analysis results. The differing portions are the steps shown in boldface.

When the flow starts by the ignition or the travel preparation switch being switched on, first, the vehicle functions are initially checked in step S352, including the drive recorder functions, in the same manner as FIGS. 2, 9, and 14. This processing is the same as step S2 of FIGS. 2, 9, and 14, and includes reporting by displaying or announcing the check results. In step S352, processing is carried out providing notification of the results of drive analysis showing the relationship between the traveling conditions and fuel economy of the vehicle 2. This processing is carried out to provide notification when drive analysis results, which contain analysis of the driving in vehicle 2 from start to a current time point, have been completed and recorded. The details of the drive analysis results are later described. The sequence in which the processing of step S352 ends and the process then proceeds to step S4 is the same for FIGS. 2, 9, and 14.

In step S4, images and sound based on the information from the camera 26 and the microphone 28 are recorded, and the process proceeds to step S354. Acquired in step S354 at that point in time are GPS information from the GPS unit 20, running direction information from the direction detection unit 44, time information from the clock 18, and operation information from the operation unit 10, in the same manner as step S6 of FIGS. 2, 9, and 14. Also acquired as traveling information are speed information from the speedometer 46, as well as acceleration (including angular acceleration during a turn or while traveling around a curve) from the acceleration detection unit 30, and slope information of the vehicle 2 is from the slope detection unit 406. Furthermore, in step S354, fuel economy information is acquired from the instantaneous fuel economy meter 414.

Next, in step S356, drive analysis processing is carried out for analyzing the relationship between the traveling state and fuel economy of the vehicle 2 based on the various information acquired in step S354, and the process proceeds to step S8. The details of step S356 are later described. In FIG. 19, steps S358 and S360 are inserted between the step S10 and S210, which are the same as those in FIG. 14. In step S358, drive analysis processing is carried out for analyzing the relationship between the traveling state and fuel economy of the vehicle 2 using the various information obtained in step S354 and the signal lamp information obtained in step S10. The details of the analysis are described below together with step S356. In step S360, information exchange processing is carried out for receiving information from the vehicle exterior and transmitting various information (and the analysis results in the step S358 as required) obtained in steps S354 and S10 to the vehicle exterior. The reason that the steps S358 and S360 are positioned here is to trigger these functions by receiving signal lamp information in step S8, and to communicate with the server 416 via the signal apparatus 4.

In FIG. 19, lamp control processing of step S362 is started when the ordinary operation relationship processing of step S284 is ended, in the same manner as FIG. 14. Analysis notification processing is also carried out in step S362 of FIG. 19. This is done to provide notification of drive analysis results if such results exist when the vehicle is stopped and the headlights are turned off in lamp control processing. The details of the notification are later described in relation to the details of the analysis notification processing of step S352. Notification of the drive analysis results after driving has started is not only troublesome, but is also dangerous when carried out while the vehicle is traveling, and is therefore carried out during a stop to wait for a signal or at another time that poses no interference to driving.

Step S220 in FIG. 19 is for information exchange processing in the same manner as FIG. 14, but in addition to the information exchange described in FIG. 14, various information (and analysis results in step S356 or step S358 as required) obtained in steps S354 and S10 is transmitted to the server 416. The significance of having step S220 here in FIG. 19 is to trigger the transmission of the various information obtained in steps S354 and S10 (and drive analysis results as required) by detecting a communication-enable state in step S218, and to communicate with the server 416 by means other than the signal apparatus 4.

In step S364 shown in FIG. 19, "Stop Conditions" describes in simple terms the details being checked steps S26 to S30 in FIG. 14, and the details being checked are exactly the same as those in FIG. 14. In the same manner as FIG. 14, stop conditions apply when the vehicle is not in a travel-enabled state (corresponding to the check of step S26), a moving body is not detected (corresponding to the check of step S28), and no detection is made for a predetermined length of time; and the process proceeds to step S366. Step S366, in similar fashion to step S32 of FIG. 14, is used for stopping the recording of video/sound and the acquisition of various information, but if drive analysis results furthermore exist in step S366, notification of the results is also provided. This is done to notify the driver when the vehicle 2 has stopped and driving has ended. However, the details are later described in relation to the detailed description of step S352. The flow of FIG. 19 is ended when the processing of step S366 is ended.

FIG. 20 is a flowchart showing the details of drive analysis processing in steps S356 and S358 of FIG. 19. When the flow is started, the previous evaluation is finalized in step S372, and a check is then made to determine whether the travel distance (e.g., 5 km) as the evaluation unit has been reached. If the evaluation unit travel distance has been reached, the process proceeds to step S374 and the current evaluation file is finalized. An evaluation file is used for collecting various information obtained in steps S354 and S10 of FIG. 19 and data updated in step S378 of FIG. 20, in an amount commensurate with the evaluation unit travel distance. A new evaluation file for the next evaluation unit travel distance is created in step S376, and the process proceeds to step S378. On the other hand, if the evaluation unit travel distance has not been reached in step S372, the process proceeds directly to step S378. In this manner, updates of the data in step S378 and thereafter are made to the new evaluation file when it has been detected in step S372 that the evaluation unit travel distance has been reached. In the case that it has not been detected in step S372 that the evaluation unit travel distance has been reached, the updating of the data in step S378 and thereafter is made to the current evaluation file.

In step S378, the average fuel economy is recalculated using the fuel economy information collected in the evaluation file and the fuel economy information newly obtained in step S354, and the average fuel economy data of the evaluation file is updated. Next, in step S380, the fuel economy data in a state other than constant speed travel over flat ground is extracted from the evaluation file. This is because fuel economy in a state of travel at constant speed over flat ground is relatively unaffected by driving technique. Therefore, fuel economy in traveling state other than travel over flat ground at constant speed is extracted and analyzed. Next, in step S382, a check is first made to determine whether there is newly acquired fuel economy during a standstill start in the extracted fuel economy data.

When new standstill-start fuel economy data cannot be detected in step S382, the process proceeds to step S384, and a check is made to determine whether the newly acquired fuel economy data during flat-ground acceleration is present in the fuel economy data extracted in step S380. When new fuel economy data for flat-ground acceleration is not detected in step S384, the process proceeds to step S386, and a check is made to determine whether newly acquired hill-ascent fuel economy data is present in the fuel economy extracted in step S380. Determination of whether the vehicle is ascending a hill is made from the information from the slope detection unit 406 of FIG. 18. When new hill-ascent fuel economy data is not detected in step S386, the process proceeds to step S388, and a check is made to determine whether newly acquired fuel economy data during flat ground deceleration is present in the fuel economy extracted in step S380. When the new flat-ground deceleration fuel economy data is not detected in step S388, the process proceeds to step S390, and a check is made to determine whether there is newly acquired hill-descent fuel economy data in the fuel economy data extracted in step S380. Determination of whether the vehicle is descending a hill is also made from the information from the slope detection unit 406 of FIG. 18.

In the case that the new hill-descent fuel economy data has been detected in the newly acquired fuel economy data in step S390, the process proceeds to step 392 and the engine brake-state generation data is updated in association with the hill-descent fuel economy data. Next, the brake operation data is updated in step S394 in association with the hill-descent fuel economy data, and the process proceeds to step S396. The steps S392 and S394 are provided under the assumption that corresponding data will be generated, but if no such data is present, the process proceeds directly to step S396 as a result.

On the other hand, the process proceeds to step S398 when new fuel economy data during a start has been detected in step S382, when new fuel economy data during flat-ground acceleration has been detected in step S384, or when hill-ascent fuel economy data has been detected in step S386. Accelerator pedal operation data is updated in association with corresponding fuel economy data, and the process proceeds to step S396. When new fuel economy data during flat-ground deceleration has been detected in step S388, the process proceeds to step S394, the brake operation data is updated in association with the fuel economy data during flat-ground deceleration, and the process proceeds to step S396. Therefore, the process proceeds directly to step S396 when hill-descent fuel economy data has been detected in step S390 to be present in the new acquisition fuel economy data.

In step S396, a check is made to determine whether there is newly acquired fuel economy data while angular acceleration generated by directional change in traveling around a curve in the fuel economy data extracted in step S380. The occurrence of angular acceleration is detected by the acceleration detection unit 30. When it is detected in step S396 that new fuel economy data exists during the occurrence of angular acceleration, the process proceeds to step S400, the steering wheel operation data is updated in association the fuel economy data during the occurrence of angular acceleration, and the process proceeds to step S402. On the other hand, in the case that fuel economy data during the occurrence of angular acceleration is not detected in step S396 in the newly acquired fuel economy data, the process proceeds directly to step S402. In step S402, the acceleration data actually generated during the operation and state described above is updated in association with the fuel economy data in that state, and the process proceeds to step S404. Step S404 is processing for creating drive analysis data on the basis of the processing described above and is later described in detail. The flow is ended following the processing of step S404 for creating drive analysis data.

FIG. 21 is a flowchart showing the details of drive analysis data creation processing in step S404 of FIG. 20. When the flow starts, the updated average fuel economy is written over old data and recorded in step S412 as drive analysis data. This updated average fuel economy is obtained in step S378 of FIG. 20. Next, a check is made in step S414 to determine whether the updated average fuel economy is lower than the average for the same vehicle model. The same vehicle model average fuel economy is calculated by the server 416 of FIG. 18 on the basis of fuel economy data collected from numerous same vehicle models, including the vehicle 2, and if provided as feedback to the vehicle 2. In the case that the average fuel economy of the vehicle 2 is lower than the same vehicle model average, the process proceeds to step S416, "fuel economy down" for notification is written over old data and recorded as analysis data, and the process proceeds to step S418. On the other hand, the process proceeds to step S418 in the case that the average fuel economy of the vehicle 2 is greater the same vehicle model average.

In step S418, a check is made to determine whether there is an evaluation file newly finalized by step S374 of FIG. 20. This check is made to determine whether drive analysis for step S418 and thereafter must be carried out on the basis of various items of information of a predetermined traveling distance, e.g., 5 km, accumulated in the newly finalized evaluation file. In the case that there is a newly finalized evaluation file that requires drive analysis, the process proceeds to step S420, and cumulative fuel economy data is calculated to determine the percentage each condition contributes to the average fuel economy, the conditions being those checked in steps S382 to S390 of FIG. 20, and the conditions other than flat-ground-constant-speed traveling that are classified by a combination of the existence of angular acceleration checked in step S396. This is carried out in order to extract the conditions that contribute most to reduced fuel economy, and to analyze the driving operation in such conditions.

When the percentage of contribution is calculated in step S420 for each condition in the cumulative fuel economy data, the process proceeds to step S422, and a check is made to determine whether the total of the contribution percentage of each condition other than flat-ground-constant-speed traveling is greater than a statistical average obtained from the data of all vehicles collected by the server 416. When the total of the percentage of contribution of the fuel economy of each condition, excluding flat-ground-constant-speed traveling, to the average fuel economy is high, this means that the ratio of the flat-ground-constant-speed traveling in the overall traveling conditions is commensurately low. Therefore, the process proceeds to step S424 when the total of the contribution percentages is greater than the statistical average, "encourage constant-speed driving" for notification is written over old data and recorded as analysis data, and the process proceeds to step S426. On the other hand, when the total of the contribution percentages is less than the statistical average, this means that the ratio of constant-speed driving conditions is high and that driving has been ecological. Therefore, the process proceeds directly to step S426.

In step S426, a check is made to determine whether the individual percentage of contribution for each condition in the cumulative fuel economy data to the average fuel economy is at a predetermined level or higher (e.g., 5% or greater). This check is made to carry out an individual drive analysis in step S428 and thereafter for individual conditions having a high percentage of contribution to the cumulative fuel economy data. If such a condition applies in step S426, first, the cumulative fuel economy data is individually extracted in step S428. Next, the process proceeds to step S430, a check is made to determine whether the cumulative fuel economy thus extracted is lower than the same vehicle model average. If such is the case, a further check is made in step S432 to determine whether the suitability of the operation data is less than that of the same vehicle model average under the same conditions. If such is the case, the process proceeds to step S434, "improve applicable operation" for notification is written over old data and recorded as analysis data, and the process proceeds to step S436. The analysis data to be written and recorded over old data is, e.g., "The number of occasions of sudden braking is above average. Try to brake earlier," "The number of sudden accelerations is high and fuel economy is poor," and other such announcements or display data. On the other hand, in the case that the fuel economy is better than the same vehicle model average in step S430 or the suitability of the operation data is better than the same vehicle model average in step S432, the process proceeds directly to step S436 because there is no new recommendation for the driver.

In step S436, a check is made to determine whether the suitability of the operation data in the currently analyzed evaluation file is better than the previously analyzed evaluation file, and if such is the case, "praise and encourage improvement in applicable operation" for notification is written over old data and recorded as analysis data in step S438, and the process proceeds to step S440. On the other hand, if an improvement over the previous evaluation file cannot be recognized, the process proceeds directly to step S440. In the case that a newly finalized file is not detected in step S418, the process proceeds directly to step S440 because further analysis is not required. Step S440 updates the evaluation of where the subject vehicle is positioned in absolute fuel economy rankings of all vehicles whose average fuel economy data has been uploaded to the server 416, and in the same vehicle model rankings of the same, and the flow is ended.

Since ranking by average fuel economy only does not require analysis in evaluation unit travel distance, the rankings can be constantly updated in step S440 on the basis of the overwriting and recording of the average fuel economy constantly updated in step S412. The same applies to overwriting and recording of analysis data for the evaluation "fuel economy down" produced via steps S414 and S416. The drive analysis data written over old data and recorded in steps S416, S424, and S434 are provided as notification to the driver at various timings described below.

Figure 22:
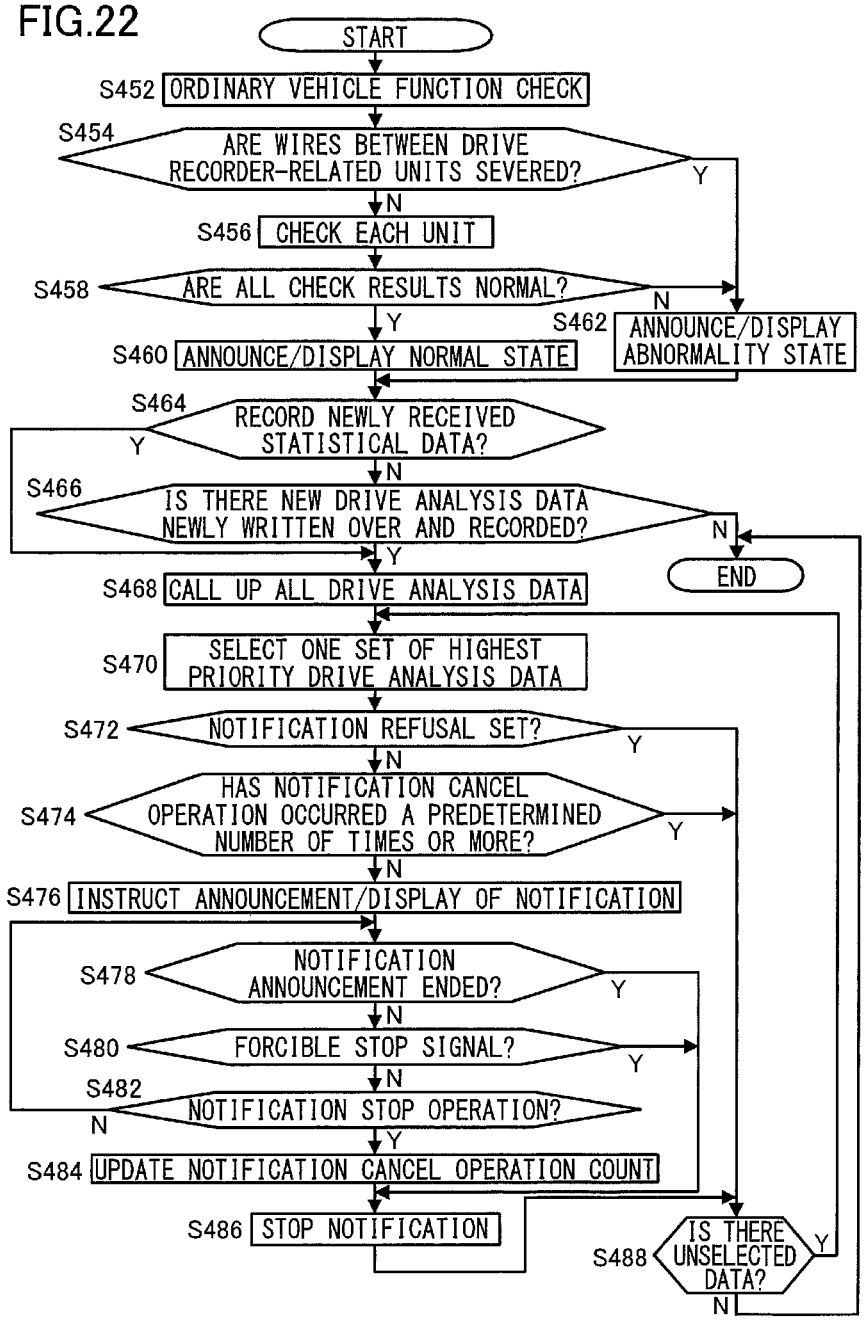
FIG. 22 is a flowchart showing the details of initial function check processing/analysis notification processing in step S352 of FIG. 19.

FIG. 22 is a flowchart showing the details of initial function check processing/analysis notification processing in step S352 of FIG. 19. In FIG. 22, steps S452 to S462 after the flow has started are the same as all the steps (steps S152 to S184) in the detailed flow of initial check processing of FIG. 7. "Check each component" in step S456 of FIG. 22 groups together all of the checks from steps S154 to S178 in FIG. 7. The flow is ended at the normality announcement/display of step S182 or the abnormality announcement of step S184 in FIG. 7, but in FIG. 22, the process continuous with analysis notification processing of steps S464 to S482 after the normality announcement/display of step S460 or the abnormality announcement of step S462. The steps of analysis notification processing are positioned after the initial function check processing in order to provide analysis notification at the time point at which driving starts in FIG. 22, and the same flow is carried out when notification is provided at the end of driving or when the vehicle is stopped at a signal as described above.

In the analysis notification processing in FIG. 22, first, a check is made in step S464 to determine whether there is newly received statistical data step S220 or step S360 in FIG. 19. If no such data has been received, the process proceeds to step S466, and a check is made to determine whether there is drive analysis data newly written over old data and recorded by the flow of FIG. 21. If there is such drive analysis data newly written over old data and recorded, the process proceeds to step S468. This corresponds to the case in which there is no newly received data, but the evaluation file has been updated with new data by the flow of FIG. 20, and the drive analysis data is newly written over old data and recorded on the basis thereof. In the case that newly received statistical data is detected in step S464, the process proceeds directly to step S468. This is because there is a possibility that statistical data of a comparative counterpart has been newly received and the drive analysis data has thereby been written over old data and recorded for comparison therewith, regardless of the existence of an update to the evaluation file. In the case that there is no drive analysis data newly written over old data and recorded in step S466, the flow is immediately ended because there is no new information that particularly requires notification.

All the drive analysis data is called out in step S468. The data that is called out at this time is not only data newly written over old data and recorded, but is rather all recorded data. The drive analysis data thus called out is all data that requires notification to the driver. Next, one set of data having the highest priority in the drive analysis data is selected on the basis of predetermined notification priority rules (e.g., in order of improvement effects in fuel economy, in order of urgency, and the like) among the drive analysis data called out in step S470. A check is made in step S472 to determine whether the drive analysis data has been set for notification refusal. If a notification refusal setting has not been detected, the process proceeds to step S474, and a check is made to determine whether a notification cancel operation has been made a predetermined number of times or greater.

If it has not been detected in step S474 that a notification cancel operation has been carried out a predetermined number of times or greater, the process proceeds to step S476, and the start of notification announcement and display based on the selected drive analysis data is instructed. A check is made in step S478 to determine whether the notification announcement has ended, and if it has not, a check is made in the next step S480 to determine whether a signal has been received for forcibly and automatically stopping the announcement. If a forcible stop signal is not detected, the process proceeds to step S482, and a check is made to determine whether the driver has manually performed a notification stop operation. If a notification stop operation has not been detected, the flow returns to step S478, and steps S478 to S482 are repeated as long as any of the above have not been detected; and notification announcement and display based on the selected drive analysis data is continued.

When a notification cancel operation is detected in step S482, the process proceeds to step S484, the number of notification cancel operations is updated, the process proceeds to step S486, and the notification based on the selected drive analysis data is stopped. The number of notification cancel operation updated in step S484 is used in step S474 in subsequently notification processing. When the notification announcement is ended in step S478 or when a forcible stop signal is detected in step S480, the process proceeds directly to step S486 and notification is stopped. The forcible stop signal detected in step S480 is automatically issued in coordination with, e.g., the move operation of the vehicle 2, and consideration is given to avoid interference with the travel operation of the driver.

When the notification is stopped in step S486, the process proceeds to step S488. When a notification refusal setting is detected in step S472, or when the notification cancel operation is detected in step S474 to have occurred a predetermined of times or more, the process will proceed directly to step S488 without entering the process of notification based on the selected drive analysis. As described above, when notification is troublesome for the driver, various measures can be taken for notification to not occur. As a supplement to step S474 and in cooperation with steps S482 and S484, when the notification cancel operation has been made a predetermined number of times (e.g., three times), announcement and display based on the same drive analysis data are thereafter automatically suppressed.

In step S488, a check is made to determine whether there is drive analysis data not yet selected by step S470. When it has been detected that there is unselected data, the flow returns to step S470, and the next highest priority set of drive analysis data is selected from among the unselected data. Thereafter, steps S472 to S488 are executed in the same manner described above, the drive analysis data are selected in sequence until unselected data is not detected in step S488, and the steps S470 to S488 are carried out. When it is detected that there is no unselected data in step S488, the flow is ended. When the vehicle 2 begins moving and a forcible stop signal is generated during the above-described operation, the process proceeds from step S480 to S486 and notification of all drive analysis data thereafter is immediately directed to be stopped, even when there is instruction to start notification announcement/display in step S476. Therefore, no apparent notifications are made and the flow is ended.

Figure 23:
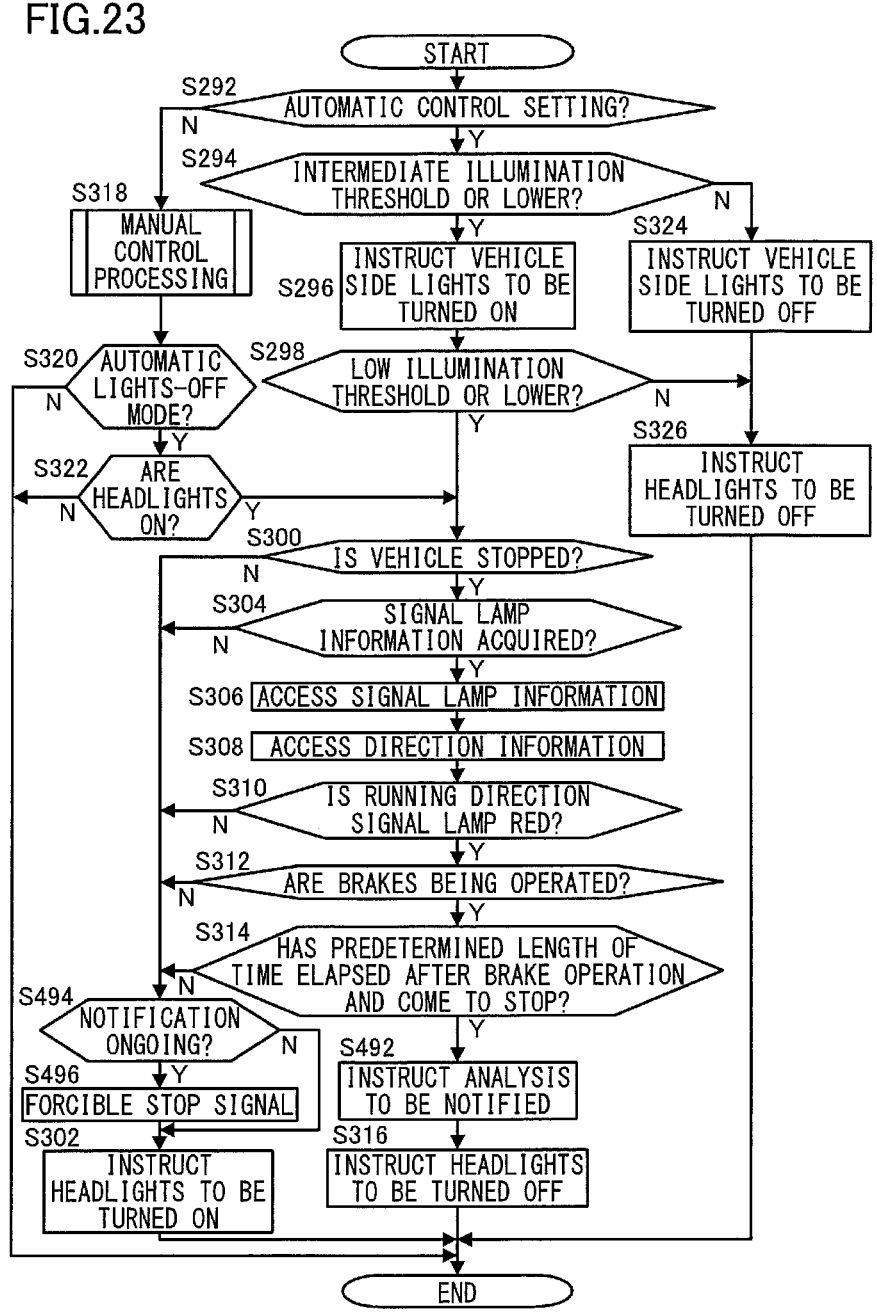
FIG. 23 is a flowchart showing the details of lamp control processing/analysis notification processing of FIG. 19.

FIG. 23 is a flowchart showing the details of lamp control processing/analysis notification processing of FIG. 19. FIG. 23 is substantially the same flowchart showing the details of lamp control processing of FIG. 15, the same step numbers are used for the same steps, and a description thereof is omitted. The portions of the flow of FIG. 23 that are different from the flow of FIG. 15 are the steps shown in bold in FIG. 23. In other words, the first point of difference is that step S492 for instructing analysis notification is inserted between steps S314 and S316. The second point of difference is that step S496 is inserted between steps S300 and S302, step S496 being used for generating a forcible stop signal in the case that notification is ongoing in step S494 for checking whether notification is ongoing.

With such a configuration in FIG. 23, analysis notification is directed to be carried out in step S492 when it is detected that the vehicle is stopped in step S300, when the signal lamp information has been acquired in step S304 and the running direction is confirmed to be red in step S310, and when brake operation has been detected in step S312 and a predetermined length of time is confirmed to have elapsed after brake operation and stopping in step S314. The same applies to conditions for directing the headlights to be turned off in step S316. In this manner, analysis notification processing is carried out when it is confirmed that the vehicle is stopped while awaiting a signal, and there is not interference in travel operation. The specific details of analysis notification instructed in step S492 is the same as steps S464 to S488 of FIG. 22.

When it is detected in step S300 that the vehicle is not stopped, the process proceeds to step S494 and a check is made to determine whether analysis notification is ongoing. If analysis notification is ongoing, the process proceeds to step S496, a forcible stop signal for automatically and forcibly stopping notification is generated, and the process moves to step S302. If analysis notification is not ongoing, the process proceeds directly to step S302 from step S494, and the same operation is therefore carried out as in FIG. 15. The forcible stop signal generated in step S496 of FIG. 23 is detected in step S480 of FIG. 22. Therefore, the analysis notification processing started in step S492 is forcibly stopped in accordance with step S496. In this manner, in accordance with the operation of FIG. 23, notification is started when the vehicle is awaiting a signal, and when the signal turns green and the vehicle 2 begins to move, notification is automatically stopped.

Figure 24:
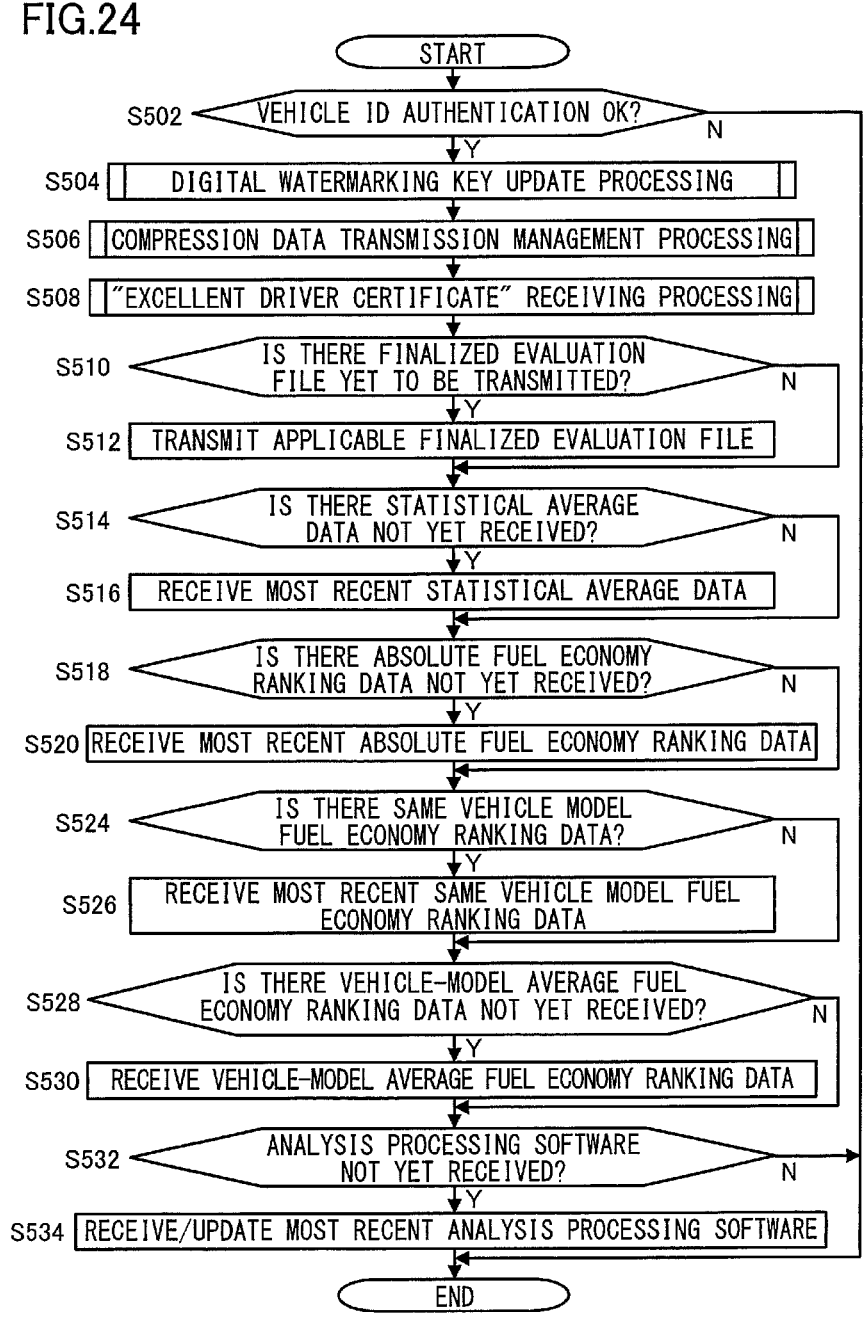
FIG. 24 is a flowchart showing the details of information exchange processing in steps S360 and S220.

FIG. 24 is a flowchart showing the details of information exchange processing in steps S360 and S220 of FIG. 19. FIG. 24 has additional functions added in step S192 to S248 of FIG. 11. More specifically, when the flow of FIG. 24 is started, and the vehicle ID is authenticated between the vehicle 2 and the server 416 in step S502 and is confirmed to be successful, the process proceeds to step S504. This is the same function as step S192 of FIG. 11. Step S504 of FIG. 24 groups together the processing of steps S194 to S202 of FIG. 11 as digital watermarking key update processing. Similarly, step S506 of FIG. 24 groups together the processing of steps S204 to S244 of FIG. 11 as compressed data transmission management processing. Step S508 of FIG. 24 groups together the processing of steps S246 and S248 of FIG. 11 as processing for receiving an "Excellent Driver Certificate."

FIG. 24 continues the processing that follows the processing for receiving an "Excellent Driver Certificate" of step S508, and a check is made in step S510 to determine whether there exists a finalized evaluation file yet to be transmitted. If an applicable evaluation file exists, the process proceeds to step S512, the evaluation file is transmitted to the server 416, and the process proceeds to step S514. If an applicable evaluation file does not exist in step S512, the process proceeds directly to step S514. In step S514, a check is made via information exchange with the server 416 about the existence of the most recent statistical average data not yet received from the server 416. If there is applicable statistical average data that has not yet been received, the process proceeds to step S516, the data is received from the server 416, and the process proceeds to step S518. If it is determined in step S514 that applicable statistical average data does not exist, the process proceeds directly to step S518.

In step S518, a check is made of the existence of absolute fuel economy ranking data not yet received from the server 416 by information exchange with the server 416. If there is corresponding most-recent absolute fuel economy ranking data that has not yet been received, the process proceeds to step S520, the data is received from the server 416, and the process proceeds to step S524. When there is no such absolute fuel economy ranking data in step S518, the process proceeds directly to step S524. In step S524, a check is made of the existence of same vehicle model fuel economy ranking data that has not yet been received from the server 416 by information exchange with the server 416. If there is corresponding most-recent same vehicle model fuel economy ranking data that has not yet been received, the process proceeds to step S526, the data is received from the server 416, and the process proceeds to step S528. When there is no such same vehicle model fuel economy ranking data in step S524, the process proceeds directly to step S528.

In step S528, a check is made of the existence of by-vehicle-model average fuel economy ranking data not yet received from the server 416 by information exchange with the server 416. If there is corresponding most-recent vehicle-model average fuel economy ranking data that has not yet been received, the process proceeds to step S530, the data is received from the server 416, and the process proceeds to step S532. When there is no such vehicle-model average fuel economy ranking data in step S528, the process proceeds directly to step S532. The data received in this case is not directly related to the vehicle 2, but since the average fuel economy of vehicle models can be known, the information can be used when purchasing another vehicle and the information is of interest for mere curiosity.

In step S532, a check is made of the existence of analysis processing software not yet received from the server 416 by information exchange with the server 416. If there is a corresponding most-recent version of the analysis processing software that has not yet been received, the process proceeds to step S534, the data is received from the server 416, the vehicle control unit 8 is updated to the most recent version, and the flow is ended. If there is no such analysis processing software in step S532, the flow is immediately ended. In the case that the vehicle ID cannot be authenticated in step S502, the flow is immediately ended.

Figure 25:
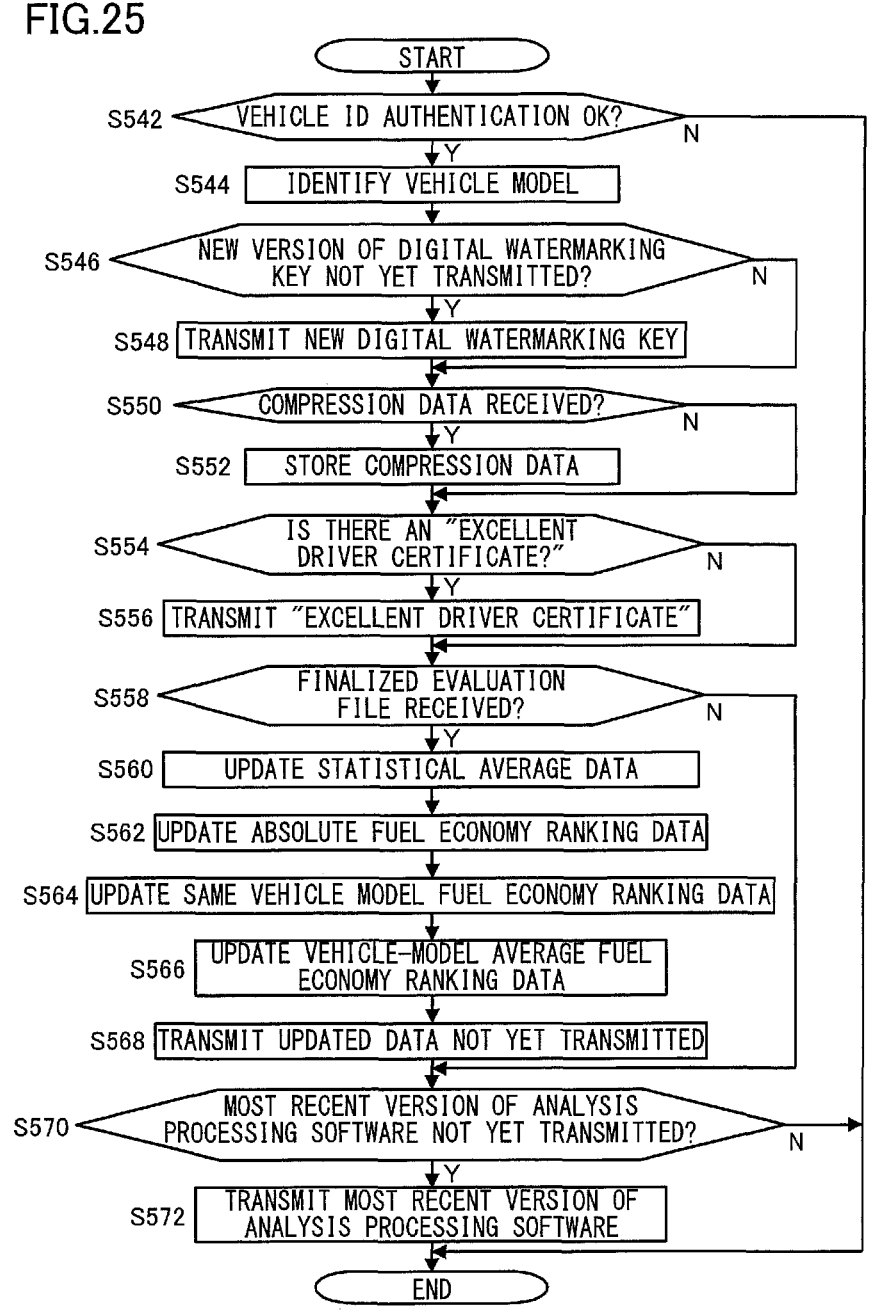
FIG. 25 is a basic flowchart showing the functions of the server control unit 420 in the fourth example of FIG. 18.

FIG. 25 is a basic flowchart showing the functions of the server control unit 420 in the fourth example of FIG. 18. The details relate to information exchange with the vehicle 2 and to preparation of various data to be communicated, and are preferably understood by correlation with the flowcharts described above showing the functions of the vehicle control unit 8. The flow of FIG. 25 starts when access is made from any vehicle. When the flow starts, the vehicle ID is first authenticated in step S542 by information exchange with the vehicle that is making access, and the process proceeds to step S544 when confirmation is successful. This corresponds to step S502 in the flow of the vehicle control unit of FIG. 24.

In step S544, the model of the vehicle 2 that is making access is identified based on the authentication data in step S542. The model identification is required for statistical processing in the server control unit 420. Next, in step S546, a check is made by information exchange with vehicle 2 to determine whether there is a new version of the digital watermarking key that has not been received by the vehicle 2 making access. If there is a new version of the digital watermarking key that has not yet been received, the process proceeds to step S548, the new version is transmitted, and the process proceeds to step S550. If there is not a new version of the digital watermarking key in step S546, the process proceeds directly to step S550.

In step S550, a check is made to determine whether new compressed data has been received from the vehicle 2 making access. If compressed data has been received, the process proceeds to step S552, the compressed data is stored in the server 416, and the process proceeds to step S554. If compressed data has not been received in step S546, the process proceeds directly to step S554. In step S554, a check is made by information exchange with the vehicle 2 to determine whether there is an "Excellent Driver Certificate" that has not yet been received by the vehicle 2 making access. If there is a most-recent "Excellent Driver Certificate" that has not yet been received, the process proceeds to step S556, the certificate is transmitted to the vehicle 2, and the process proceeds to step S558. If there is no such "Excellent Driver Certificate" in step S554, the process proceeds directly to step S558.

In step S558, a check is made to determine whether a new finalized evaluation file has been received from the vehicle 2 making access. If a finalized evaluation file has been newly received, the process proceeds to step S560, and the statistical average data is updated using the finalized evaluation file. In step S562, the absolute fuel economy ranking data is updated using the information of the finalized evaluation file. Next, in step S564, the statistical average data is updated using the information of the finalized evaluation file. In step S566, the vehicle-model average fuel economy ranking data is updated using the information of the finalized evaluation file.

After the various data described above has been updated, the process proceeds to step S568, and if there is various statistical data, including the updated statistical data, that has not yet been transmitted to the vehicle 2, the data is transmitted to the vehicle 2 and the process arrives at step S570. If a finalized evaluation file has not been newly received in step S558, the process proceeds directly to step S570. In step S570, a check is made of the existence of a more recent version of analysis processing software not yet transmitted to the vehicle 2 by information exchange with the vehicle 2. If there is a corresponding most-recent version of the analysis processing software that has not yet been transmitted, the process proceeds to step S572, the most recent version is transmitted to the vehicle 2. If there is no such most-recent version of the analysis processing software not yet transmitted in step S570, the flow is immediately ended. In the case that the vehicle ID cannot be authenticated in step S542, the flow is immediately ended.

The implementation of the various characteristics described above is not limited to the examples described above, and suitable implementation is also possible in other embodiments. For example, in step S420 in FIG. 21, the percentages of the cumulative fuel economy data for conditions other than flat-ground-constant-speed traveling that contribute to the average fuel economy are calculated, and the total of the contribution percentages are obtained in step S422, whereby the flat-ground-constant-speed traveling state and the other states are separated out and the ratios thereof are computed. Similar results can be obtained by calculating the percentage of the cumulative fuel economy data for flat-ground-constant-speed traveling that contributes to the average fuel economy, separating out the flat-ground-constant-speed traveling and the other states, and computing the ratios thereof. In this case, step S420 is positioned just prior to step S426, a step "calculate the contribution percentage of cumulative fuel economy data in a flat-ground-constant-speed traveling state to the average fuel economy" is placed in the position of step S420, and a step "Is the contribution percentage of the flat-ground-constant-speed traveling state <the statistical average?" is substituted in place of step S422.

In the examples described above, the term "ranking" refers to the position of the subject vehicle among all vehicles in society, and is therefore not limited in a narrow sense to an expression of the position among a certain number of vehicles. For example, in the case of a fuel economy ranking, it is also possible to divide the fuel economy into 10 ranks and to have the expression indicate which rank the subject vehicle is positioned. It is also possible to display a distribution of the fuel economy of all vehicles in society and have the expression indicate the position of the subject vehicle in the distribution.

The various technical characteristics disclosed above are summarized below.

The first technical aspect disclosed in the present specification relates to a drive recorder or another abnormality recording device.

Drive recorders keep a record of evidence just prior to an accident by saving information in memory that relates to the vehicle exterior and vehicle state before and after an accident, and are beginning to be widely used in recent years as effective means for preventing automobile accidents in advance. Various drive recorders have been proposed. In Patent Literature 1, for example, a drive recorder is proposed for preventing overwriting and falsification of data by providing means for blocking input to memory after an accident.

However, drive recorders have a variety of diverse problems that need to be resolved in terms of practicality.

In view of the above, an object of the first technical characteristic disclosed above in the present specification is to provide a vehicle abnormality recording device having greater reliability of the evidentiary strength of recorded abnormality information.

More specifically, as an example of the first technical aspect described above in the present specification, there is provided a vehicle abnormality recording device that is characterized in comprising a camera unit for acquiring image information relating to outside of a vehicle; a recording unit for recording the image information from the camera unit; an abnormality detection unit for detecting an abnormal vehicle state; an auxiliary data detection unit for acquiring auxiliary data when the abnormality detection unit has detected an abnormality; and a control unit for combining the auxiliary data with the image information in the recording unit when the abnormality detection unit has detected the abnormality, and recording the combined image information as image information related to abnormality detection.

In accordance with a specific aspect described in the present specification, there is provided a microphone for acquiring sound information outside of a vehicle, and the sound information from the microphone is recorded together with the image information.

In accordance with another specific aspect described in the present specification, image information related to the abnormality detection includes image information recorded in the recording unit from a predetermined time prior to abnormality detection to the time of the abnormality detection.

In accordance with another specific aspect described in the present specification, image information related to the abnormality detection includes image information recorded in the recording unit from the time of abnormality detection to a predetermined time after abnormality detection.

In accordance with another specific aspect described in the present specification, the auxiliary data detection unit acquires time data at the time at which the abnormality detection unit detected an abnormality.

In accordance with another specific aspect described in the present specification, the auxiliary data detection unit acquires position data of the vehicle at the time at which the abnormality detection detected an abnormality.

In accordance with another specific aspect described in the present specification, the auxiliary data detection unit acquires brake operation data of the vehicle at the time at which the abnormality detection detected an abnormality.

In accordance with another specific aspect described in the present specification, the auxiliary data detection unit has a receiving unit for receiving signal lamp information in the vehicle running direction, and the auxiliary data is signal lamp information data up to the time point at which the abnormality detection unit detected an abnormality.

In accordance with another specific aspect described in the present specification, the control unit combines the auxiliary data with image information of the recording unit as a digital watermark.

In accordance with another specific aspect described in the present specification, the control unit combines the auxiliary data with the image information as a digital watermark after the image information from the time point of the abnormality detection up to a predetermined length of time thereafter has been recorded.

In accordance with another specific aspect described in the present specification, the control unit combines the auxiliary data with the image information up to the time of the abnormality detection as a digital watermark, when the camera part cannot acquire image information after the time of the abnormality detection.

In accordance with another specific aspect described in the present specification, the control unit carries out the combining on the basis of information for combining in order to combine the auxiliary data with the image information of the recording unit.

In accordance with another specific aspect described in the present specification, the configuration has a holding unit for holding the information for combining, and a receiving unit for receiving new combination information from the outside in order to update the information for combining held in the holding unit.

In accordance with another specific aspect described in the present specification, the receiving unit receives information for combining from the signal apparatus.

In accordance with another specific aspect described in the present specification, the receiving unit receives information for combining from a vehicle energy feed station.

In accordance with another specific aspect described in the present specification, the receiving unit receives information for combining from an automatic toll road collection system.

Next, the second technical characteristic disclosed in the present specification relates to a vehicle traveling information recording device such as a drive recorder.

Drive recorders keep a record of evidence just prior to an accident by saving information in memory that relates to the vehicle exterior and vehicle state before and after an accident, and are beginning to be widely used in recent years as effective means for preventing automobile accidents in advance. Various drive recorders have been proposed. Patent Literature 2, for example, proposes a travel recording system capable of ascertaining the color of a signal lamp when the vehicle has entered an intersection.

However, drive recorders have a variety of diverse problems that need to be resolved in terms of practicality.

In view of the above, an object of the second technical characteristic disclosed above in the present specification is to provide a vehicle traveling information recording device having a large capacity for recording information.

More specifically, as an example of the second technical aspect described above in the present specification, there is provided a vehicle traveling information recording device that is characterized in comprising a receiving unit for receiving signal lamp information; an acquisition unit for acquiring running direction information of the vehicle; a sorting unit for sorting signal lamp information in the traveling direction of the vehicle from the signal lamp information received by the receiver unit on the basis of the running direction information of the vehicle acquired by the acquisition unit; and a recording unit for recording signal lamp information in the traveling direction of the vehicle sorted by the sorting unit.

It is thereby possible to record signal lamp information received by the receiving unit on the basis of the running direction information of the vehicle without a need for a complex configuration in the signal lamp.

In accordance with a specific aspect described in the present specification, the traveling information recording device has a camera unit for acquiring image information relating to outside of a vehicle; and a recording unit for recording the signal lamp information in the traveling direction of the vehicle sorted by the sorting unit, and the image information of the outside of the vehicle acquired by the camera unit. In accordance with a more specific characteristic, the traveling information recording device has a microphone for acquiring sound information of the outside of the vehicle, and the sound information from the microphone is recorded together with the image information.

In accordance with another detailed characteristic described in the present specification, the traveling information recording device has an abnormality detection unit for detecting the abnormal state of a vehicle, and the recording unit records the signal lamp information in the travel direction of the vehicle in a timeframe that includes the time point at which the abnormality detection detected the abnormality.

Alternatively, in accordance with another characteristic described in the present specification, there is provided a vehicle traveling information recording device that is characterized in having a receiving unit for receiving signal lamp information; a recording unit for recording signal lamp information received by the receiving unit; a position information acquisition unit for acquiring the position information of the vehicle on a map; and a control unit for incorporating the information of the signal lamp installation position on a map contained in the position information acquisition unit into the record of the signal lamp information made by the recording unit.

Accordingly, it is possible to coordinate the position information acquisition unit for acquiring the position information of the vehicle on a map and the receiving unit for receiving signal lamp information, and to record in the recording unit the signal lamp information received by the receiving unit.

In accordance with a specific aspect described in the present specification, the control unit incorporates the information of the signal lamp installation position within a predetermined distance from the vehicle position information acquired by the position information acquisition unit, into the recording of the signal lamp information made by the recording unit.

Accordingly, it is possible to coordinate the position information acquisition unit and the receiving unit for receiving signal lamp information when the vehicle has approached a signal lamp from which signal lamp information is to be received.

In accordance with another specific aspect described in the present specification, the control unit controls receiving of signal lamp information by the receiving unit on the basis of information of the signal lamp position on a map contained in the position information acquisition unit. More specifically, the control unit controls the receiving state of the signal lamp information by the receiving unit on the basis of information of the signal lamp installation position on a map contained in the position information acquisition unit. Even more specifically, the control unit controls the receiving sensitivity of the signal lamp information by the receiving unit on the basis of information of the signal lamp installation position on a map contained in the position information acquisition unit.

The receiving unit can reliably receive and record in the recording unit the signal lamp information as described above by coordination with a position information acquisition unit such as that described above.

Alternatively, in accordance with another specific aspect described in the present specification, there is provided a vehicle traveling information recording device that is characterized in having a receiving unit for receiving signal lamp information; a recording unit for recording the signal lamp information received by the receiving unit; a camera unit for acquiring image information outside of a vehicle; an extraction unit for extracting a signal lamp image from the image information outside of a vehicle acquired by the camera unit; and a control unit for causing the extraction of signal lamp image by the extraction unit to be a part of the recording of the signal lamp information made by the recording unit.

The camera unit for acquiring the image information outside of the vehicle and the receiving unit for receiving the signal lamp information can thereby be made to work in coordination, and the signal lamp information received by the receiving unit can be recorded in the recording unit.

In accordance with specific aspect described in the present specification, the control unit controls receiving of signal lamp information by the receiving unit on the basis of extraction of the signal lamp image by the extraction unit. More specifically, the control unit controls the receiving state of the signal lamp information by the receiving unit on the basis of extraction of the signal lamp image by the extraction unit. Even more specifically, the control unit controls the receiving sensitivity of the signal lamp information by the receiving unit on the basis of extraction of the signal lamp image by the extraction unit.

The receiving unit can reliably receive and record in the recording unit the signal lamp information as described above by coordination with the extraction unit.

Alternatively, in accordance with another specific aspect described in the present specification, there is provided a vehicle traveling information recording device that is characterized in having an acquisition unit for acquiring information continuously generated in accompaniment with the traveling of a vehicle; a detection unit for detecting information selectively generated under predetermined conditions in the traveling of the vehicle; and a recording unit for recording in different formats information acquired by the acquisition unit and information detected by the detection unit. The capacity of the recording unit can thereby be effectively used.

In accordance with a specific aspect described in the present specification, the recording unit continuously records the information acquired by the acquisition in a first-in first-out format, and the information detected by the detection unit is recorded in a first-in first-out format in detected units. A specific example of the information acquired by the acquisition unit is image information of the outside of the vehicle, and a specific example of information detected by the detection unit is signal lamp information.

Next, the third technical characteristic disclosed in the present specification relates to a vehicle traveling information recording device such as a drive recorder.

Drive recorders keep a record of evidence just prior to an accident by saving information in memory that relates to the vehicle exterior and vehicle state before and after an accident, and have recently started to come into widespread use as effective means for preventing automobile accidents in advance. A variety of drive recorders have been proposed. In Patent Literature 1, for example, it is proposed that data after an accident is prevented from being overwritten by transmitting data recorded before and after an accident via an antenna.

However, drive recorders have a variety of diverse problems that need to be resolved in terms of practicality.

In view of the above, an object of the third technical characteristic disclosed in the present specification is to provide a vehicle traveling information recording device having more reliable functions.

More specifically, as an example of the third technical aspect described above in the present specification, there is provided a vehicle traveling information recording device having a vehicle traveling information acquisition unit; a recording unit for recording traveling information thus acquired; a switching unit for switching the vehicle between a travel-enabled state and a travel-disabled state; a checking unit for checking whether the recording of traveling information performed by the recording unit is enabled each time the switching unit sets the vehicle in the travel-enabled state, and a reporting unit for reporting the checking results of the checking unit.

The vehicle traveling information recording device described in the present specification is useful as evidence when a traffic accident has occurred. Nevertheless, traffic accidents normally should not occur, and in fact it is likely that nothing will happen for many years for a safe driver. Although such a situation is desirable, the traveling information recording device has no opportunity to operate even once and is not guaranteed to function in the case of emergency. In accordance with the characteristics described in the present specification and based on the configuration described above, the functions can be checked to be normal on a daily basis, and it is possible to prevent a situation in advance in which information is by chance not recorded.

In accordance with a specific aspect described in the present specification, an engine, motor, or another motive power source for causing the vehicle to travel is provided, and the switching unit switches the motive power source in and out of an active state. A specific example of the active state include switching on the ignition in the case of a gasoline engine vehicle, and switching on the travel preparation switch in the case of a hybrid vehicle or an electric automobile.

In accordance with another specific aspect described in the present specification, the checking unit checks the functions of the traveling information acquisition unit. In accordance with another specific aspect, the checking unit checks the functions of the recording unit. In accordance with yet another specific aspect, the checking unit checks the electrical connection relationships for enabling the traveling information to be recorded by the recording unit.

In accordance with another specific aspect described in the present specification, the acquisition unit that is to be checked has a camera unit for acquiring image information of the outside of the vehicle. In accordance with another aspect described in the present specification, the acquisition unit that is to be checked has a microphone for acquiring sound information of the outside of the vehicle.

In accordance with another aspect described in the present specification, the reporting unit has announcement means. In accordance with another aspect, the reporting unit has display means. Since the check results of the traveling information recording device are provided as notification by these notification units each time the vehicle is driven, the driver can start driving with peace of mind.

In accordance with another aspect described in the present specification, there is provided a vehicle traveling information recording device that has a vehicle traveling information acquisition unit; a recording unit for recording traveling information thus acquired; a switching unit for switching the vehicle between a travel-enabled state and a travel-disabled state; a control unit for maintaining the functioning of the acquisition unit and the recording unit even when the switching unit has the vehicle set in a travel-disabled state.

A vehicle accident does not necessarily only occur when the vehicle is in a self-powered travel-enabled state. For example, it is possible that the vehicle will travel by inertia or will descend and travel down a hill when a parking operation is forgotten, even when the engine or motor switch of the vehicle is off and in a self-powered-travel-disabled state. Also possible is an accident or the like in which another vehicle collides with the vehicle, which is itself stopped. The aspect described above in the present specification maintains the functioning of the acquisition unit and the recording unit even in such a situation and is capable of recording abnormality situations by using the traveling information recording device.

In accordance with a specific aspect described in the present specification, a detection unit for detecting relative movement between the vehicle and the exterior is provided, and the control unit maintains the functioning of the acquisition unit and the recording unit on the basis of the detection results of the detection unit. The functioning of the acquisition unit and recording unit can thereby be maintained for the case in which the subject vehicle is traveling by inertia or is descending a hill, or the case in which there is a vehicle traveling in the periphery though the subject vehicle is stopped and there is a possibility of an accident.

In accordance with a further specific aspect described in the present specification, the control unit ends maintaining the functioning of the acquisition unit and the recording unit when relative movement between the vehicle and the exterior is not detected by the detection unit for predetermined length of time, and avoids maintaining meaningless functioning. In accordance with another specific aspect described in the present specification, clock means is provided, and the control unit controls the maintaining of the functioning of the acquisition unit and the recording unit on the basis of the clock means. This prevents meaningless functioning over a long period of time.

In accordance with another aspect described in the present specification, there is provided a vehicle traveling information recording device having a vehicle traveling information acquisition unit, and a plurality of recording units for recording the same traveling information acquired by the acquisition unit, the plurality of recording unit being disposed in different locations of the vehicle. The plurality of recording units may be arranged so that, e.g., a first recording unit is disposed in the front portion of the vehicle, a second recording unit is disposed in the rear portion of the vehicle, and so forth, whereby if one of the recording units is destroyed in the event of an accident, there is expectation that another will remain intact.

In accordance with a specific aspect described in the present specification, a compression unit is provided for compressing traveling information acquired by the acquisition unit, and the plurality of recording units record the same traveling information compressed by the compression unit. In accordance with another specific aspect, the plurality of recording units has the same recording capacity for recording the same information. In accordance with yet another specific aspect, the plurality of recording units have mutually different recording capacities.

In the case that the capacities of the plurality of recording units are configured to be different, the traveling information recording device has a communication unit for transmitting traveling information to the outside of the vehicle, and the communication unit transmits to the outside of the vehicle the traveling information recorded by the recording unit having the largest recording capacity among the plurality of recording units. The recording unit essentially overwrites the recorded contents with new data in a first-in first-out format, and the recording capacity of one of the recording units is made large as described above, whereby information to be transmitted to the exterior can be retained until communication to the exterior becomes possible.

In accordance with another aspect described in the present specification, there is provided a vehicle traveling information recording device having a vehicle traveling information acquisition unit; a recording unit for recording traveling information thus acquired; and a communication unit for transmitting information in the recording unit to the outside of the vehicle and receiving statistical information based on transmission information from the outside of the vehicle. The recording unit can thereby be used in traveling by depending on the storage of information outside of the vehicle and receiving statistical information based on the processing thereof.

In accordance with a specific aspect described in the present specification, the statistical information is evidentiary information of the traveling state of a vehicle in a predetermined length of time. The traveling state in which the vehicle has accumulated results over a predetermined length of time can be thereby attested, and the results can be used, e.g., as extenuating factor in a minor violation in a police traffic stop in an intersection. Therefore, the incentive is increased as safe driving results constantly accumulate, and the effect of preventing traffic accidents in advance can be anticipated.

In accordance with another aspect described in the present specification, the communication unit transmits the information in the recording unit to the outside of the vehicle on the basis of authentication outside of the vehicle. Since individual traveling records of the vehicle involve privacy issues, strict authentication in order to protect privacy is an important prerequisite for transmitting information to the outside of the vehicle. There is great significance in transmitting information to the outside of the vehicle on the basis of authentication in terms of increasing the reliability of statistical information based on the information.

Next, the fourth technical characteristic disclosed in the present specification relates to a vehicle headlights automatic control device.

In recent years, headlight control in vehicles has become more automated, and it is becoming common for headlights to be automatically switched on near dusk or when the vehicle has entered a tunnel during daylight by automatically controlling the headlights in accordance with the brightness outside the vehicle. Various proposals have been made for automatically extinguishing the headlights. For example, in Patent Literature 3, it is proposed that headlights and vehicle side lights be controlled in accordance with state of the turn indicator while traveling or when stopped and the state of the headlights when a radio wave is received from a ground station disposed in an intersection or a crosswalk, and the headlights are, e.g., automatically switched off (or dimmed) when the turn indicator is not active while the vehicle is stopped. In Patent Literature 1, it is also proposed that the headlights be turned off or dimmed or that the illumination angle be modified when it has been recognized that the vehicle is stopped, or that a signal apparatus is red as determined by color information analysis carried out by processing images obtained from an onboard camera.

However, vehicle headlights automatic control device have a variety of diverse problems that need to be resolved.

In view of the above, an object of the fourth technical characteristic disclosed in the present specification is to provide a vehicle headlights automatic control device that conforms to the functions of the vehicle and the intentions of the driver.

More specifically, as an example of the fourth technical aspect described above in the present specification, there is provided a vehicle headlights automatic control device having a brake operation unit; a time-elapsed detection unit for detecting that a predetermined length of time has elapsed after the brake operation unit has been operated; a signal lamp detection unit for detecting the presence of a signal lamp; and a control unit for changing the state of headlights that are ordinarily on, in the case that the time-elapsed detection unit has detected that a predetermined length of time has elapsed after brake operation and that the signal lamp detection unit has detected the presence of a signal lamp.

It is therefore possible turn off or dim headlights that are ordinarily on with suitable timing from the view point of courtesy and safety and to avoid repeating an excessively onerous procedure in which the lights are turned off or dimmed, and turned on when the vehicle is stopped at night or the like at an intersection, a crosswalk, or the like where there is a signal lamp. Since energy consumption is high at the time the headlights are turned on again after having been turned off or dimmed, if the period of time is short, power consumption can be reduced by keeping the headlights on, and it is useful to turn the lights off as described above from the viewpoint of saving energy.

In accordance with an aspect described in the present specification, the signal lamp detection unit is capable of perceiving changes in the signal state in the running direction, the control unit returns the state of the headlights to the always-on state when the signal lamp detection unit has identified a change in the signal state. Therefore, the headlights can be rapidly returned to an always-on state when the signal in the running direction has changed from red to green, or at other times, and danger in the starting direction of the opposing vehicles can be prevented.

In accordance with a further specific aspect described in the present specification, the control unit returns the state of the headlights to the always-on state regardless of the operating state of the brake operation unit when the signal lamp detection unit has perceived a change in the signal state. Therefore, the headlights are returned to an always-on state and danger can be prevented, even when the driver does not notice a change in the signal state and is late in releasing the brakes.

In accordance with another specific aspect described in the present specification, the control unit returns the state of the headlights to an always-on state when the operation of the brake operation unit has been released. In this case, the state of the headlights can be returned to the always-on state before the vehicle begins to move, even when the signal lamp detection unit cannot perceive a change in the signal state.

In accordance with a further specific aspect described in the present specification, the control unit returns the state of the headlights to the always-on state regardless of the signal lamp detection unit when the operation of the brake operation unit has been released. In this case, the state of the headlights can be returned to the always-on state when the driver intends to cause the vehicle to begin moving, regardless of the state of the signal lamp.

In accordance with another specific aspect described in the present specification, the control unit sets the headlights in an always-on state when it is detected that the outside of the vehicle is darker than a predetermined level. Automatic control of the headlights can be carried out in natural response to the intentions of the driver without operating the headlights, and with consideration given to saving energy and safety to the outside of the vehicle, by combining automatic headlights-off as described above and automatic headlights-on based on the brightness.

In accordance with another aspect described in the present specification, there is provided a vehicle headlight automatic control device having a receiving unit for receiving signal lamp information; an acquisition unit for acquiring information in the running direction of the vehicle; a sorting unit for sorting signal lamp information in the traveling direction of the vehicle from the signal lamp information received by the receiver unit on the basis of the running direction information of the vehicle acquired by the acquisition unit; and a control unit for controlling the headlights on the basis of signal lamp information in the running direction of the vehicle as sorted by the sorting unit. Automatic control of the headlights that responds to the state of the signal lamp in the running direction of the vehicle is therefore made possible.

In accordance with another aspect described in the present specification, there is provided a vehicle headlight automatic control device having a position information acquisition unit for acquiring the position information of a vehicle on a map; and a control unit for controlling the headlights on the basis of the information of the signal lamp installation position on a map contained in the position information acquisition unit, and on the basis of the vehicle position information of the position information acquisition unit. In this manner, automatic control of the headlights that makes effective use of a so-called car navigation configuration is made possible.

In accordance with another aspect described in the present specification, there is provided a vehicle headlight automatic control device having a camera unit for acquiring image information outside of a vehicle; an extraction unit for extracting a signal lamp image from the image information outside of a vehicle acquired by the camera unit; a recording unit for recording extraction information obtained by the extraction unit and image information of the outside of the vehicle acquired by the camera unit; and a control unit for controlling the headlights on the basis of the extraction of the signal lamp image by the extraction unit. In accordance with such a configuration, signal lamp information can be effectively used in the recording of information of the drive recorder and in the automatic control of the headlights. Effective use of the signal lamp information in the recording of information of the drive recorder and in the automatic control of the headlights is useful in the cases described above, in cases in which the signal lamp information in the running direction of the vehicle is sorted out from the running direction information of the vehicle and the signal lamp information, and in cases of using the information of the signal lamp installation position on a map contained in the position information acquisition unit.

In accordance with another aspect described in the present specification, there is provided a vehicle headlight automatic control device having a brake operation unit; a brightness detection unit for detecting that the outside of the vehicle is darker than a predetermined level; a signal lamp detection unit for detecting the presence of a signal lamp; and a control unit for automatically setting the headlights in an always-on state when the brightness detection unit has detected that the outside of the vehicle is darker than a predetermined level, and automatically changing the state of headlights that are ordinarily on, on the basis of operation of the brake operation unit and detection of the presence of a signal lamp by the signal lamp detection unit.

In accordance with the above, automatic control of the headlights can be carried out in natural response to the intentions of the driver without their having to operate the headlights, and with consideration given to saving energy and safety to the outside of the vehicle, by combining automatic headlights-on based on the brightness, and automatic headlights-off based on brake operation and signal lamp detection.

In accordance with a specific aspect described in the present specification, a manual operation unit is provided for setting the headlights in an always-on state, and the control unit automatically changes the state of the headlights that are in an always-on state, on the basis of the operation of the brake operation unit and the detection of the presence of a signal lamp by the signal lamp detection unit, regardless of whether the headlights have been set in an always-on state by using the manual operation unit or whether the headlights have been set in an always-on state by the brightness detection unit. It is thereby possible to widely use the characteristics of automatic state change of the headlights in an always-on state, on the basis of the detection of the operation of the brake operation unit and the detection of the presence of a signal lamp by the signal lamp detection unit, and to contribute to avoiding trouble at an intersection, a crosswalk, or the like.

In accordance with a specific aspect described in the present specification, there is provided a vehicle headlight automatic control device having a camera unit for acquiring image information of the outside of the vehicle; a signal lamp information acquisition unit for acquiring information of the signal lamp; and a recording unit for recording the image information of the outside of the vehicle acquired by the camera unit, together with the information of the signal lamp; and a control unit for changing the state of the headlights in an always-on state on the basis of the signal lamp information acquisition unit. In accordance with such a configuration, the signal lamp information used in the information recording of the drive recorder can be effectively used in automatic control of the headlights.

In accordance with a specific aspect described in the present specification, there is provided a selection unit that can select whether or not the control unit will change the state of the headlights in an always-on state on the basis of the signal lamp information acquisition unit, and the recording unit records the signal lamp information together with the image information of the outside of the vehicle acquired by the camera unit, regardless of the selection of the selection unit. In this manner, the signal lamp information is effectively used in a drive recorder in which the traveling state of the vehicle is constantly recorded, and in selective automatic control of the headlights for giving consideration to courtesy and safety.

In accordance with another aspect described in the present specification, there is provided a vehicle headlight automatic control device having an operation unit that can select any of a plurality of setting positions including an automatic control position, a headlights manual-on position, and a vehicle side lights manual-on position provided to the opposite side of the automatic control position and next to the headlights manual-on position; a brightness detection unit for detecting the brightness of the outside of the vehicle; a signal lamp detection unit for detecting information related to the signal lamp; and a control unit for automatically changing the state of the headlights on the basis of the brightness detection unit and the signal lamp detection unit in a state in which the automatic control position has been selected by the operation unit, and for manually changing the state of the headlights on the basis of a selection when the headlights manual-on position or the vehicle side lights manual-on position has been selected by the operation unit. In accordance with a more specific aspect, it is also possible to use a configuration in which the state of the headlights is automatically changed on the basis of the signal lamp detection unit when the headlights manual-on position has been selected by the operating unit. In accordance with the above configuration, a problem is solved in which the operating unit is operated back and forth two steps or more by way of the headlights manual-on position to change the state of the headlights when the vehicle has arrived at a signal lamp installation position and in a state in which the signal lamp automatic control position is being set.

Next, the fifth technical characteristic disclosed in the present specification relates to a vehicle recording device such as a drive recorder.

Various proposals have been made in recent years for vehicle travel safety. A drive recorder is an example that is used as evidence when an accident or the like has occurred, by recording travel and driving conditions. Proposals have been made not only for keeping a past record merely as evidence, but also for making positive future improvements. For example, there have been proposed a system capable of efficiently diagnosing the driving skill of the driver (Patent Literature 4), and a drive recorder capable of providing exact instruction and evaluation of driving to the crew (Patent Literature 5).

However, conventionally, there is the aspect of monitoring and managing recording, and there are many and various problems in order to have onboard vehicle recording devices be been commonly and widely accepted and used.

In view of the above, an object of the fifth technical characteristic disclosed above in the present specification is to provide a vehicle recording device that will be readily, commonly, and widely accepted.

More specifically, as an example of the fifth technical aspect described above in the present specification, there is provided a vehicle recording device characterized in comprising a fuel economy gauge; a traveling information detection unit; and a control unit for classifying the fuel economy information of the fuel economy gauge by using the traveling information detection unit. The fuel economy information to be analyzed can therefore be efficiently extracted. In accordance with a specific aspect described in the present specification, the control unit classifies fuel economy information of the fuel economy gauge into a flat-ground-constant-speed traveling state and states other than the flat-ground-constant-speed traveling state. The fuel economy of the flat-ground-constant-speed traveling state can be used for extracting the fuel economy information in states other than the flat-ground-constant-speed traveling, which are very effective for analyzing the effect of driving technique.

In accordance with a further specific aspect described in the present specification, the vehicle recording device is provided with a notification unit, and the control unit uses the notification unit to provide notification that the ratio of the flat-ground-constant-speed traveling state is lower than a predetermined standard in comparison with the ratio of other states. The predetermined standard is, e.g., the statistical average value. The driver can thereby be notified based on the results that the low amount of flat-ground-constant-speed traveling is causing the fuel economy to be reduced. In accordance with this notification, the driver can improve fuel economy by reducing rapid acceleration and sharp braking.

In accordance with another specific aspect described in the present specification, the vehicle recording device is provided with a vehicle operation data recording unit, and the control unit carries out analysis related to the vehicle operation data and the fuel economy information of other than the flat-ground-constant-speed traveling state. It is therefore possible to know the relationship between the vehicle operation and the fuel economy information of other than the flat-ground-constant-speed traveling state.

In accordance with a further specific aspect described in the present specification, the vehicle recording device is provided with a notification unit, and the control unit causes the notification unit to provide notification of vehicle operation improvements on the basis of the vehicle operation data when the fuel economy information of other than the flat-ground-constant-speed traveling state is worse than the predetermined standard. The predetermined standard is, e.g., the statistical average value. It is therefore possible to know of specific vehicle operations that improve fuel economy.

In accordance with a further specific aspect described in the present specification, states other than the flat-ground-constant-speed traveling state is specifically at least one among a start state, a flat-ground acceleration state, a flat-ground deceleration state, a hill-ascent state, and a hill-descent state. In accordance with a further specific aspect described in the present specification, the control unit can obtain the fuel economy information of the flat-ground-constant-speed traveling state by removing the fuel economy information of the start state, flat-ground acceleration state, flat-ground deceleration state, hill-ascent state, and hill-descent state from all the travel states.

In accordance with another specific aspect described in the present specification, there is provided a vehicle recording device having a fuel gauge; a vehicle operation data recording unit; and a control unit for carrying out analysis related to the fuel economy information of the fuel gauge and the vehicle operation data. It is therefore possible to know the relationship between fuel economy information and the vehicle operation. Specifically, the vehicle recording device is provided with a notification unit, and the control unit causes the notification unit to provide notification of vehicle operation improvements on the basis of the vehicle operation data when the fuel economy information is worse than the predetermined standard. The predetermined standard is, e.g., the statistical average value.

In accordance with yet another specific aspect described in the present specification, there is provided a vehicle recording device having a traveling information detection unit, and a control unit for calculating the ratio between the flat-ground-constant-speed traveling state and the states other than the flat-ground-constant-speed traveling state on the basis of the information of the traveling information detection unit. It is therefore possible to know how the flat-ground-constant-speed traveling state contributes to improved fuel economy. Specifically, the vehicle recording device is provided with a notification unit, and the control unit causes the notification unit to provide notification that the ratio of the flat-ground-constant-speed traveling state is less than the predetermined standard in comparison with the ratio of the other states. The predetermined standard is, e.g., the statistical average value.

In accordance with yet another specific aspect described in the present specification, there is provided a vehicle recording device having a traveling information detection unit; a notification unit for providing notification on the basis of the information of the traveling information detection unit; and a control unit for controlling the notification timing made by the notification unit. It is thereby possible to provide notification of information related to the traveling state at a suitable timing that does not interfere with driving.

In accordance with yet another specific aspect described in the present specification, there is provided a vehicle recording device having a vehicle operation data recording unit; a notification unit for providing notification on the basis of the data of the vehicle operation data recording unit; and a control unit for controlling the notification timing made by the notification unit. It is thereby possible to provide notification of information related to the vehicle operation at a suitable timing that does not interfere with driving.

In accordance with a specific aspect described in the present specification, the control unit causes the notification unit to provide notification when the vehicle is stopped and does not bother the driver with notifications when the vehicle is traveling. In accordance with a further specific aspect, the vehicle recording device is provided with a traveling state detection unit, and the control unit causes the notification unit to stop notifications when the traveling state detection unit has detected that the vehicle is traveling. It is therefore possible for the driver to thereafter concentrate on driving without being bothered by notifications because the notifications are automatically stopped after the vehicle begins traveling.

In accordance with a further specific aspect described in the present specification, the control unit causes the notification unit to provide notification in at least one state among a state in which the vehicle is first placed in a travel-enabled state, a state in which the vehicle is stopped awaiting a signal, and a state in which the vehicle is no longer in a travel-enabled state. Therefore, notification can be effectively provided when the driver is seated in the vehicle prior to the start of traveling, when awaiting a signal and the driver has nothing to do, and when driving has ended.

In accordance with a further specific aspect described in the present specification, the vehicle recording device is provided with a manual operation unit for stopping the notifications of the notification unit at a midway point and a counter for counting the number of times the manual operation unit has been operated; and when the count has reached a predetermined value, the control unit does not provide the same notification again for notifications that have been stopped midway. In this manner, it is possible to provide notifications in a thorough manner and to avoid bothering the driver with understood notifications that are repeated more than necessary.

In accordance with another specific aspect described in the present specification, there is provided a vehicle recording device having a vehicle operation data recording unit; a control unit for evaluating whether an improvement is recognized in operation on the basis of the data of the vehicle operation data recording unit; and a notification unit for providing notification of improvement when improvement is recognized in operation on the basis of the evaluation of the control unit. An incentive to improve operation can therefore be provided. In accordance with a specific aspect described in the present specification, the control unit evaluates whether there is recognizable improvement in the data of the vehicle operation data recording unit accumulated for a predetermined length of time in comparison with the data of the vehicle operation data recording unit accumulated for a new predetermined length of time.

As described above, in accordance with a fifth technical characteristic disclosed in the present specification, there is provided vehicle recording device that is readily accepted by the driver in that information can be acquired that involves real benefits in terms of fuel economy improvement.

Next, the sixth technical aspect disclosed in the present specification relates to a vehicle recording device such as a drive recorder, and more specifically relates to a vehicle recording device provided with a communication function, and to vehicle information management device that works in coordination with the vehicle recording device.

Various proposals have been made in recent years for vehicle travel safety. A drive recorder is an example that is used as evidence when an accident or the like has occurred, by recording travel and driving conditions. Proposals have been made not only for keeping a past record merely as evidence, but also for making positive future improvements. For example, there have been proposed a system capable of efficiently diagnosing the driving skill of the driver (Patent Literature 4), and a drive recorder capable of providing exact instruction and evaluation of driving to the crew (Patent Literature 5). On the other hand, there has also been proposed a vehicle recording device having a communication function, i.e., a vehicle history information management system (Patent Literature 6) that can, e.g., encode and transmit history information related to various activity histories in a vehicle and thereby prevent falsification or the like of information.

However, conventionally, there is the aspect of monitoring and managing recording, and there are many and various problems in order to have onboard vehicle recording devices be been commonly and widely accepted and used.

In view of the above, an object of the fifth technical characteristic disclosed above in the present specification is to provide a vehicle recording device that will be readily, commonly, and widely accepted; and to provide a vehicle information management device for promoting the same.

More specifically, as an example of the sixth technical aspect described above in the present specification, there is provided a vehicle recording device provided with a communication function having a vehicle information acquisition unit; a transmitting unit for transmitting the vehicle information to the outside of the vehicle; a receiving unit for receiving statistical information of vehicle information collected from numerous vehicles; and a controlling unit for comparing the statistical information thus received and the vehicle information acquired by the vehicle information acquisition unit. The information of the subject vehicle can therefore be ascertained using the relationship with objective statistical data, interest in the comparison results is increased, and the comparison results are more readily accepted.

In accordance with a specific aspect described in the present specification, the information acquisition unit includes a fuel economy gauge and the statistical information includes the average values of the fuel economy information collected from numerous vehicles. The ranking of the fuel economy of the subject vehicle can therefore be objectively known using the relationship with the average value, and the driver can pay more attention to ecologically friendly driving on the basis of interests in cost.

In accordance with another specific aspect described in the present specification, the vehicle information acquisition unit includes a fuel economy gauge and the statistical information includes data showing the distribution state of fuel economy information collected from numerous vehicles. The ranking of the fuel economy of the subject vehicle can thereby be objectively known in terms of the ranking in the distribution, and the driver can pay more attention to ecologically friendly driving on the basis of interests in cost.

In accordance with another specific aspect described in the present specification, the data of numerous vehicles used in the statistical information includes all vehicle models. The ranking of the subject vehicle in the absolute statistical data regardless of vehicle model can therefore be objectively known.

In accordance with another specific aspect described in the present specification, the data of numerous vehicles used in the statistical information is limited to the same vehicle model. In this case, the ranking of the subject vehicle within the same vehicle model under the same conditions can be objectively known, and if the ranking of the subject vehicle is low in this case, the driver can take the results seriously because the results are the responsibility of the driver.

In accordance with another specific aspect described in the present specification, the vehicle information acquisition unit includes a fuel economy gauge and the statistical information includes vehicle-model average values of the fuel economy information collected from numerous vehicles. In this case, it is possible to know the vehicle-based average fuel economy as objective results by providing information for creating statistics, although the information is not related to the ranking of the subject vehicle; and such information can be used in evaluating the subject vehicle in terms of performance and as information for future switch in vehicle model.

In accordance with another specific aspect described in the present specification, the vehicle information acquisition unit includes a traveling information detection unit and a fuel economy gauge; the transmitting unit transmits the fuel economy information related to a specific traveling state detected by the traveling information detection unit; and the statistical information includes average values of the fuel economy information collected from numerous vehicles and related to the specific traveling state. It is therefore possible to know the relationship between the fuel economy of the subject vehicle and the average values of the fuel economy of, e.g., the flat-ground-constant-speed traveling state, the flat-ground-acceleration traveling state, the flat-ground-deceleration traveling state, the hill-ascent traveling state, the hill-descent traveling state, the starting state, and other specific traveling states; and it is possible to use the information as a reference for improving driving operation.

In accordance with another specific aspect described in the present specification, the vehicle information acquisition unit includes an acquisition unit [for acquiring] the ratio of the flat-ground-constant-speed traveling state among all traveling, and the statistical information includes the average value of the ratio of the flat-ground-constant-speed traveling state among all traveling collected from numerous vehicles. The worldwide average and the state of the subject vehicle can therefore be objectively compared in relation to the ratio of the flat-ground-constant-speed traveling state that affects fuel economy, and attention can be paid to safe, ecologically friendly driving, which involves few rapid accelerations and rapid stops.

In accordance with another specific aspect described in the present specification, the vehicle information acquisition unit includes a vehicle operation data recording unit, and the statistical information includes the average value of the vehicle operation data collected from numerous vehicles. Here, vehicle operation data is at least one operation record among, e.g., brake operation, accelerator pedal operation, and steering wheel operation. It is therefore possible to compare the driving operation of the subject vehicle with an objective worldwide standard, and attention can be voluntarily paid to safe, ecologically friendly driving.

In accordance with another specific aspect described in the present specification, a notification unit for providing notification on the basis of the comparative results produced by the control unit is provided to the vehicle recording device. As described above, it is therefore possible to know as required the comparative results of a variety of information compared by the control unit.

As described above, the sixth technical aspect described in the present specification obtains statistical data by communication with the outside. Therefore, in accordance with this aspect, in combination with the recording device in the vehicle, it is possible to provide an external vehicle-information management device used together with such a vehicle recording device.

The vehicle information management device provided by the sixth technical aspect described in the present specification is characterized in having a receiving unit for receiving vehicle information collected from numerous vehicles; a control unit for creating statistical information on the basis of the vehicle information thus received; and a transmitting unit for transmitting the statistical information created by the control unit to numerous vehicles.

In the present specification, various specific aspects have been proposed in relation to a vehicle information management device. The details correspond to various specific aspects described in detail above in relation to the vehicle recording device, and may function in coordination with the vehicle recording device.

INDUSTRIAL APPLICABILITY

The present invention can be used in a vehicle traveling information recording device such as a drive recorder.

LIST OF REFERENCE SIGNS

2 Vehicle
4 Signal apparatus (vehicle exterior)

6 Gasoline filling/power feeding station, ETC (vehicle exterior)
8 Vehicle control unit (sorting unit, recording unit, control unit, extraction unit, checking unit, detection unit, compression unit, time-elapsed detection unit, operation data recording unit)
10 Operation unit (traveling information acquisition unit, switching unit, manual operation unit, selection unit, operation data recording unit)
12 Vehicle function section (motive power source)
14 Recording unit
16 Display unit (reporting unit, announcement means, displays means, notification section)
18 Clock (traveling information acquisition section)
20 GPS unit (traveling information acquisition section, signal lamp detection unit, position information acquisition unit, vehicle information acquisition unit, traveling information detection unit)
22 Car navigation function unit
24 Vehicle short-distance communication unit (detection unit, traveling information acquisition unit, communication unit, signal lamp detection unit, transmitting unit, receiving unit, traveling information detection unit, vehicle information acquisition unit)
26 Camera (camera unit, acquisition unit, traveling information acquisition unit, detection unit, signal lamp detection unit)
28 Microphone (microphone unit, traveling information acquisition unit)
30 Acceleration detection unit (abnormality detection unit, vehicle information acquisition unit, traveling information detection unit)
32 First recording unit
34 Second recording unit
36 Signal apparatus control unit
38 Signal lamp
40 Signal apparatus short-distance communication unit (transmitting unit, receiving unit)
42 Signal apparatus system communication unit
44 Direction detection unit (acquisition unit, traveling information detection unit, signal lamp detection unit, running direction information acquisition unit, vehicle information acquisition unit, traveling information detection unit)
46 Speedometer (traveling information acquisition unit, vehicle information acquisition unit, traveling information detection unit)
18 Digital watermarking unit
50 Vehicle outside display unit (reporting unit)
52 Station short-distance communication unit; ETC short-distance communication unit
54 Station control unit; ETC control unit
56 Station system communication unit; ETC communication unit
58 Gasoline filling/power feeding unit
60 Gasoline filling/power feeding unit line
62 Gasoline filling/power feeding opening (communication unit)
72 Time information
74 Image information
76 Sound information
78 Image/sound FIFO capacity
80 Image/sound FIFO capacity
82 Running direction information
84 GPS information
86 Speed information
88 Signal image extraction information
90 Signal position extraction information
92 Signal lamp information (for eastbound vehicles)
94 Signal lamp information (for westbound vehicles)
96 Signal lamp information (for southbound vehicles)
98 Signal lamp information (for northbound vehicles)
100 Turn signal operation information
102 Brake operation information
104 Headlight information
202 Nonvolatile buffer memory (recording unit)
204 Brake (brake operation unit)
206 Display panel
208 Speaker
210 Image processing compression unit (extraction unit)
212 Brake lamp
214 Turn signal
216 Headlights
218 Vehicle side lights
220 Illumination level sensor (brightness detection unit)
302 Turn signal operation lever
304 Lamp control setting dial (operation unit)
306 Indicator
308 OFF position
310 ON (S) position (manual lighting position for vehicle side lights)
312 ON (H) position (manual lighting position for headlights)
314 AUTO position (automatic control position)
402 Steering wheel
404 Accelerator pedal
406 Slope detection unit (vehicle information detection unit, traveling information detection unit)
408 Lamp system
410 Engine
412 Traveling mechanism
414 Instantaneous fuel economy meter (fuel economy meter, vehicle information detection unit)
416 Server
420 Server control unit
422 Internet
424 Server communication unit (transmitting unit, receiving unit)

What is claimed is:

1. A vehicle traveling information recording device comprising:
a fuel economy gauge;
a traveling information detection unit;
a control unit for using the traveling information detection unit to classify fuel economy information of the fuel economy gauge, the control unit distinguishing the fuel economy information of the fuel economy gauge for a first state of travel at constant speed over flat ground, which is a unique combination of a constant speed and a flat ground, from a second state of travel with acceleration or deceleration over flat ground and from a third state of travel at constant speed over an up or down slope; and
an analyzer of driving technique configured to extract the fuel economy information for the second and third states and to exclude the fuel economy information for the first state which is unaffected by the driving technique and in no use for analyzation by itself, wherein the extracted second and third states are used for analyzation of driving technique of acceleration or deceleration and travelling over up or down slope, respectively,
whereby the fuel economy information affected by the driving technique is effectively extracted from profusion of information without disturbance by the fuel economy information unaffected by the driving technique,
wherein the vehicle traveling information recording device further comprises:
a notification unit for providing notification on the basis of information of the traveling information detection unit, and
a timing control unit for controlling timing of notification performed by the notification unit.

2. A vehicle traveling information recording device comprising:
a fuel economy gauge;
a traveling information detection unit;
a control unit for using the traveling information detection unit to classify fuel economy information of the fuel economy gauge, the control unit distinguishing the fuel economy information of the fuel economy gauge for a first state of travel at constant speed over flat ground, which is a unique combination of a constant speed and a flat ground, from a second state of travel with acceleration or deceleration over flat ground and from a third state of travel at constant speed over an up or down slope; and
an analyzer of driving technique configured to extract the fuel economy information for the second and third states and to exclude the fuel economy information for the first state which is unaffected by the driving technique and in no use for analyzation by itself, wherein the extracted second and third states are used for analyzation of driving technique of acceleration or deceleration and travelling over up or down slope, respectively,
whereby the fuel economy information affected by the driving technique is effectively extracted from profusion of information without disturbance by the fuel economy information unaffected by the driving technique,
wherein the vehicle traveling information recording device further comprises:
a transmitting unit for transmitting vehicle information acquired by the fuel economy gauge to the exterior, and
a receiving unit for receiving statistical information of fuel economy information collected from other numerous vehicles.

3. A vehicle traveling information recording device comprising:
a vehicle information acquisition unit;
a transmitting unit for transmitting own vehicle information acquired by the vehicle information acquisition unit to the exterior for dual purposes of participating in statistics of vehicle information of a plurality of actually running vehicles and of receiving the statistics in exchange of the transmission of the own vehicle information;
a receiving unit for receiving the statistics of the vehicle information actually collected from the plurality of actually running vehicles; and
a controlling unit for comparing the statistics received by the receiving unit and the own vehicle information acquired by the vehicle information acquisition unit,
wherein the vehicle information includes information for a first state of travel at constant speed over flat ground, a second state of travel with acceleration or deceleration over flat ground, and a third state of travel at constant speed over an up or down slope, wherein the first state is distinguished from the second and third states as a unique combination of a constant speed and a flat ground, and wherein the transmitting unit extracts the vehicle information for the second and third states for transmission and excludes the vehicle information for the first state from the transmission.

4. The vehicle traveling information recording device according to claim 3, wherein the vehicle information acquisition unit includes a fuel economy gauge, and the statistics include information that indicates a state of distribution of the fuel economy information collected from numerous vehicles.

5. The vehicle traveling information recording device according to claim 3, wherein the actually running numerous vehicles entitled to participate in the statistics are limited to the same vehicle type for the statistics to be free from influence of change in vehicle type.

6. The vehicle traveling information recording device according to claim 3, wherein the vehicle information acquisition unit includes a slope detection unit.

7. A vehicle traveling information recording device comprising:
a fuel economy gauge;
a traveling information detection unit;
a control unit for using the traveling information detection unit to classify fuel economy information of the fuel economy gauge, the control unit distinguishing the fuel economy information of the fuel economy gauge for a first state of travel at constant speed over flat ground, which is a unique combination of a constant speed and a flat ground, from a second state of travel with acceleration or deceleration over flat ground and from a third state of travel at constant speed over an up or down slope; and
an analyzer of driving technique configured to extract the fuel economy information for the second and third states and to exclude the fuel economy information for the first state which is unaffected by the driving technique and in no use for analyzation by itself, wherein the extracted second and third states are used for analyzation of driving technique of acceleration or deceleration and travelling over up or down slope, respectively,
whereby the fuel economy information affected by the driving technique is effectively extracted from profusion of information without disturbance by the fuel economy information unaffected by the driving technique,
wherein the control unit is configured to compute information relating to a ratio of the first state of travel at constant speed over flat ground to the other states including the second and third traveling states.

8. The vehicle traveling information recording device according to claim 7, wherein the control unit is configured to compare the information relating to the ratio with an average of the information relating to the ratio collected from other numerous vehicles.

9. A vehicle traveling information recording device comprising:
a fuel economy gauge;
a traveling information detection unit;
a control unit for using the traveling information detection unit to classify fuel economy information of the fuel economy gauge, the control unit distinguishing the fuel economy information of the fuel economy gauge for a first state of travel at constant speed over flat ground, which is a unique combination of a constant speed and a flat ground, from a second state of travel with acceleration or deceleration over flat ground and from a third state of travel at constant speed over an up or down slope; and an analyzer of driving technique configured to extract the fuel economy information for the second and third states and to exclude the fuel economy information for the first state which is unaffected by the driving technique and in no use for analyzation by itself, wherein the extracted second and third states are used for analyzation of driving technique of acceleration or deceleration and travelling over up or down slope, respectively, whereby the fuel economy information affected by the driving technique is effectively extracted from profusion of information without disturbance by the fuel economy information unaffected by the driving technique, wherein the vehicle traveling information recording device further comprises a notification unit for providing a notification on the basis of the control unit, and a timing control unit configured to control the notification unit not to provide the notification while the vehicle is traveling.

10. The vehicle traveling information recording device according to claim 9, wherein the timing control unit is configured to allow the notification unit to provide the notification if the vehicle is stopped.

11. A vehicle traveling information recording device comprising:

a traveling information detection unit;

a control unit configured responsive to the traveling information detection unit to distinguish a first state of travel at constant speed over flat ground from the other states of travel including a second state of travel with acceleration or deceleration over flat ground-and a third state of travel at constant speed over an up or down slope, wherein the first state consists of a unique combination of a constant speed and a flat ground;

a computer configured to compute information relating to a ratio of the first state of traveling to the overall states of traveling detected by the traveling detection unit-including the first state of traveling, the second state of traveling and the third state of traveling; and an analyzer configured to compare the computed information relating to the ratio with a standard to decide whether the computed information relating to the ratio is greater or less than the standard, whereby the computed information relating to the ratio of the first state of traveling to all of the states of traveling detected by the traveling detection unit is an indication of ecological driving.

12. The vehicle traveling information recording device according to claim 11, wherein the standard is an average of the information relating to the ratio collected from other numerous vehicles.

13. The vehicle traveling information recording device according to claim 11, wherein the traveling information detection unit includes a slope detection unit.

* * * * *